United States Patent
Gayaldo

(10) Patent No.: US 12,101,441 B1
(45) Date of Patent: Sep. 24, 2024

(54) SYSTEMS AND METHODS FOR PROVIDING CALLER IDENTIFICATION OVER A PUBLIC SWITCHED TELEPHONE NETWORK

(71) Applicant: Successful Cultures, Inc., Incline Village, NV (US)

(72) Inventor: Michael Gayaldo, Cayucos, CA (US)

(73) Assignee: Successful Cultures, Inc., Incline Village, NV (US)

(*) Notice: Subject to any disclaimer, the term of this patent is extended or adjusted under 35 U.S.C. 154(b) by 0 days.

(21) Appl. No.: 18/622,749

(22) Filed: Mar. 29, 2024

Related U.S. Application Data

(63) Continuation-in-part of application No. 18/478,023, filed on Sep. 29, 2023, now Pat. No. 11,968,330, which is a continuation-in-part of application No. 18/344,153, filed on Jun. 29, 2023, which is a continuation-in-part of application No. 18/084,459, filed on Dec. 19, 2022, which is a continuation-in-part of application No. 17/741,413, filed on May 10, 2022, now abandoned, which is a continuation-in-part of application No. 17/163,264, (Continued)

(51) Int. Cl.
*H04M 3/54* (2006.01)

(52) U.S. Cl.
CPC ................... *H04M 3/541* (2013.01)

(58) Field of Classification Search
CPC ............. H04M 3/541; H04M 3/42042; H04M 3/42068; H04M 3/42102; H04M 3/465; H04M 3/543; H04M 2203/6045; H04M 3/42204

USPC ...................................... 379/142.15; 455/417
See application file for complete search history.

(56) References Cited

U.S. PATENT DOCUMENTS 5,590,186 A   12/1996   Liao et al.
5,864,612 A    1/1999   Strauss
(Continued)

OTHER PUBLICATIONS

Dalgic, et al., True Number Portability and Advanced Call Screening in a SIP-Based IP Telephony System, magazine, Jul. 1999 Retrieved from: http://citeseerx.ist.psu.edu/viewdoc/download?doi=10.1.1.32.1662&rep=rep1&type=pdf.

(Continued)

*Primary Examiner* — Binh Kien Tieu
(74) *Attorney, Agent, or Firm* — Concourse Law Group; Katherine B. Sales, Esq.

(57) ABSTRACT

A first voice communication device for forwarding calls to a second voice communication device. The first device comprises a memory and a processor. The memory is configured to store a first device ID associated with the first device and a second device ID associated with the second device. The processor is configured to transmit, to the second device, a message configured to (1) associate the first device ID with the first device, and (2) associate an audio prompt with the first device; detect an incoming call to the first device; determine whether the memory comprises the second device ID; if and when the second device ID is present, then: automatically forward the incoming call to the second device; and automatically cause the audio prompt to be played on the second device; and automatically cause the first device ID to be displayed on second device.

28 Claims, 36 Drawing Sheets

Related U.S. Application Data filed on Jan. 29, 2021, now Pat. No. 11,330,099, which is a continuation-in-part of application No. 17/007,513, filed on Aug. 31, 2020, now Pat. No. 11,477,321, which is a continuation-in-part of application No. 16/899,273, filed on Jun. 11, 2020, now Pat. No. 11,228,678, which is a continuation-in-part of application No. 16/653,292, filed on Oct. 15, 2019, now Pat. No. 10,992,801, which is a continuation-in-part of application No. 16/268,759, filed on Feb. 6, 2019, now Pat. No. 10,477,013.

(60) Provisional application No. 62/771,942, filed on Nov. 27, 2018, provisional application No. 62/776,761, filed on Dec. 7, 2018, provisional application No. 62/769,423, filed on Nov. 19, 2018.

(56) References Cited

U.S. PATENT DOCUMENTS

| | | | |
|---|---|---|---|
| 5,901,209 A | 5/1999 | Tannenbaum | |
| 6,038,291 A * | 3/2000 | Cannon | H04M 1/006 379/74 |
| 6,049,601 A * | 4/2000 | Orui | H04M 3/54 379/211.02 |
| 6,125,126 A * | 9/2000 | Hallenstål | H04M 7/122 370/522 |
| 6,130,938 A | 10/2000 | Erb | |
| 6,285,750 B1 | 9/2001 | Brachman et al. | |
| 6,301,339 B1 | 10/2001 | Staples et al. | |
| 6,477,246 B1 | 11/2002 | Dolan et al. | |
| 6,574,470 B1 | 6/2003 | Chow | |
| 6,678,265 B1 | 1/2004 | Kung et al. | |
| 6,771,755 B1 | 8/2004 | Simpson | |
| 7,103,010 B2 | 9/2006 | Melideo | |
| 7,170,983 B2 | 1/2007 | Gruchala | |
| 7,308,101 B2 | 12/2007 | Wing | |
| 7,551,731 B2 | 6/2009 | Durga | |
| 7,684,554 B1 | 3/2010 | Vincent | |
| 7,822,188 B1 * | 10/2010 | Kirchhoff | H04L 65/1096 379/211.02 |
| 8,000,739 B2 | 8/2011 | Bajpai et al. | |
| 8,180,038 B2 | 5/2012 | Kent, Jr. | |
| 8,199,746 B2 | 6/2012 | Rosenberg et al. | |
| 8,472,604 B2 | 6/2013 | Brahm et al. | |
| 8,494,134 B2 | 7/2013 | Clark | |
| 8,588,387 B2 | 11/2013 | Ma | |
| 8,594,288 B2 | 11/2013 | Robbins | |
| 8,639,225 B2 | 1/2014 | Nzumafo | |
| 8,744,053 B2 | 6/2014 | Denny | |
| 8,856,359 B2 | 10/2014 | Guedalia | |
| 8,953,771 B2 | 2/2015 | Wing | |
| 9,025,747 B2 | 5/2015 | Chmara | |
| 9,420,013 B1 | 8/2016 | Van Rensburg | |
| 9,621,698 B2 | 4/2017 | Brunn | |
| 9,661,035 B2 * | 5/2017 | Alexander | H04L 65/1069 |
| 9,882,865 B1 | 1/2018 | Sipher et al. | |
| 9,961,194 B1 | 5/2018 | Weichman | |
| 10,154,134 B1 | 12/2018 | Weichman et al. | |
| 10,158,754 B1 | 12/2018 | Wiechman et al. | |
| 10,194,023 B1 | 1/2019 | Kong et al. | |
| 10,218,839 B2 | 2/2019 | Gupta et al. | |
| 10,462,293 B2 | 10/2019 | Borukhoff | |
| 10,477,013 B1 | 11/2019 | Gayaldo | |
| 10,536,278 B1 | 1/2020 | Donaldson et al. | |
| 10,992,801 B2 | 4/2021 | Gayaldo | |
| 11,044,360 B1 | 6/2021 | Judge et al. | |
| 11,228,678 B2 | 1/2022 | Gayaldo | |
| 11,330,099 B2 | 5/2022 | Gayaldo | |
| 11,463,654 B1 | 10/2022 | Beavers et al. | |
| 11,477,321 B2 | 10/2022 | Gayaldo | |
| 2002/0118805 A1 | 8/2002 | Miller et al. | |
| 2002/0181681 A1 | 12/2002 | Mani | |
| 2003/0147518 A1 | 8/2003 | Albal | |
| 2004/0008834 A1 | 1/2004 | Bookstaff | |
| 2004/0120478 A1 | 6/2004 | Reynolds et al. | |
| 2004/0264654 A1 | 12/2004 | Reding | |
| 2005/0064855 A1 * | 3/2005 | Russell | H04M 3/54 455/461 |
| 2005/0281401 A1 | 12/2005 | Creamer et al. | |
| 2006/0034442 A1 * | 2/2006 | Benveniste | H04M 3/54 379/211.02 |
| 2006/0095575 A1 | 5/2006 | Sureka | |
| 2006/0173940 A1 | 8/2006 | Guntupalli | |
| 2006/0182245 A1 | 8/2006 | Steinmetz | |
| 2008/0045186 A1 | 2/2008 | Black et al. | |
| 2008/0056235 A1 | 3/2008 | Albina | |
| 2008/0139228 A1 | 6/2008 | Raffel et al. | |
| 2008/0268824 A1 | 10/2008 | Allen | |
| 2009/0059818 A1 | 3/2009 | Pickett | |
| 2009/0077179 A1 | 3/2009 | Bi | |
| 2009/0097629 A1 * | 4/2009 | Huslak | H04M 3/54 379/211.02 |
| 2009/0316868 A1 | 12/2009 | Mariniello | |
| 2010/0303060 A1 | 12/2010 | Goncalves et al. | |
| 2011/0183657 A1 | 7/2011 | Lim | |
| 2011/0244854 A1 | 10/2011 | Hansson et al. | |
| 2011/0286385 A1 | 11/2011 | Goh et al. | |
| 2012/0148040 A1 | 6/2012 | Desai et al. | |
| 2012/0170726 A1 | 7/2012 | Schwartz | |
| 2012/0214456 A1 | 8/2012 | Cho et al. | |
| 2012/0300914 A1 | 11/2012 | Baccay | |
| 2013/0034220 A1 | 2/2013 | Ozeri et al. | |
| 2013/0308766 A1 | 11/2013 | Chmara | |
| 2013/0329873 A1 | 12/2013 | Pearl et al. | |
| 2013/0331073 A1 | 12/2013 | Balan et al. | |
| 2013/0344849 A1 * | 12/2013 | Chatterjee | H04M 3/42042 455/415 |
| 2014/0003594 A1 | 1/2014 | Chatterjee | |
| 2014/0003597 A1 * | 1/2014 | Lazaridis | H04M 3/4288 379/212.01 |
| 2014/0065997 A1 | 3/2014 | Walker et al. | |
| 2014/0087705 A1 | 3/2014 | Wooster et al. | |
| 2014/0177817 A1 * | 6/2014 | Obata | H04M 3/42263 379/211.02 |
| 2014/0185783 A1 | 7/2014 | Cohen et al. | |
| 2014/0205076 A1 | 7/2014 | Kumar et al. | |
| 2014/0274008 A1 * | 9/2014 | Olodort | H04M 19/08 455/417 |
| 2014/0348313 A1 | 11/2014 | Van Wyk et al. | |
| 2014/0370865 A1 | 12/2014 | Wilhelm | |
| 2015/0024717 A1 | 1/2015 | Kochhar et al. | |
| 2015/0024725 A1 | 1/2015 | Lang et al. | |
| 2015/0119009 A1 * | 4/2015 | Kucharski | H04M 3/42263 455/415 |
| 2015/0264174 A1 | 9/2015 | Brown | |
| 2016/0150089 A1 | 5/2016 | Garg | |
| 2016/0234664 A1 | 8/2016 | Vendrow et al. | |
| 2016/0344865 A1 | 11/2016 | Ehlen et al. | |
| 2017/0064525 A1 | 3/2017 | Ben Arzi et al. | |
| 2017/0244837 A1 * | 8/2017 | Kim | H04M 1/72409 |
| 2019/0007806 A1 | 1/2019 | Chu | |
| 2019/0260708 A1 | 8/2019 | Alrasheed | |
| 2019/0278878 A1 | 9/2019 | Sawyer et al. | |
| 2020/0027303 A1 | 1/2020 | Thomas | |
| 2020/0120208 A1 | 4/2020 | Agarwal et al. | |
| 2020/0367027 A1 | 11/2020 | Ben Arzi et al. | |
| 2021/0144246 A1 | 5/2021 | Murphy et al. | |
| 2022/0027417 A1 | 1/2022 | Katz et al. | |

OTHER PUBLICATIONS

International Search Report; PCTUS20/55670; dated Jan. 12, 2021.
Tu, et al., Toward Authenticated Caller ID Transmission: The Need for a Standarized Authentication Scheme in Q.731.3 Calling Line Identification Presentation, journal Retrieved from: https://adamdoupe.com/publications/toward-authenticated-called-id-transmission-itu2016.pdf.
International Search Report; PCT/US19/21000; dated Jun. 7, 2019.

* cited by examiner

2105 — Once the server has received the invitation information from the app of the person inviting others into the call, the server will then forward the information to the app on the cell phone of the individual or individuals being invited into the call. The app on the cell phone of any individual being invited into the call will create an alert and display the details of the invitation.

FIG. 21B

2107 — Before or after accepted by the people being invited into the call, the server may send a call to the native dialer of the person who initiated the invitations, if the person inviting people into the group call is not already connected to the server. When the server's call is received and answered by the person who initiated the call invitation, they will need to merge it with the other call or calls they are having so when the person or group invited into call is connected with the server, they will be also be connected with the all members on the existing call.

2108 — The server will then send a call to the person or multiple people who have accepted their invitation into the call. Once the calls are answered, the server will merge the calls with the call sent to the person who invited them into the call. And when the calls are answered, the people in the group call will hear an audio alert from the server of who is immediately joining the call.

*FIG. 21D*

2109 — Another option for connecting the person who accepted joining the call is as follows: Once accepted via the app by the person invited into the call, the server may forward a phone number to the app on the cell phone of a person who accepted the call invitation. The app will then initiate a call via the native dialer on the cell phone using the number the server has forwarded to the app. The call initiated by the app and made via the native dialer on the cell phone will be forwarded to the server to connect with the person who invited them to the call or be forwarded directly to the native dialer cell phone number of the person who invited them into the call.

2110 — If the call is directed to the native dialer of the person inviting them into the call, Once answered via the native dialer of the cell phone of the person who invited into the call, the person who invited them to the call must merge the incoming call with their existing call so the person invited is fully connected with all of the other individuals on the call.

2111 — Another option for connecting the person who accepted joining the call is as follows: Once accepted via the app by the person invited into the call, the server may forward the phone number of the person who has accepted joining the call to the app of the person. The person who has invited them into the call can either have their app initiate a call to them via the native dialer on their cell phone OR call them personally using the calling mechanism on their cell phone. Once the call is dialed and answered, they will be incorporated into the group call.

*FIG. 21E*

2205 — Once the server has received the call forwarding invitation information from the app of the person inviting others to receive the call forwarding, the server will then forward the information to the app on the cell phone of the individual or individuals being asked to receive the call forwarding. The app on the cell phone of any individual being asked to receive the call forwarding call will create an alert and display the details of the invitation.

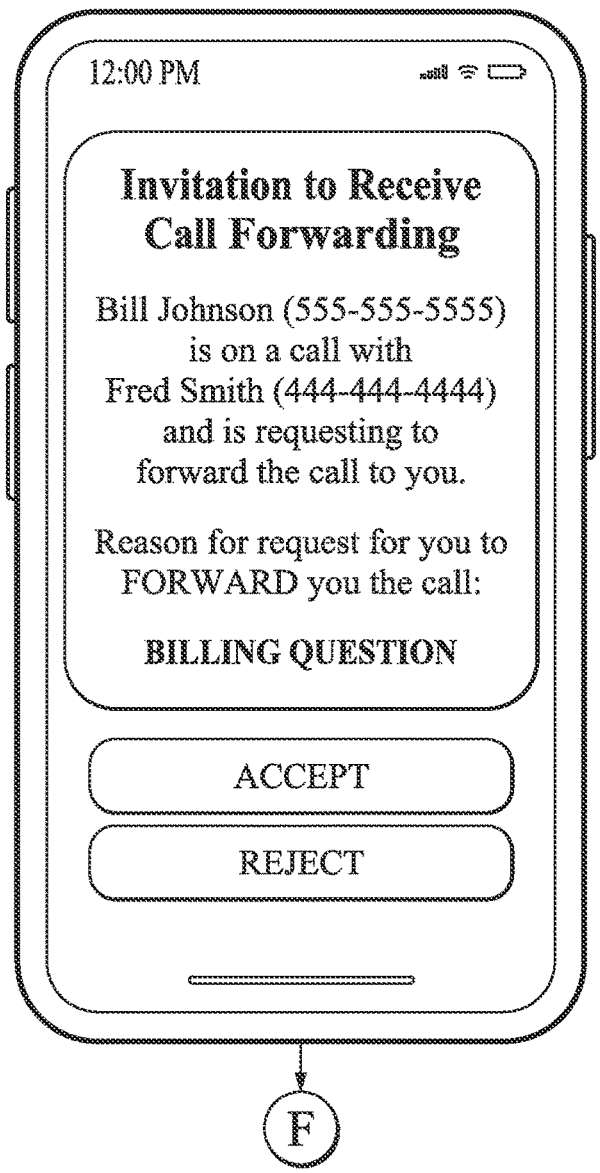

*FIG. 22B*

2207 — Before or after accepted by the person being invited into the call forwarding, the server may send a call to the native dialer of the person whose call is being forwarded, if the person whose call is being forwarded is not already connected to the server. To have their call forwarded, they can directly receive a call to be connected with the person or people to whom their call will be forwarded.

2208 — The server will then send a call to the person or multiple people who have accepted their call forwarding invitation. Once the call forwarding invitation calls are answered, the server will immediately merge the call or calls via the server with the call that was sent to the person whose call is being forwarded.

When the calls are merged, the call forwarding is immediately taking place.

2209 — Another option for connecting the person who accepted receiving the call forwarding is follows: Once accepted via the app by the person invited into the call forwarding, the server may forward a phone number to the app on the phone of a person who accepted the call forwarding invitation. The app will then initiate a call via the native dialer on the cell phone using the number the server has forwarded to the app. The call initiated by the app and made via the native dialer on the cell phone may be forwarded to the server to connect them with the person whose call is being forwarded to them. When the call is made to the server, it will be communicatively connected to the call made by the server to the person whose call is being forwarded to them.

Or the call can be directed to the phone number of the person to whom they are receiving the call forwarding. When answered by the person whose call is being forwarded to them, the call forwarding call will immediately begin.

FIG. 22D

2301 — A second calling device which is technologically but not physically connected to a First Device's call placement application must be programmed to receive an alert and make a call when it receives a notification from one or multiple phone call-placement applications that it has been programmed to respond to. Within the programming, the calling Device will only receive and respond to the alert if the phone number of First Device and its Call Placement App has been registered and approved for response in the Second Calling Device.

2302 — A second calling device which is technologically but not physically connected to a First Device's text messaging app must be programmed that it can receive a text message from one or multiple text messaging apps and can respond by making a phone call initiated by the text message. Within the programming, the Second calling Device will only receive and respond to the text message if the phone number of first device and its text messaging app has been registered and approved for response in the Second Calling Device.

2303 — When a person is using a cell phone and needs to make a call via the caller ID of a different phone number such as their office phone number, they can open the call placement app on their cell phone and select the second calling device they choose to make the call AND the person and/or phone number they are directing the second calling device to call.

*FIG. 23A*

2304 — Once selected, the app can send the following information to a server:
1) The Name of the Person and/or phone number that is directed to be called.
2) The name of the calling device if the person being called has more than one phone in their contact information.
3) The second calling device that is selected to make the call to the desired phone number.
4) The person and phone number and/or device who is originating the call.

2305 — When the calling instructions are received at the server from the call placement app on the First Device, the server can confirm that the second calling device is able to place the calls directed by the call placement app. If the server confirms the second device is able to make the call directed by the call placement app, it will forward the information the second calling device via a data network or a phone system.

2306 — Once the second device has received and approved the call placement information from the server of the First Device, it will initiate two phone calls. One call to the phone number it has been directed to call, and a second call to the first telephone number of the first device. Both calls will be merged so the user of the First Device can be on the call with the call is answered by the person's phone number that the Second Calling Device has been directed to call.

*FIG. 23B*

2307 — Once selected, the app can send the following information directly to the Second Calling Device:
1) The Name of the person and/or phone number that is directed to be called.
2) The name of the calling device if the person being called has more than one phone in their contact information.
3) The calling device that is selected to make the call to the desired phone number.
4) The person and phone number and/or device who is originating the call.

2308 — The second calling device can confirm that the first calling device's Call Placement App has authority to direct to the second calling device instructions to make a phone call. If it does have authority, the second calling device will...
1) Call the First Telephone Number of the First Device
2) Call the phone number it has been directed to call by the text message of the First Device.
3) Once the second device has received the call placement information from the server, it will initiate two phone calls. One call to the phone number it has been directed to call, and a second call to the first telephone number of the first device. Both calls will be merged so the user of the First Device can be on the call when the call is answered by the person's phone number that the Second Calling Device has been directed to call.

*FIG. 23C*

2309 — When a person is using cell phone and needs to make a call via the caller ID of a different phone number such as their office phone number, they can open the text messaging app on their cell phone and text a message to the text messaging number connected to the second device. The text message can include:
1) The name of the person and/or phone number they are directing the second calling device to call.
2) The name of the calling device the call will be sent to if the caller's contact name has more than one phone number.

2310 — When the text message is sent, it will go to a server or directly to the second calling device:
1) When the message is sent to a server, the server will confirm that the text message is approved.
2) When the message is approved, the server will send the calling instructions to the second calling device via a data network or a phone system.

2311 — When the calling instructions via the text message are received at the second device via the server or directly from the Text messaging app of the First Device, the second device can confirm that the text app of the first calling device has authority to direct the second calling device to make a phone call. If it does have authority, the second calling device will:
1) Call the First Telephone Number of the First device
2) Call the phone number it has been directed to call by the text message of the First Device.
3) Merge both calls so the user of the First Device can be on the call with the call is answered by the person's phone number that the Second Calling Device has been directed to call.

2312 — The caller ID that will be received by the person who's name and number the Second Calling Device was directed to call is the caller ID of the Second Device.

*FIG. 23D*

SYSTEMS AND METHODS FOR PROVIDING CALLER IDENTIFICATION OVER A PUBLIC SWITCHED TELEPHONE NETWORK

CROSS REFERENCE TO OTHER APPLICATIONS

The present application is a continuation-in-part of U.S. Non-Provisional patent application Ser. No. 18/478,023, filed Sep. 29, 2023, titled "SYSTEMS AND METHODS FOR PROVIDING CALLER IDENTIFICATION OVER A PUBLIC SWITCHED TELEPHONE NETWORK," which is a continuation-in-part of U.S. Nonprovisional patent application Ser. No. 18/344,153, filed Jun. 29, 2023, titled "SYSTEMS AND METHODS FOR PROVIDING CALLER IDENTIFICATION OVER A PUBLIC SWITCHED TELEPHONE NETWORK," which is a continuation of U.S. Nonprovisional patent application Ser. No. 18/084,459, filed Dec. 19, 2022, and entitled "SYSTEMS AND METHODS FOR PROVIDING CALLER IDENTIFICATION OVER A PUBLIC SWITCHED TELEPHONE NETWORK", which is a continuation-in-part of U.S. Nonprovisional patent application Ser. No. 17/741,413, filed on May 10, 2022, and entitled "SYSTEMS AND METHODS FOR PROVIDING CALLER IDENTIFICATION OVER A PUBLIC SWITCHED TELEPHONE NETWORK", which is a continuation-in-part of U.S. Nonprovisional patent application Ser. No. 17/163,264, filed on Jan. 29, 2021, and entitled "SYSTEMS AND METHODS FOR PROVIDING CALLER IDENTIFICATION OVER A PUBLIC SWITCHED TELEPHONE NETWORK," which is a continuation-in-part of U.S. Nonprovisional patent application Ser. No. 17/007,513, filed on Aug. 31, 2020 and entitled "SYSTEMS AND METHODS FOR PROVIDING CALLER IDENTIFICATION OVER A PUBLIC SWITCHED TELEPHONE NETWORK", which is a continuation-in-part of U.S. Nonprovisional patent application Ser. No. 16/899,273, filed on Jun. 11, 2020 and entitled "SYSTEMS AND METHODS FOR PROVIDING CALLER IDENTIFICATION OVER A PUBLIC SWITCHED TELEPHONE NETWORK," which is a continuation-in-part of U.S. Nonprovisional patent application Ser. No. 16/653,292, filed on Oct. 15, 2019, and entitled "SYSTEMS AND METHODS FOR PROVIDING CALLER IDENTIFICATION OVER A PUBLIC SWITCHED TELEPHONE NETWORK," which is a continuation in part of U.S. Nonprovisional patent application Ser. No. 16/268,759, filed on Feb. 6, 2019 and entitled "SYSTEMS AND METHODS FOR PROVIDING CALLER IDENTIFICATION OVER A PUBLIC SWITCHED TELEPHONE NETWORK" which claims the benefit of priority under 35 U.S.C. § 119 to U.S. Provisional Patent Application No. 62/769,423, filed Nov. 19, 2018, entitled "System and Method for Providing Caller ID over PSTN", U.S. Provisional Patent Application No. 62/771,942, filed Nov. 27, 2018, entitled "System and Method for Providing Caller ID over PSTN", and U.S. Provisional Patent Application No. 62/776,761, filed on Dec. 7, 2018, entitled "System and Method for Providing Caller ID over PSTN." The present application further claims the benefit of priority of U.S. Provisional Application No. 63/134,044, filed on Jan. 5, 2021, and entitled "METHODS AND SYSTEMS FOR PLACING OUTBOUND CALLS." The disclosures of each of U.S. Provisional Application No. 63/134,044, U.S. Nonprovisional patent application Ser. No. 17/007,513, U.S. Nonprovisional patent application Ser. No. 16/899,273, U.S. Nonprovisional patent application Ser. No. 16/653,292, U.S. Non-provisional patent application Ser. No. 16/268,759, U.S. Provisional Patent Application No. 62/771,942, and U.S. Provisional Patent Application No. 62/776,761 are incorporated herein by reference in their entireties.

FIELD OF THE INVENTION

The present invention generally relates to the field of telecommunications. In particular, the present invention is directed to systems and methods for providing caller identification over a public switched telephone network.

BACKGROUND

A person, such as but not limited to professionals like salesmen, doctors, and lawyers, may have the need to place a call to a client, a customer, a potential client, or a potential customer from a personal mobile device. For example, caller may be out of the office when the need arises to make the call. Likewise, the need to make a call may be after hours or on a weekend. The caller may not want to place the call with a mobile device because the recipient of the call will have access to the professional's personal mobile number due to caller identification (ID). This may lead to lost opportunities and/or customer dissatisfaction. Existing systems do not solve this problem in a satisfactory manner. Where calls are forwarded from a work or office phone to a personal cell phone, for instance, the cell phone can typically show either the caller ID of the phone number it is being forwarded from, or the caller ID of the phone placing the call but does not typically have access to both; this can exacerbate confusion, rather than solving it. Some phone systems that utilize voice over internet protocol (VOIP) provide a forwarded telephone call to include more complete information. However, VOIP calls provide communication services over the Internet instead of via the PSTN. Thus, the quality of such calls may be diminished and choppy in comparison to phone calls made via PSTN.

SUMMARY OF THE DISCLOSURE

In an aspect, an apparatus for call placement includes at least a processor connected to a communication network and a memory containing instructions configuring the at least a processor to identify a call between a first device associated with a first telephone number and a second device associated with a second telephone number over a communication network, receive a selection of at least a third device of a plurality of recipient devices, send a notification to the at least a third device, wherein the notification comprises a caller identification (ID) of the first device or the second device and a call invitation comprising an accept option and a decline option, and receive a notification response from the at least a third device, wherein the notification response comprises a selection between the accept option and the decline option.

In another aspect, a method for call placement includes identifying, by a processor, a call between a first device associated with a first telephone number and a second device associated with a second telephone number over a communication network, receiving, by the processor, a selection of at least a third device of a plurality of recipient devices, sending, by the processor, a notification to the at least a third device, wherein the notification comprises a caller identification (ID) of the first device or the second device and a call invitation comprising an accept option and a decline option, and receiving, by the processor, a notification response from the at least a third device, wherein the notification response comprises a selection between the accept option and the decline option.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 21A-21E are flow diagrams of a system and method that enables a first user to invite one or more second users join an active ongoing group call (an existing call with two or more people on it) which is taking place via the native dialer of a cell phone (the first device) of the first user;

FIGS. 22A-22D are flow diagrams of a system and method that enables a first user to forward a call to at least one second user when the forwarded call is taking place via the native dialer of a cell phone of the first user;

FIGS. 23A-23D are flow diagrams of a system and method that enables a first user to initiate a call via a first device (a cell phone) with a first telephone number and a texting application (app) and/or a call placement application operating thereon;

FIG. 27 is a communication diagram of call forwarding, in accordance with a preferred embodiment of the present invention;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

The embodiments described in this disclosure relate to a system and method of providing caller identification (ID) over a telephone network. More specifically, embodiments, in this disclosure relate to apparatus and methods for forwarding a call over a telephone network, such as a public switched telephone network (PSTN). As used in this disclosure, a PSTN is a network including one or more telephone networks, such as without limitation circuit-switched telephone networks; PSTN may include all circuit-switched telephone networks, in a manner analogous to inclusion of computer networks on the Internet. Circuit-switched telephone networks, as used in this disclosure, may include wired telephonic networks operating over electronic telephone wires, cellular networks placing or carrying calls between cellular phones, digital cellular networks PSTN may operate according to standards promulgated by the International Telegraph Union (ITU), such as without limitation the ITU Telecommunication Standardization Sector (ITU-T). For outbound calls, the apparatus and method enable a caller to provide a caller identification (ID) that differs from the native caller ID of their mobile phone. The apparatus and method enable multiple phones tied to a single account to display the same caller ID for outbound calls. For forwarded inbound calls, such as calls being forwarded from an office, the apparatus and method inform the recipient of the ID of the call, and/or that the call is being forwarded. Apparatus and method enable the recipient to have calls forwarded from more than one number and identify the identity of the caller as well as the specific number that the call is being forwarded from.

Figure 7:
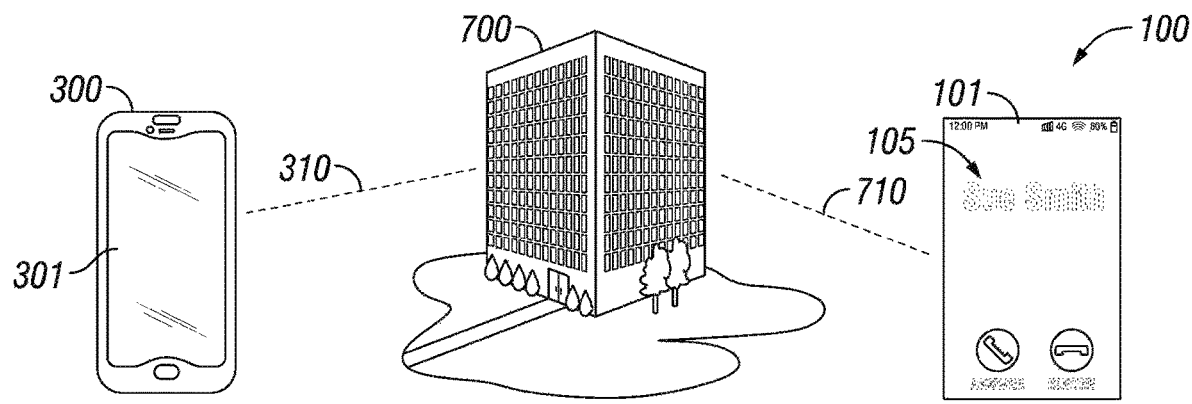
FIG. 7 shows a schematic of a prior system forwarding a phone call.
Figure 8:
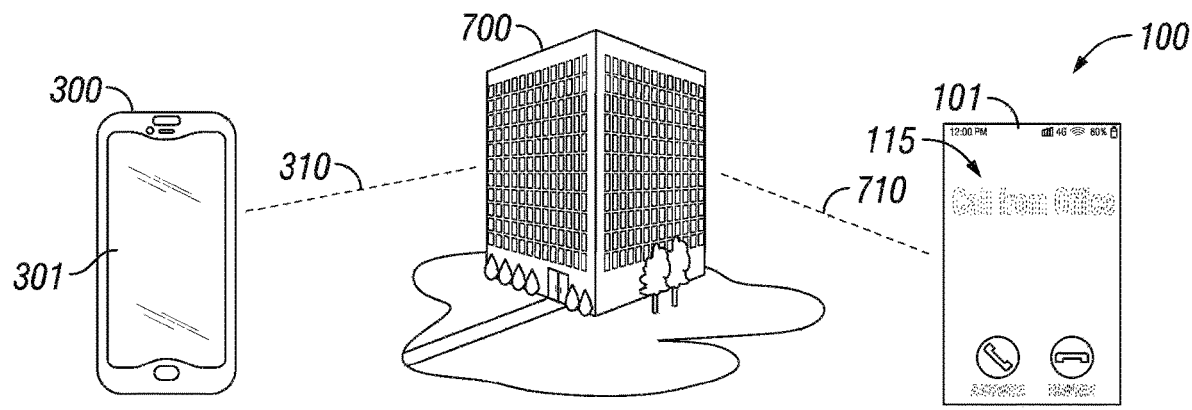
FIG. 8 shows a schematic of a prior system forwarding a phone call.

A person may have calls forwarded from a work or office phone to a personal cell phone. When a call is forwarded, typically the cell phone can show either the caller ID of the phone number it is being forwarded from, such as shown in FIG. 8, or the caller ID of the phone placing the call, such as shown in FIG. 7. If the caller ID only indicates the caller ID of the forwarded number as shown in FIG. 8, the recipient of the call knows the call is coming from the forwarded telephone number, which may be an office, but the recipient does not know the identification of the caller. Thus, the recipient may answer an undesired call. The recipient may answer the call differently if the recipient is aware of the identification of the caller. If the caller ID only indicates the caller ID of the caller as shown in FIG. 7, the recipient of the call may not recognize that the call is being forwarded, which may cause the recipient to answer the call in a different manner than if it was recognized as a call being forwarded from a third number, such as an office.

Some phone systems that utilize voice over internet protocol (VOIP) provide a forwarded telephone call to include both the caller ID of the caller as well as the identification of a forwarded number. However, VOIP calls provide communication services over the Internet instead of via the PSTN. Thus, the quality of such calls may be diminished and choppy in comparison to phone calls made via PSTN. Embodiments disclosed in this disclosure resolve these and other problems arising within the technology of telecommunications. Specific means and methods for resolution of the above-described problems are discussed below.

Figure 1:
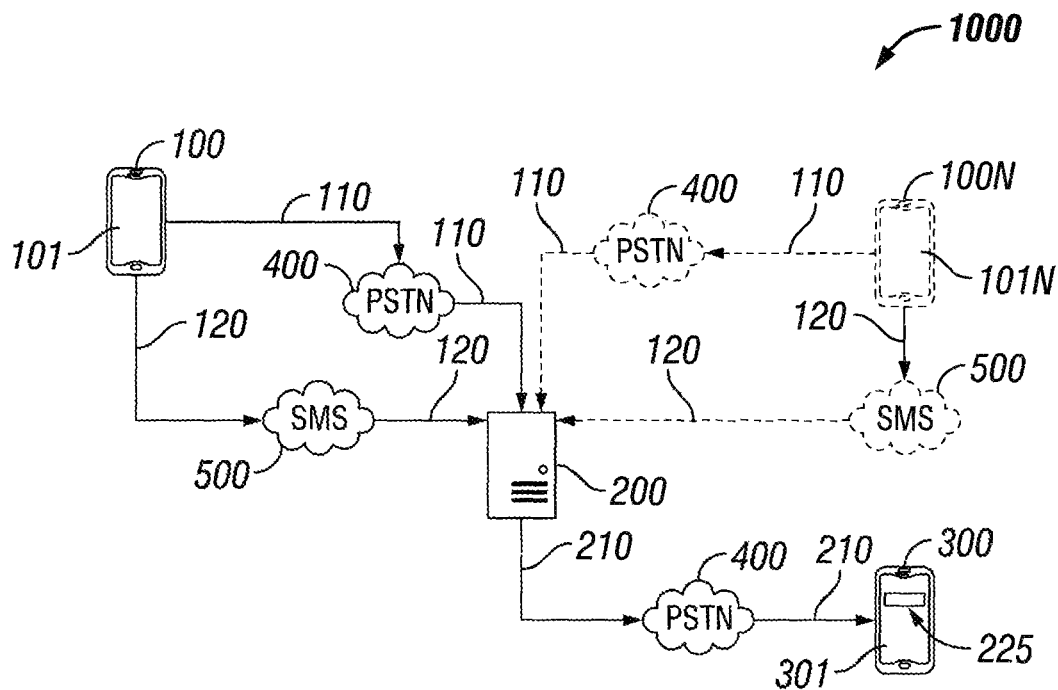
FIG. 1 shows a schematic of one embodiment of a system of the present disclosure for an outbound phone call.

Now referring to FIG. 1, an exemplary embodiment of a system 1000 for providing caller ID over the PSTN is shown. System 1000 includes a first device 100 having a display, or screen, 101. First device 100 has a first telephone number and a first caller ID associated with the first telephone number. In various embodiments, first device may include any computing device as described below in reference to FIG. 15, including, without limitation, a mobile telephonic device such as a cellular phone, digital phone, tablet enabled to place phone calls, or the like; such mobile telephonic devices are referred to in this disclosure as "cell phones." First device 100 may include, without limitation, a personal cell phone of a user of the system 1000. As a further non-limiting example, first device 100 may include a work cell phone of the user of the system 1000. System 1000 may be accessed via an application ("app") downloaded on at least the first device 100. In one or more embodiments, app may be any suitable program as described below in reference to FIG. 15. App may, for instance and without limitation, include a web application running on a browser operated by first device 100, a native app, such as a "mobile app" executed on first device 100 without a web browser, or any other suitable form of program or application that may occur to a person skilled in the art, upon reviewing the entirety of this disclosure. An app user, such as without limitation a user of first device 100, may utilize the app on the first device 100 to call another telephone without disclosing the first caller ID, which may be associated with the native telephone number of the first device 100. For example, and without limitation, the app user may want to call a client, but may not want the client to have access to the telephone number of the app user's cell phone, i.e. the first device 100; as a further non-limiting example, app user may wish client to call app user's office telephone, optionally in conjunction with a call-forwarding system or method, including without limitation call-forwarding systems for inbound calls as set forth in further detail below in reference to FIGS. 3-6 and 10, and/or utilizing one or more elements and/or process steps thereof.

Still referring to FIG. 1, after downloading app to the first device 100, app user may establish a user account within the app. For example, and without limitation, app user may establish a username and password associated with the account. App user may provide billing information while setting up the account. Additionally, app user may provide a predetermined caller ID to be associated with the first device when making a telephone call using the app. For example, and without limitation, the predetermined caller ID may include an office telephone number associated with the app user. App user may provide multiple predetermined caller IDs to potentially be associated with the first device when making a telephone call using the app. For example, and without limitation, the app user may have multiple office locations each having a different telephone number, which correspond to the multiple predetermined caller IDs. Where there is a plurality of predetermined caller IDs, app may prompt user to select one of the multiple predetermined caller IDs, for instance and without limitation via a user interface component such as a radio button, drop-down list, or the like. Alternatively or additionally, app may extract or retrieve one or more candidate numbers from which to select a telephone number to include in predetermined caller ID; as a non-limiting example, app may access contacts of user on first device 100 and select one or more telephone numbers associated with user from contacts. For instance, and without limitation, user may include a number labeled "office," "work," or the like in contacts stored on first device 100, indicating a telephone number of the user's work phone; app may select this number as part of predetermined caller ID, and may display selected number to user. App may give user the ability to override default selection by entering a user command via a button or text field deleting selection and/or overwriting default selection with user-entered information. As a further non-limiting example, app may retrieve or extract a plurality of candidate telephone numbers from contacts, for instance by scanning contacts for entries corresponding to "work," "office," "me," or the like; candidates may be presented to user by app in a list or other display, which may permit user to refuse or modify each candidate as described above. App may require the app user to confirm rights in the selected predetermined caller ID or multiple predetermined caller IDs; this may be performed, without limitation, by presenting a logon screen for the user to provide logon credentials such as, without limitation, a username and password. In some embodiments, app must be installed on each device involved in a call. In other embodiments, a device with app installed may be able to forward a call to devices that do not have the app installed. In one or more embodiments, contacts of a user may be accessed to provide a caller ID associated with a device that does not have the app installed.

With continued reference to FIG. 1, system 1000 includes a server 200. Server 200 may include any computing device as described below in reference to FIG. 15. Server 200 may include, without limitation, any server as described below in reference to FIG. 15. Server may alternatively or additionally include a desktop computer, a handheld device or mobile device such as a smartphone or tablet, and/or a special purpose device; any such device may include or be included in server 200 where configured as set forth in further detail below. Server 200 may include two or more devices working in concert or in parallel; server 200 may include, for instance, a first server or cluster of servers in a first location and a second server or cluster of servers in a second location. Server 200 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Server 200 may include one or more computing devices dedicated to data storage, security, distribution of traffic for load balancing, and the like. Server 200 may distribute one or more computing tasks as described below across a plurality of computing devices of server 200, which may operate in parallel, in series, redundantly, or in any other manner used for distribution of tasks or memory between computing devices. Server 200 may be implemented using a "shared nothing" architecture in which data is cached at the worker; in an embodiment, this may enable scalability of system 100 and/or server 200. In an embodiment, server 200 may communicate locally or over a network to one or more remote devices to perform one or more embodiments of processes and/or process steps as disclosed in further detail below; communication may include, without limitation, communication with any other device as described herein.

Still referring to FIG. 1, server 200 may be designed and/or configured to perform any method, method step, or sequence of method steps in any embodiment described in this disclosure, in any order and with any degree of repetition. For instance, server 200 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Server 200 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Server 200 may be designed and configured to perform any method and/or method steps as described herein, including without limitation methods and/or method steps described below in reference to FIGS. 9-16, in any order or combination, or with any degree of iteration or repetition.

Still referring to FIG. 1, server 200 is designed and configured to assign a second telephone number to the first device 100. This may be performed, in an embodiment, after user sets up an account as described above. Second telephone number assigned to the first device 100 may be a unique number; as used in this disclosure, "unique" signifies that second telephone number is unique at least within PSTN with which devices in system 1000 are communicating or otherwise interacting as set forth in further detail herein. Uniqueness may include a higher degree of uniqueness, such as uniqueness within a plurality of PSTNs, within all PSTNs that system 1000 interacts with, within all PSTNs in existence, or the like. Uniqueness may include a number generated according to protocols for generation of globally unique identifiers (GUIDs) and/or universally unique identifiers (UUIDs). For example, and without limitation, second telephone number assigned to first device 100 may be a unique ten (10) digit telephone number now associated with the first device 100. To place a call using app, app user may open the app and selects a client or other person to call. For example, a client may be selected from a contact list contained within the app. The contact list may include a telephone number of client; telephone number of client may be a first destination device telephone number of a first destination device 300. Selection may be performed by any suitable process or facility for selecting and/or calling a contact number, such as, and without limitation, a voice command or manually entered to call client and/or other person by name, a voice command or manually entered command to call client and/or other person by a description of professional relationship or the like, or any other suitable process. In an embodiment, app may be initialized or started up by such a command, rather than being manually or otherwise opened by user. Alternatively, the app user may manually or otherwise enter the first destination device telephone number of a first destination device 300 in the app. As a further non-limiting example, app may present data to user via audio output such as without limitation speech-to-text output or the like; thus, as a non-limiting illustration, user may activate app using a voice command or by tapping or selecting a visually depicted event handler on a screen of first device 100, and app may respond with a voice prompt asking the user whether the user wishes to place a call, and/or may place the call to second number without further prompting. Further continuing the example, app may issue a subsequent voice prompt requesting a destination number and user may provide the first destination device telephone number via verbal command or any other suitable data entry process. Prompt to enter first destination device telephone number may originate at app or at server 200; for instance, server 200 may send a request for first destination device telephone number via any of PSTN 400, network 600, and/or texting service 500 upon receiving either PSTN call or data (as set forth in further detail below) from first device 100, and app may subsequently output the request or a prompt based on the request to user. App and/or server may provide other prompts to user, such as and without limitation, a request for user to specify a device user wishes to appear as caller ID on first destination device as provided in further detail below; user may enter desired caller ID information and/or select desired caller ID information from a list including two or more telephone numbers, such as without limitation the user's office phone, mobile phone, home phone, and/or other numbers. Persons skilled in the art, upon reviewing the entirety of this disclosure, will be aware of various ways in which initialization and/or function calls to app, initialization of a phone call via app, and/or entry of first destination device telephone number may be performed consistently with this disclosure.

With continued reference to FIG. 1, upon selecting, entering, and/or otherwise specifying first destination device 300 telephone number of first destination device 300, whether manually or via a contacts list, first device 100 dials the second telephone number associated with the first device 100 creating an audio call 110 between the first device 100 and the server 200 via the PSTN 400. Audio call 110 may be placed according to any protocol or procedure suitable for placement of an audio call over a PSTN. Persons skilled in the art, upon reviewing the entirety of this disclosure, will be aware of various ways in which audio call 110 may be placed as consistent with this disclosure. Audio call 110 may be placed using components, circuits, and/or modules of first device 100 usable for placement of audio calls; audio call 110 may be placed using app, which may invoke a telephone application on first device 100 to place audio call 110.

Still referring to FIG. 1, first device 100 communicates data 120 to server 200 via a different channel than the audio call 110. In one or more embodiments, communication of data 120 to server may be performed substantially simultaneously with audio call 110, where "substantially simultaneously" denotes provision of data 120 and audio call 110 close enough together that a user experience of time taken for placement of the call to first destination device, is equivalent to user experience of time taken for placement of a typical telephone call; data 120 may be conveyed before, after, or concurrently with audio call 110. Data 120 may be conveyed via any suitable channel of wired or wireless electronic communication that is not the channel used for audio call 110. For example, the data 120 may be communicated via simple message system (SMS) 500 or another text-messaging protocol to the server 200 as shown in FIG. 1. As another example, the data 120 may be communicated over the Internet 600 via various Internet protocols such as packet-based communication protocols to the server 200 as shown, as a non-limiting example, in FIG. 2. For example, the data may be communicated via hypertext transfer protocol (HTTP), secure HTTP (HTTPS), transmission control protocol-Internet protocol (TCP-IP), or the like as would be appreciated by one of ordinary skill in the art having the benefit of this disclosure. Data may be received via at least one of a text messaging protocol such as SMS and a packet-based network such as the Internet, meaning that data may be received via the text messaging protocol, the packet-based network, or a combination of the two. Data 120 may be received slightly before, simultaneously, or slightly after receiving the first audio call from the first device 100. Data 120 sent to the server 200 may include the first destination device telephone number of the first destination device 300; in other words, the data 120 may include the telephone number that the app user desires to call and corresponding to a device and/or receiving user with whom user wishes to place the call. Data 120 may also include predetermined caller ID that the app user desires to present to the first destination device 300 rather than the first caller ID of the first device 100. Data 120 may also include a username and password of the app user from the first device 100. Data 120 may include any suitable additional data usable for performance of any portion of any method as described in this disclosure, including additional information concerning app user, first device 100, second telephone number and/or other information; any of these exemplary elements may alternatively be excluded from data 120 and/or concealed from first destination device and/or a user thereof. Data 120 may include information needed to validate identity of device 100; server 200 may use data 120 to authenticate first device 100 and/or user of first device 100.

Continuing to refer to FIG. 1, server 200 may recognize audio call 110 from first device 100 based on second telephone number dialed by the first device 100 as described above. The server 200 may attempt to validate the first audio call 110 based on receipt of data 120 also from the first device 100, which may include the app user's username and password. A second audio call 210 is communicated from the server 200 to the first destination device 300 via the PSTN 400; this may occur after validation by the server 200, and may, for instance, not proceed if server 200 fails to validate first audio call 110, for instance owing to a mismatch with data 120. Second audio call may be placed using first destination device telephone number of first destination device 300. Second audio call 210 connects the first destination device 300 with the first device 100. The server 200 causes predetermined caller ID 225, for instance as received in data 120, to be displayed on the screen, or display, 301 of the first destination device 300 during the second audio call 210 rather than the first caller ID of the first device 100. Where user selected one of a plurality of predetermined caller IDs as described above, server 200 may cause first destination device to display selected predetermined caller ID.

Still referring to FIG. 1, an account on app may be associated with any number of mobile devices, also referred to as additional subscriber devices; for example, a second device, also referred to as an additional subscriber device, 100N may be associated with the account. Additional subscriber device 100N may include any device suitable for use as first device as described above. Additional subscriber device 100N has a screen 101N, a third telephone number, and a second caller ID associated with the third telephone number. Third telephone number of additional subscriber device 100N may differ from first telephone number of the first device 100. Third telephone number may be a native telephone number of additional subscriber device 100N. As with first device 100, additional subscriber device 100N may include without limitation a personal cell phone or a work cell phone of a user of the system 1000. After setting additional subscriber device 100N on the account, the server 200 of the system 1000 may assigns a fourth telephone number to additional subscriber device 100N; this may be performed according to any process and using any means suitable for assigning second telephone number to first device 100 as described above. Fourth telephone number assigned to additional subscriber device 100N may be a unique number, where "unique" may have any meaning associated with "unique" as referring to second telephone number as described above. For example, fourth telephone number assigned to additional subscriber device 100N may be a unique ten (10) digit telephone number now associated with the additional subscriber device 100N; fourth telephone number may differ from second telephone number assigned to first device 100.

To place a call using the app, the app user of additional subscriber device, or second device, 100N may open the app and select a client, person, or device to call; client and/or person may operate a second destination device to be called (not shown). Upon selecting a second destination device telephone number of second destination device, the second destination device telephone number being a telephone number associated with the second destination device in the same way that first destination device telephone number is associated with first destination device as described above, additional subscriber device 100N may dial fourth telephone number associated with the additional subscriber device 100N creating an audio call 110 between the additional subscriber device 100N and the server 200 via the PSTN 400; this may be performed as described above for placement of audio call 110 from first device 100 to PSTN 400. Substantially simultaneously, the additional subscriber device 100N may communicate data 120 to the server 200 via a different channel than the audio call 110; this may be performed as described above for communication of data 120 from first device 100 to server 200, where "substantially simultaneously" has the same meaning as that described above for conveyance of data 120 from the first device 100 to the server. For example, data 120 may be communicated via SMS 500, packet-based communication, or the like to the server 200 as shown in FIG. 1. As discussed herein, an audio call may be placed to second destination device by server 200 based on data 120 connecting additional subscriber device 100N to second destination device. First device 100 and additional subscriber devices 100N are shown in FIG. 1 for illustrative purposes and the number of the devices 100, 100N may be varied as would be appreciated by one or ordinary skill in the art having the benefit of this disclosure. An account on system 1000 may include one, two, or more subscriber devices as would be appreciated by one or ordinary skill in the art having the benefit of this disclosure. The number, size, shape, and/or configuration of first device 100, server 200, and/or second device 300 are shown in FIG. 1 for illustrative purposes only and may be varied depending on the application as would be appreciated by one of ordinary skill in the art having the benefit of this disclosure. For example, system 1000 may include one or more servers 200.

Figure 2:
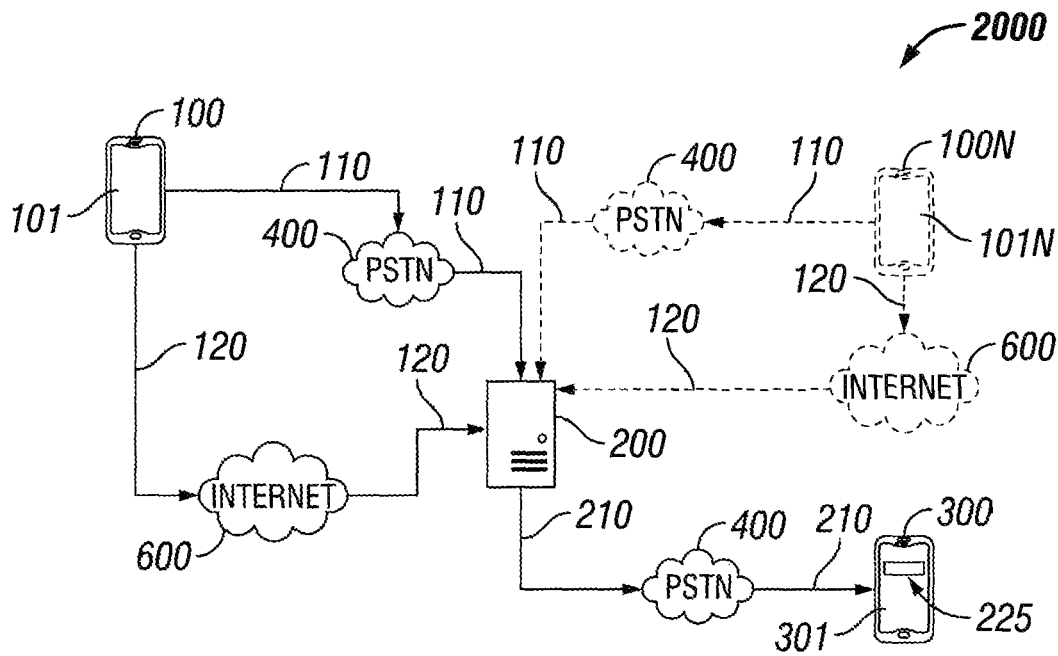
FIG. 2 shows a schematic of one embodiment of a system of the present disclosure for an outbound phone call.

FIG. 2 shows an exemplary embodiment of a system 2000 for providing caller ID over the PSTN. The system includes a first device 100 having a first telephone number and a first caller ID associated with the first telephone number; first device 100 may include any device suitable for use as first device 100 as described above in reference to FIG. 1. As discussed above, first device 100 may call a second telephone number associated with first device 100 to create a first audio call 110 with server 200. As with system 1000 of FIG. 1, first device 100 communicates data 120 to server 200 via a different channel than audio call 110. Data 120 may be communicated over the Internet 600 via various Internet protocols to server 200 as shown in FIG. 2, and as described above in connection with FIG. 1; alternatively or additionally, data 120 may be communicated to server 200 via text-messaging services, for example as described above in reference to FIG. 1. Server 200 may connect an audio call 210 to a first destination device 300 via PSTN 400 based on the first audio 110 and the data 120 received via the Internet 600 connecting first device 100 to the first destination device 300. Server 200 causes a selected predetermined caller ID 225, if the app user has more than one predetermined caller ID, to be displayed on a screen, or display 301 of first destination device 300 during second audio call 210 rather than first caller ID of the first device 100; this may be implemented, without limitation, as described above in reference to FIG. 1.

As discussed herein, and still referring to FIG. 2, an account on the app may be associated with any number of mobile devices; for example, an additional subscriber device 100N may be associated with the account, as described above in reference to FIG. 1. Additional subscriber device 100N may also create an audio call 110 via PSTN 400 and provide data 120 via the Internet 600; this may be implemented, without limitation, as described above in reference to FIG. 1. Likewise, additional subscriber device 100N may provide data 120 on a channel different from first device 100. For example, first device 100 may provide data 120 to server 200 via the Internet 600 whereas additional subscriber device 100N of system 2000 may provide data 120 via SMS 500, or the like, as would be appreciated by one of ordinary skill in the art having the benefit of this disclosure. First devices 100 and one or more additional subscriber devices 100N are shown in FIG. 2 for illustrative purposes. An account on system 2000 may include one, two, or more devices as would be appreciated by one or ordinary skill in the art having the benefit of this disclosure. The number, size, shape, and/or configuration of first device 100, server 200, and/or second device 300 are shown in FIG. 2 for illustrative purposes only and may be varied depending on the application as would be appreciated by one of ordinary skill in the art having the benefit of this disclosure. For example, system 2000 may include one or more servers 200.

Figure 3:
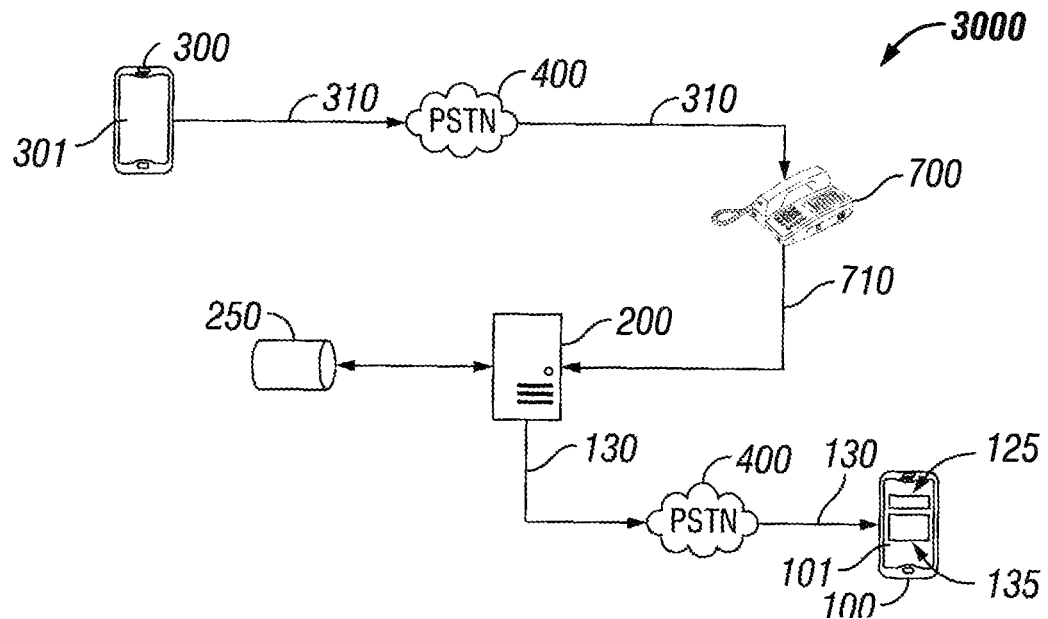
FIG. 3 shows a schematic of one embodiment of a system of the present disclosure for an inbound phone call forwarded from a different telephone number.

FIG. 3 shows a system 3000 for forwarding a telephone number. A call 310 may be placed by a second device 300 to a device, or location, 700, which may be located at and/or associated with in the PSTN an office or home number. Call 310 may be placed, without limitation, to a third telephone number associated with device or location 700. Second device 300 may include, without limitation, any device suitable for use as first device 100 and/or first destination device as described above; second device 300 may include or be a first destination device 300 in systems 1000, 2000, as suggested and illustrated in FIG. 3, or may be a different device. It should be noted that in different iterations of methods performed by systems as described in this disclosure, the same device may operate as first device 100 in a one iteration, a first destination device 300 and/or second destination device in another iteration, and/or a second device 300 in still another iteration. In other words, second device 300 may have received an office or home number, such as a telephone number from one or more calls as placed by or in system 1000 and/or system 2000, for instance as second caller ID as described above in reference to FIGS. 1 and 2; second device 300 may alternatively or additionally acquire a telephone number from alternative channels, contacts of second device 300 or the like. Call 310 may be placed via the PSTN 400. Upon receiving call 310, call is forwarded 710 via a first forwarding number to a server 200; server 200 may be or include any device or devices suitable for use as a server 200 as described above in reference to FIGS. 1 and 2, and server 200 may be server 200 of a system as described above in reference to FIGS. 1 and 2 or a distinct server. Call forwarding may be performed, without limitation, by any call-forwarding system implemented within a PSTN, including without limitation configuration of one or more switches, servers, or cloud servers (not shown) in PSTN to forward a call to first forwarding number; alternatively or additionally, call 710 may be forwarded by device 700. Call 710 to first forwarding number may be directed via PSTN to Server 200. Server 200 may be configured to associate first forwarding number with a first device 100, including without limitation a first device 100 as described above in reference to FIGS. 1 and 2, as described above; for instance, and without limitation, first forwarding number may be assigned to a port at server 200, a user account set up at server, or the like. As a result, server 200 may automatically determine that a call to first forwarding number, arriving at server, is to be forwarded to a first device 100 and/or any device specified by user account or other data structure or record associated with first forwarding number. Server 200 may further associate first forwarding number with device 700, permitting information concerning device 700 to be retrieved based on first forwarding number as well. First forwarding number may be unique, where "unique" signifies uniqueness as defined above in reference to FIGS. 1-2 and with regard to second telephone number. Server 200 may also associate first forwarding number to an application, which may include without limitation an app as described above in reference to FIGS. 1 and 2 and/or include a distinct or related application, running on a first device 100, which may be a personal mobile phone of a subscriber to an application running on server 200.

Still referring to FIG. 3, server 200 may generate server call data. Server call data may include any information that server 200 may forward or transmit to first device 100 regarding calls 310, 710, or further calls placed or connected by server 200 for forwarding calls 310, 710, including without limitation information describing device 700, third telephone number as dialed by second device 300, call 310, call 710, first device 100, and/or account information stored on server regarding first device 100. Server 200 may retrieve part of server call data from data stored at server 200 that is associated with first forwarding number, first device 100, and/or user account using link of first forwarding number to such data. Server 200 may receive part of server call data from PSTN as part of call 710.

Server 200 may assign a logo to first forwarding number and/or another datum associated with first forwarding number as described above. Alternatively or additionally, logo may be stored on first device 100, for instance in memory associated with app, as entered using app. Logo may be been selected by the app user to indicate a call being forwarded to the first device 100 from the telephone number assigned to use the first forwarding number; selection may, for instance, have occurred prior to placement of call 710. Logo may be specific to a particular number or set of numbers; this may, for instance, inform user who is calling, or what device is calling, permitting user to prepare to respond accordingly. Logo may include any visual indicator usable to indicate a call being forwarded to first device 100, including without limitation an image, emoticon, one or more elements of textual data, and/or any combination thereof. Server 200 may use various indicators such as a logo to indicate that a call is being forwarded to the first device 100 as would be appreciated by one or ordinary skill in the art having the benefit of this disclosure. For example, the server 200 may use a picture, text, a symbol, a design, or the like to indicate that a call is being forwarded to the first device 100.

Continuing to refer to FIG. 3, based on first forwarding number, an audio call 130 via PSTN 400 connects second device 300 to first device 100; this may be performed according to any suitable process for connecting two devices using a PSTN call, for instance as described above in reference to FIGS. 1-2. Server 200 may cause a screen or display 101 on the first device 100 to display information 125, which may include any data suitable for use as server call data as described above; information 125, or data usable by first device 100 to retrieve information 125, may be supplied over PSTN to first device 100. Information 125 may be displayed by first device 100 using a display typically used by first device to display call information received via PSTN, such as caller identification information received via PSTN. Server 200 may cause screen or display 101 to display an additional field 135. Additional field 135 may include any data suitable for use as server call data; in an embodiment, data displayed in additional field 135, and/or data usable by first device to retrieve data to be displayed in additional field 135, may be transmitted via a different channel than audio call 130, for instance as further illustrated below in reference to FIG. 4. As a non-limiting example, additional field 135 at first device 100 may include a pop up, such as a "toaster popup" or display on first device 100.

Still referring to FIG. 3, server 200 may cause first device 100 to display logo, for instance in additional field 135. Logo may include a logo selected by the app user to indicate that the call is being forwarded from a specific phone number, as described above. Thus, logo may inform a recipient using first device 100 that incoming call is being forwarded rather than originally being placed to the first device 100; logo may further indicate which device originated the call and/or information regarding device 700 such as a company associated with the device 700 or the like. Such information may be important to help the recipient decide how to answer the incoming call and/or whether to answer the incoming call. Likewise, information 125 may inform the recipient concerning the identity of the caller. Such information may also be important to help the recipient decide how to answer the incoming call and/or whether to answer the incoming call. In an embodiment, logo and/or information is transmitted to first device 100 and/or recipient device by server. Transmission may be performed by any means for data transmission from first device 100 to server, including without limitation transmission over a network such as the Internet, transmission via text messaging services, or any other suitable electronic communication. Alternatively or additionally, server 200 may transmit to first device 100 and/or recipient device a caller ID code; caller ID code, as used in this disclosure, may be a datum usable to retrieve information 125 and/or data to be displayed in additional field 135 at first device 100 and/or recipient device. For example, and without limitation, caller ID code may be a datum such as retrieval key, identifier, or the like which identifies a record stored at first device 100 and/or recipient device, or at a remote device such as server 200 in communication with first device 100 and/or recipient device, permitting retrieval; for instance, information 125 and/or data to be displayed in additional field 135 may be stored in a key-value data store, hash table, or the like, permitting lookup of information 125 using caller ID code. Caller ID code may alternatively or additionally be a data element containing information 125 and/or data to be displayed in additional field 135, or may be included in, stored with, and/or transmitted with information 125 and/or data to be displayed in additional field 135. Caller ID code may be information 125. Transmission of information 125 and/or data to be displayed in additional field 135 and/or caller ID code may be effected by a different channel than PSTN call to first device 100 and/or recipient device 300; caller ID code, information 125 and/or data to be displayed in additional field 135 may be included in PSTN call to first device and/or recipient device. Caller ID code may include a first portion sent via PSTN and a second portion sent via a different channel such as a text messaging service and/or packet-based network as described above.

Still referring to FIG. 3, information 125 and/or data to be displayed in additional field 135 may be provided from a contact list stored on a database 250 on or connected to the server 200; database may include, without limitation, a contacts database, wherein a predetermined contact associated with second device may be stored in the contacts database; predetermined contact may include an identifier that indicates that the audio call is being forwarded through server 200. Contact list may be created by importing a contact list native to first device 100; the imported contact list may be copied into the application creating a duplicate contact list. Duplicate contact list may add an indicator 126 (best shown in FIGS. 5 and 6) that indicates to the recipient of the call that the call is being forwarded through an app, which may include without limitation an app as described above in reference to FIGS. 1 and 2, on the first device 100. For example, and without limitation, indicator 126 may include an abbreviation of a name of application and/or app, and/or an abbreviation of a company or other entity name of an entity offering the service. Appended indicator 126 may also be used to differentiate between native contacts list and app contact list, which both may be stored on the first device 100 and/or on server 200. Information 125 and/or data to be displayed in additional field 135 may alternatively or additionally include any form of caller ID as described above in reference to FIGS. 1 and 2. It should be noted that call 310, 710 may be placed using any combination of steps for placement of call 110 as described above in reference to FIGS. 1 and 2. For instance, and without limitation, second device 300 may call using app as described above in reference to FIGS. 1 and 2 when placing call 310, in which case server 200 may include in information 125 caller ID associated with second device as described above in reference to FIGS. 1 and 2, which caller ID may be provided via an instance of app that is operating on second device 300. It should be noted as well that call forwarding using system 3000 may be performed after placement of call from first device 100 to second device 300 as described above in reference to FIGS. 1 and 2; forwarding number may, for instance, be first telephone number of first device 100, and number of device at location 700 may be second telephone number which is substituted for first telephone number, such that second device 300 is placing call 310 to a number provided to second device 300 using audio call 110 as described above in reference to FIGS. 1 and 2. In one or more embodiments, information 125 may include a list of caller IDs associated with each device of a plurality of devices on the call. In one or more embodiments, information 125 may include a subject identifier, which indicates the reason for the call. In one or more embodiments, subject identifier may be established by the device forwarding the call. In one or more non-limiting embodiments, subject identifier may include reasons for the call, such as a specific work matter, personal matter, or the like. For instance, and without limitation, subject identifier may include an image or text describing the subject matter of the call, such as, for example, a "Legal Dispute Resolution" or "Job Interview". In one or more embodiments, call may be forwarded to one or more devices of a plurality of recipient devices, where each device of the plurality of devices may receive information 125 in, for example, additional field 135, on corresponding displays.

Persons skilled in the art, upon reviewing the entirety of this disclosure, will be aware of various other ways in which individual method steps performed by systems 1000, 2000, and 3000 and/or components, devices, modules, or elements of systems 1000, 2000, and 3000 may be combined; all such combinations are contemplated as within the scope of this disclosure. The number, size, shape, and/or configuration of the first device 100, server 200, and/or the second device 300 are shown in FIG. 3 for illustrative purposes only and may be varied depending on the application as would be appreciated by one of ordinary skill in the art having the benefit of this disclosure. For example, the system 3000 may include one or more servers 200. Information 125 and/or logo may be provided from server 200 to first device 100 using any data channel or channels as described above in reference to FIGS. 1 and 2, including transmission over a network 600 and/or text messaging service 500.

With continued reference to FIG. 3, server 200 may cause additional field 135 at first device 100 to show the name and/or phone number of originating calling device 300 that has called device 700 and/or a number associated with device 700, and/or may cause first device 100 to display identifying information of device 700, including but not limited to name and caller ID associated with device 700. In other words, any information in server call data. In one or more embodiments, serve may cause additional field 135 at first device 100 to show the name and/or phone number of all devices currently on call, which is being forwarded to device 700. Server 200 may cause display of information 125 to include any server call data, including without limitation the name and/or phone number of originating calling device 300 that has called device 700 and/or a number associated with device 700, and/or may cause first device 100 to display identifying information of device 700, including but not limited to name and caller ID associated with device 700. For instance, in an embodiment, server 200 may send in audio call 130 and via PSTN call information describing originating device 300, to be displayed as information 125, and may send via a different channel such as network or text messaging services call information based on third telephone number, such as without limitation call information describing device 700, to be displayed in additional field 135. As another non-limiting example, server 200 may send in audio call 130 and via PSTN call information based on third telephone number, such as without limitation call information describing device 700, to be displayed as information 125, and may send via a different channel such as network or text messaging services call information describing originating device 300, to be displayed in additional field 135. Thus, either originating call information or call information associated with third telephone number and device 700 may be provided in either information 125 or additional field 135, depending on implementation; a user of first device 100 may enter an instruction specifying where each category of information is to be displayed. Display of information 125 and/or of additional field 135 may remain in place while incoming call from PSTN 400 is received and displayed on device 100 via display, which may be the native call receiving technology/display of device 100. Display may show incoming call information sent with inbound call from PSTN 400 that was forwarded to first device 100. Incoming call information may include name/caller ID or other information associated with device 700, and/or it may display name/number or other information about device 300. First device 100 may display information 125, additional display 135, logo, and/or PSTN call information before call is answered informing recipient of the individual and/or device 300 who originally placed the call and the fact that the call was forward through a secondary number of device 700.

Figure 4:
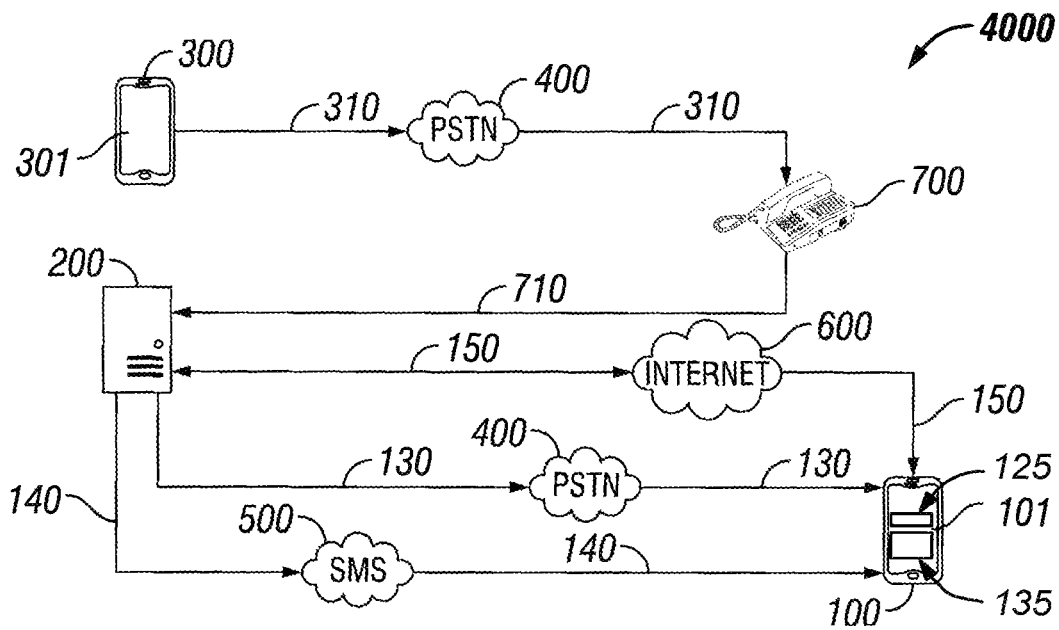
FIG. 4 shows a schematic of one embodiment of a system of the present disclosure for an inbound phone call forwarded from a different telephone number.

FIG. 4 shows a system 4000 for forwarding a telephone number. System 4000 of FIG. 4 is similar to system 3000 of FIG. 3. As such, a call 310 may be placed via PSTN 400 by a second device 300, which may be any second device as described above in reference to FIG. 3, to a device at a location 700, which may be any device at location 700 as described above in reference to FIG. 3, including without limitation an office or home device located at or identified by an office or home telephone number. Call 310 may be forwarded 710 via a first forwarding number to a server 200 as described above in reference to FIG. 3. Forwarding may be performed as described above in reference to FIG. 3. Server 200 assigns, or has assigned, first forwarding number to a user account and/or first device 100 and may further have assigned forwarding number to device at location 700; this may be performed, without limitation, as described above in reference to FIG. 3. Server 200 may also correspond first forwarding number to an application, which may include without limitation any app or other application as described above, running on a first device 100, which may include without limitation any first device 100 as described above in reference to FIGS. 1-2, including without limitation a personal mobile phone of a subscriber to application running on server 200. Server 200 may further generate server call data as described above in reference to FIG. 3, by retrieving data using first forwarding number and/or receiving data as part of call 710. Based on first forwarding number, an audio call 130 via the PSTN 400 connects second device 300 to first device 100. Upon receipt of audio call 130, first device 100 may request information 150, such as caller ID and/or contact information, from the server 200 via a network such as the Internet 600; alternatively or additionally, upon receipt of the audio call 130, the first device 100 may also, or instead, request information 140, such as caller ID and/or contact information, from the server 200 via a text messaging service as described above in reference to FIGS. 1 and 2, including without limitation SMS 500. Alternatively or additionally, data to be displayed in additional field 135 and/or logo, and/or data usable to retrieve such data and/or logo at first device 100 as described above in reference to FIG. 3 may be transmitted via network 600 and/or text messaging service 500 from server 200 to first device 100; data to be displayed as information 125, and/or data usable by first device 100 to retrieve information 125, may be transmitted via PSTN. Information 140, 150 may be displayed on the screen, or display, 101 on the first device 100, for instance on additional field 135. Alternatively or additionally, server 200 may cause first device 100 to display a logo that informs a recipient that incoming call is being forwarded rather than originally being placed to the first device 100 as discussed herein. Persons skilled in the art, upon reviewing the entirety of this disclosure, will be aware of various other ways in which individual method steps performed by systems 1000, 2000, 3000, and/or 4000 and/or components, devices, modules, or elements of systems 1000, 2000, 3000, and/or 4000 may be combined; all such combinations are contemplated as within the scope of this disclosure. The number, size, shape, and/or configuration of the first device 100, server 200, and/or the second device 300 are shown in FIG. 4 for illustrative purposes only and may be varied depending on the application as would be appreciated by one of ordinary skill in the art having the benefit of this disclosure. For example, the system 4000 may include one or more servers 200.

Figure 5:
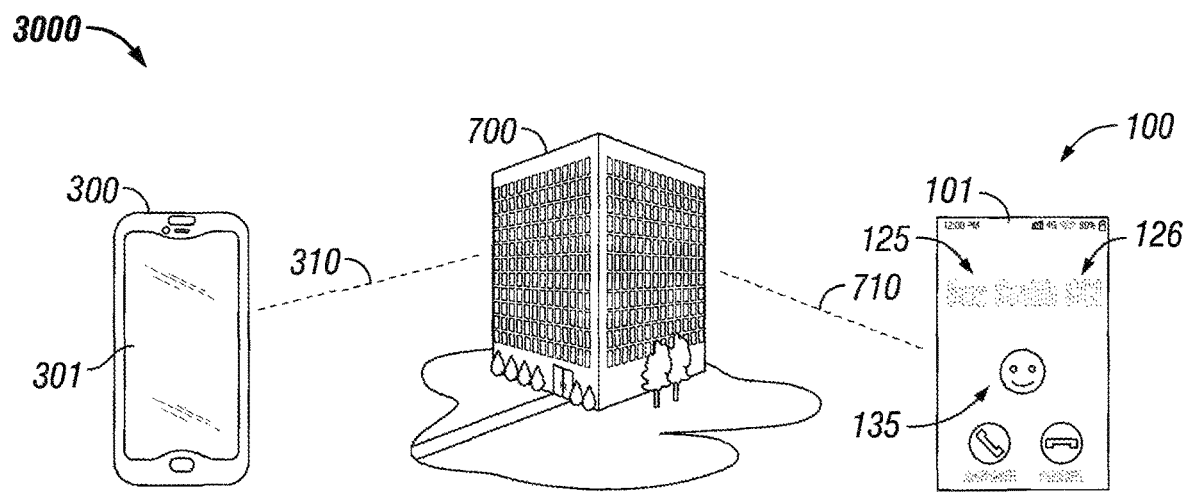
FIG. 5 shows a schematic of one embodiment of a system of the present disclosure for an inbound phone call forwarded from a different telephone number.

FIG. 5 shows a schematic a system 3000 for an inbound phone call 710 to be forwarded from a different telephone number. A second device 300, which may include any second device 300 as described above in reference to FIGS. 3 and 4 having a screen and/or display 101 places a call 301 to a phone number of a device at a location 700, which may include any device at location 700 as described above; this may be implemented, without limitation, as described above in reference to FIGS. 3 and 4. As discussed herein, a call 710 is forwarded to a first device 100; this may be implemented, without limitation, as described above in reference to FIGS. 3 and 4. System 3000 provides for screen 101 and/or display of first device 100 to display data, which may include a first logo, and which may be is associated with a phone number at location 700; this may be implemented, without limitation, as described above in reference to FIGS. 3 and 4. The system 3000 also provides for the screen 101 and/or display of the first device 100 to display information 125, as described above, which may include information related to the second device 300; this may be implemented, without limitation, as described above in reference to FIGS. 3 and 4. For example, information 125 may include a contact name or caller ID associated with the second device 300; any other example as described above in reference to FIGS. 3-4 is likewise contemplated here. System 3000 also may provide for screen 101 and/or of first device 100 to display an indicator 126 that further indicates that a call is being forwarded rather being initially placed to the first device 100; this may be implemented, without limitation, as described above in reference to FIGS. 3 and 4. Recipient may then be better informed whether to answer the call and/or how best to answer the call. The size, shape, location, and/or configuration of the caller information, 125, indicator 126, and/or first logo are shown in FIG. 5 for illustrative purposes and may be varied depending on the application as would be appreciated by one of ordinary skill in the art having the benefit of this disclosure.

Figure 6:
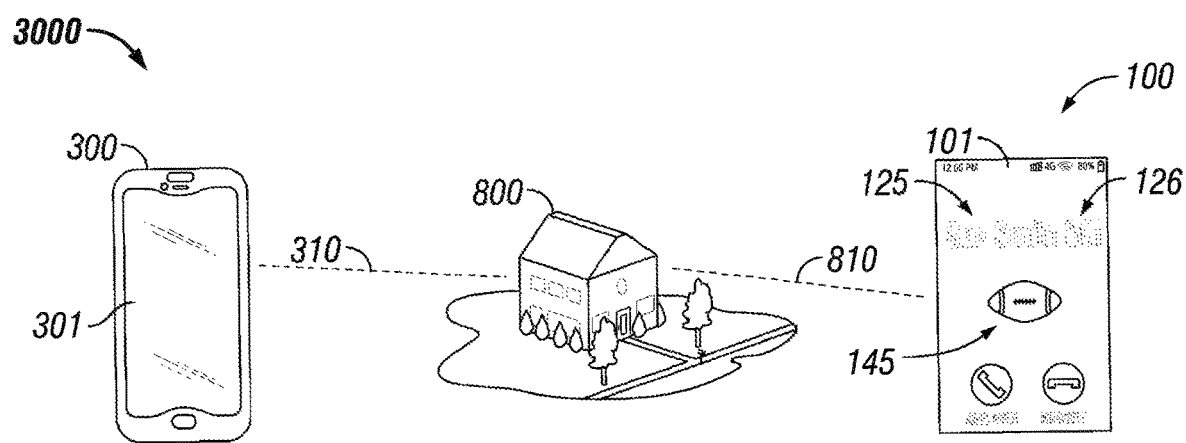
FIG. 6 shows a schematic of one embodiment of a system of the present disclosure for an inbound phone call forwarded from a different telephone number.

FIG. 6 shows a schematic a system 3000 for an inbound phone call 710 to be forwarded from a different telephone number. A second device 300, which may include any second device 300 as described above, having a screen, or display, 301 places a call 301 to a number at a location 800 that differs from the number and location 700 of FIG. 5; this may be implemented, without limitation, as described above in reference to FIGS. 3 and 4. As discussed herein, a second forwarding number associated with the phone number at the location 800 may forward call 810 to first device 100 via server 200; this may be implemented, without limitation, as described above in reference to FIGS. 3 and 4. System 3000 may provide for any display of any information as described above in reference to FIGS. 3-4, including display of a second logo 145, which may, without limitation, be associated with a phone number at second location 800; this may be implemented, without limitation, as described above in reference to FIGS. 3 and 4. System 3000 also provides for the screen 101 of the first device 100 to display information 125 as described above, which may include without limitation related to second device 300 and/or location 800; this may be implemented, without limitation, as described above in reference to FIGS. 3 and 4. For example, information 125 may include a contact name or caller ID associated with second device 300. System 3000 may also provide for screen and/or display 101 of first device 100 to display an indicator 126 that further indicates that the call is being forwarded rather being initially placed to the first device 100; this may be implemented, without limitation, as described above in reference to FIGS. 3 and 4. A recipient may then be better informed whether to answer the call and/or how best to answer the call. Size, shape, location, and/or configuration of the caller information, 125, indicator 126, and/or second logo 145 are shown in FIG. 6 for illustrative purposes and may be varied depending on the application as would be appreciated by one of ordinary skill in the art having the benefit of this disclosure.

Referring to FIGS. 3-6, an apparatus for call placement may be consistent with any system or apparatus for call placement described in this disclosure. In some embodiments, call placement may include forwarding a call. In other embodiments, call placement may include conference calling. The apparatus may include a processor and at least a memory as disclosed in this disclosure. The memory may be communicatively connected to the processor and contain instructions configuring processor to execute any of the described processes or steps described in FIGS. 3-6. Apparatus may be configured to receive a first call from a first device associated with a first telephone number. First device may be consistent with first device 100 as described throughout this disclosure. First call may be consistent with any call disclosed in this disclosure. First call may be placed over any calling network, or communication network. As non-limiting examples, the calling network may include the PTSN, a VOIP app, the internet, LTE, 5G, a mobile calling app, and the like. First call may be a call placed by a first user. First user may be referred to as the "call initiator." For instance, and without limitation, memory may include instructions configuring processor to initiate a call between a first device associated with a first telephone number and a second device associated with a second telephone number over a communication network. The call may be initiated by first device directly communicating with second device. In other embodiments, the call may be initiated by first device indirectly communicating with the second device via, for example, an intermediary device or system, such as a server.

With continued reference to FIGS. 3-6, the apparatus is configured to receive a selection of a third device. This selection may be received via user input. User input may include selecting a device to forward the first call to. In some embodiments, user input may include selecting a recipient to forward the first call to. For instance, and without limitation, one or more recipient devices may be a recipient that first call may be forwarded to. For example, and without limitation, a third device of a plurality of recipient devices may be selected for a call to be forwarded to. More specifically, memory may include instructions configuring processor to receive a selection of at least a third device of a plurality of recipient devices, where a user if the first device or the second device may select the third device, as discussed previously in this disclosure. In some embodiments, user input may include selecting a contact to forward the first call to. In some embodiments, user input may include selecting a device to add to the call. In some embodiments, user input may include selecting a recipient to add to the call. In some embodiments, user input may include selecting a contact to add to the call. In some embodiments, user input may be received by having a user select an option from a list or menu. For example, and without limitation, an option may be selected from a drop-down list, a scrollable list or menu, a table, or the like. In some embodiments, user input may be received via text input from a user. Text input may include a contact name, recipient name, or a phone number. In some embodiments, user input may be received in an app as disclosed in this disclosure. In some embodiments, user input may be dialed using, for example, a dial pad. In some embodiments, user input may include a voice command indicating what telephone number to call by, for example and without limitation, a user stating a name or a telephone number of one or more recipients. In some embodiments, user input may be received using an app as disclosed in this disclosure.

With continued reference to FIGS. 3-6, apparatus may be configured to send a notification to at least the third device of the plurality of recipient devices. Notification may be sent directly to third device, or it may be sent through an intermediary, such as a server. Notification may be consistent with notification 170 disclosed with reference to FIG. 11A and FIG. 11B. Notification may include a caller ID of a user, such as a user of first device or second device. For instance, and without limitation, notification may include a caller ID of the initiator of the call, such as for a forwarding call. In another instance, and without limitation, notification may include caller IDs of every caller currently on the call, such as during a conference call. Caller ID may be consistent with any caller ID disclosed as part of this disclosure. Caller ID may include the name of a user, the telephone number of a user, the username of a user, a subject identifier, and/or the like. The user may be the user of the apparatus. The user may be the user responsible for selection of the third device. In some embodiments, if recipient user does not have a corresponding app, then notification may be sent via a text notification. In other embodiments, if the recipient user does not have a corresponding app, then notification may be an audio notification. For example, and without limitation, third device may receive a phone call that announces inbound call from an initiator, such as a name or number of current participants (e.g., first user and second user). In various embodiments, the notification may include an accept option and a decline option. Accept option may include an "accept" button or a "join call" button as disclosed in this disclosure. The decline option may include a "decline" button, "refuse" button, "ignore" button, and the like. A recipient user of a recipient device such as, for example, the third device, may elect an option using various selection means. For instance, recipient user may use a physical actuator, such as a button of recipient device that may be depressed to select an option, or a display, such as a touchscreen of recipient device that may be pressed in a designated area representing a particular option. A person of ordinary skill in the art, after having reviewed the entirety of this disclosure, would appreciate that there are a variety of possible permutations for the accept option and the decline option. In some embodiments, notification may include a send to voicemail option. Send to voicemail option may be consistent with the send to voicemail option disclosed with reference to FIG. 11.

Still referring to FIGS. 3-6, an invitation to join a call may occur over a publicly switched telephone network, where the notification may be sent to the server that is configured to receive call joining information from first device through, for example and without limitation, a data pathway of a communication network (e.g., Internet, WiFI, 5G, or any other pathway where data can be transferred). In one or more embodiments, first device may invite one or more users, such as a plurality of users, to join the call even if the call was not initiated or received via a connection to the SCI App.

When on a person/phone number which is desired to be added to a call, The First Phone user will open the SCI App, select the individual or individuals to whom they are requesting to join the call. Then, information will be sent to server via a data pathway. The information will include the name and/or phone number of the individual to who is inviting people into a call, the name and or phone number of the other individuals who are on the call, name and or phone number of the person or people who are being invited to the call, and possibly include additional information regarding the invitation to the call.

Still referring to FIGS. 3-6, in some embodiments, notification may include a description, such as a subject identifier, as previously discussed in this disclosure. Description may include a reason for forwarding the call, such as "important client call," "busy," "regarding purchasing," and the like. A person of ordinary skill in the art, after having reviewed the entirety of this disclosure, would appreciate that a variety of reasons for forwarding the call may exist. In some embodiments, the description may include a reason for adding the user to the call. Reasons for forwarding the call or adding the user to the call may be received by apparatus via selection by menu, selection of an item in a list, or via text entry. Notification may be sent using a PTSN, a VoIP app, the internet, LTE, 5G, a mobile calling app, and the like. In some embodiments, the notification may be sent using a different pathway from the second call. As a non-limiting example, the notification may be sent over the internet, while the second call may use a PTSN. As another non-limiting example, the second call may be sent using a mobile calling app, while the notification is sent using cellular data, such as LTE, 5G, or the like. In some embodiments, notification may be sent over a cellular network such as using SMS or MMS. In some embodiments, notification may be sent using a phone call (such as a phone call over PTSN, a VoIP app, the internet, LTE, 5G, a mobile calling app, and the like). In this embodiments, the phone call may include an audio read-out of the contents of the notification. In some embodiments, the third device may be associated with a third device user. In some embodiments, sending the notification to the third device comprises sending the notification to a plurality of devices, wherein each of the plurality of devices is associated with the third device user. For example, third device may be a smart phone associated with third device user; third device user may also be associated with a laptop and desktop. In this case, sending the notification to the third device may comprise sending the notification to the third device, laptop and desktop.

With continued reference to FIGS. 3-6, apparatus is configured to receive a notification response, where the notification response includes a selection between the accept option and the decline option. As a non-limiting example, the notification response may include a selection of the accept option. This may indicate that a user of the third device is willing to accept the forwarding of the call. In some embodiments, this may indicate that a user of the third device is willing to be added to the call. For example, and without limitation, memory contains instruction further configuring the processor to forward the call to the at least a third device if the at least a third device selects the accept option. In one or more embodiments, the call may be forwarded to a recipient device, such as third device, which does not use a corresponding application via a communication network. If the recipient user accepts the call, then the app may be automatically opened for the recipient user.

Still referring to FIGS. 3-6, as a non-limiting example, the notification response may include a selection of the decline option. This may indicate that a user of the third device is unwilling to accept the forwarding of the call. In some embodiments, this may indicate that the user of the third device is unwilling to be added to the call. For example, and without limitation, memory contains instructions further configuring the processor to reject the call if the at least a third device selects the decline option. In some embodiments, notification response may be sent using SMS or MMS. In some embodiments, the decline option may include a rerouting of the forwarded call to a voicemail of the recipient device. In one or more embodiments, user of first device or second device may be notified if recipient user decides to reject the call and select the decline option. In some embodiments, the decline notification sent to the initiator (e.g., the user that forwarded the call) or all members of the current call (e.g., such as the users of the first device and second device) may include a reason for the declined call. For instance, and without limitation, after selecting the decline option, recipient user may be prompted to provide a reason for the decline. For example, and without limitation, recipient user may send a decline notification with additional information that includes a reason for declining the call, such as a "busy," "driving," "in a meeting," or the like. Additional information may also include a preferred callback time in addition to the decline option. In one or more embodiments, notifications may be shown on the display of the user devices, as previously mentioned in this disclosure. A graphical user interface (GUI) may be implemented to show the information in various arrangements. A user may navigate one or more menus of GUI to select options and or interact with presented notifications that are described in this disclosure.

Still referring to FIG. 1, in the case of a forwarded call or a conference call, if the recipient user, such as the third user of the third device, accepts the call, the first user of the first device may exit the call while the second user and the third user continue the forwarded call. In various embodiments, after exiting the call, the first user may reenter the call. For instance, and without limitation, the first caller may select a "reconnect" option in a menu of an app to rejoin the call that is still occurring between second user and third user. In a nonlimiting embodiment, when first user reconnects to the call, the phone may ring before allowing first user to rejoin the call. When the first user rejoins the call, the second user and the third user may receive a visual or audio alert that the first user has rejoined the call. For instance, and without limitation, an audio rejoin notification may include the first user's name, telephone number, or username being announced. In another instance, a visual rejoin notification may include a notice appearing on display of second user device and third user device, where the notice may include the first user's name, telephone number, and username in addition to the notice announcing that the user has rejoined the call, as discussed further below.

With continued reference to FIGS. 3-6, apparatus may be configured to receive a device selection from recipient device, such as third device, where the device selection includes a selected forward device. For instance, and without limitation, a user of recipient device may select an accept option to receive a forwarded call; a second menu may subsequently appear that allows user to select a device to receive the forwarded call on. For example, and without limitation, a recipient of a forward call using third device may select accept option, where a secondary notification may appear prompting user to elect a selected forward device to receive the forwarded call on, such as third device, any other device associated with the third phone number of the third device (e.g., a device using the app associated with the third telephone number). The selected forward device may be consistent with any device disclosed as part of this disclosure. The selected forward device may include a PC, mobile device, mobile phone, smart phone, laptop, desktop, tablet, VOIP phone, desk phone, and the like. In some embodiments, apparatus may be configured to receive a device selection from the third device, wherein the device selection comprises selecting an added device. The selected added device may be consistent with any device disclosed as part of this disclosure. The selected added device may include a PC, mobile device, mobile phone, smart phone, laptop, desktop, tablet, VOIP phone, desk phone, and the like. In various embodiments, any parties of the call may terminate the call or exit from the call. For instance, recipient user of third device may exit forwarded call any time after joining (e.g., accepting) the call.

With continued reference to FIGS. 3-6, apparatus may initiate a second call with the selected forward device and/or the selected added device. This may occur as a result of receiving the device selection from the third device. Second call may be placed over any calling network and/or or communication network. As non-limiting examples, the calling network may include the PTSN, a VOIP app, the internet, LTE, 5G, a mobile calling app, and the like. First call may be a call placed by a first user. In some embodiments, second call may be placed to an app on the selected forward device, or to the dialer of the selected forward device. In some embodiments, second call may be placed to an app on the selected added device, or to the dialer of the selected added device. In some embodiments, apparatus may be configured to merge the first call and the second call. For the purposes of this disclosure, "merging" calls is combining calls such that the parties to all of the calls are in communication with each other. As a non-limiting example, server 200 may merge the first call and the second call. Merging the calls may be carried out using any suitable method disclosed as part of this disclosure. In some embodiments, apparatus may be configured to end the first call as a function of initiating the second call with the selected forward device. In some embodiments, apparatus may be configured to end the first call at the request of the user of an apparatus. In some embodiments, apparatus may be configured to rejoin the merged first and second call.

With continued reference to FIGS. 3-6, in some embodiments, a rejoin notification may be triggered if the apparatus rejoins the merged first and second call. A "rejoin notification," for the purposes of this disclosure, is a notification intended to alert users that a user that had previously been part of the call is rejoining the call. Rejoin notification may be consistent with notification 170. Rejoin notification may comprise a Caller ID, name, username, and/or phone number of the user rejoining the call. Rejoin notification may be sent over a PTSN, a VOIP app, the internet, LTE, 5G, a mobile calling app, and the like. In some embodiments, rejoin notification may comprise an audio notification. Audio notification may include a sound such as a beep, alarm, ring, and the like, which may play when the user rejoins the call. Audio notification may include an audio read-out of the user's name, username, caller ID, telephone number, and the like. Audio notification may play over the merged first and second call. Audio notification may be sent over a PTSN, a VOIP app, the internet, LTE, 5G, a mobile calling app, and the like. In some embodiments, as a result of the user of third device selecting the accept option, third device may initiate a second call with a sever (e.g. server 200). Server 200 may merge first call and second call. In some embodiments, as a result of the user of third device selecting the accept option, third device may initiate a second call to a telephone number received as part of the notification. The telephone number may be a number for apparatus or for first device.

With continued reference to FIGS. 3-6, in some embodiments, a join notification may be triggered, when an added device or forward device is added to the call, such that the added device or forward device is in communication with first device. Join notification may be consistent with notification 170. A "join notification," for the purposes of this disclosure, is a notification intended to alert users that a new user is joining their call. Join notification may comprise a Caller ID, name, username, and/or phone number of the user joining the call. Join notification may be sent over a PTSN, a VoIP app, the internet, LTE, 5G, a mobile calling app, and the like. In some embodiments, join notification may comprise an audio notification. Audio notification may include a sound such as a beep, alarm, ring, and the like, which may play when the user joins the call. Audio notification may include an audio read-out of the user's name, username, caller ID, telephone number, and the like. Audio notification may play over the merged first and second call. Audio notification may be sent over a PTSN, a VoIP app, the internet, LTE, 5G, a mobile calling app, and the like. In some embodiments, as a result of the user of third device selecting the accept option, third device may initiate a second call with a sever (e.g., server 200). Server 200 may merge first call and second call. In some embodiments, as a result of the user of third device selecting the accept option, third device may initiate a second call to a telephone number received as part of the notification. The telephone number may be a number for apparatus or for first device.

With continued reference to FIGS. 3-6, the notification response may include at least a rejection reason. The rejection reason may comprise a reason for choosing the decline option. The rejection reason may include text. The text may be text entered by a user of third device. In some embodiments, the user of third device may manually enter a rejection reason using text entry, for example, using an on-screen keyboard, physical keyboard, voice recognition, and the like. In some embodiments, the user of the third device may choose the rejection reason from a list of rejection reasons, for example using a menu, drop-down menu, scrollable list, list, and the like. As non-limiting example, rejection reasons may include "busy," "out-of-office," "in a meeting," and the like. A person of ordinary skill in the art, after having reviewed the entirety of this disclosure, would appreciate that a variety of rejection reasons may be possible depending on the situation confronted.

With continued reference to FIGS. 3-6, notification may expire after a set period of time. As non-limiting examples, notification may expire after 10 seconds, 30 seconds, 1 minute, 5 minutes, and the like. When the notification expires, it may no longer display on third device. Alternatively or additionally, when notification expires, a user of third device may no longer be able to select the accept and/or decline option. When notification expires, apparatus may receive a lapse notification, saying that the notification was not responded to.

Figure 9:
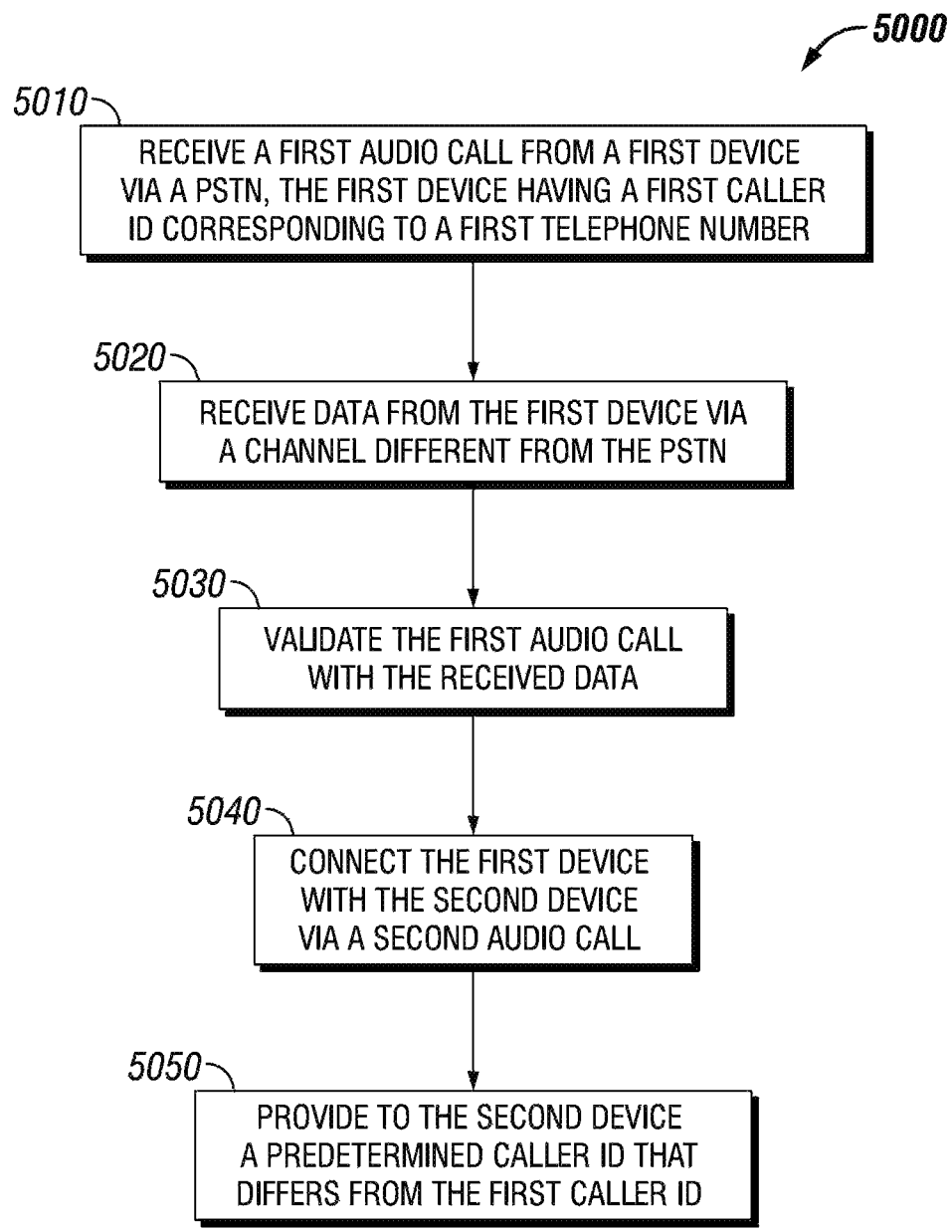
FIG. 9 is a flow chart of an embodiment of a method disclosed herein.

FIG. 9 is a flow chart of an embodiment of a method 5000 for providing a predetermined caller ID. The method 5000 includes receiving a first audio call from a first device via a PSTN, the first device having a first caller ID corresponding to a first telephone number, at 5010; this may be implemented, without limitation, as described above in reference to FIGS. 1 and 2. For example, server 200, as described above in reference to FIGS. 1-6, may receive an audio call 110, as described above in reference to FIGS. 1-2, via PSTN 400 as described above in reference to FIGS. 1-2, from a first device 100 as described above in reference to FIGS. 1-2. Method 5000 includes receiving data from the first device via a channel different from the PSTN, at 5020; this may be implemented, without limitation, as described above in reference to FIGS. 1 and 2. For example, server 200 may receive data 120 via SMS 500 or via the Internet 600, for instance as described above in reference to FIGS. 1 and 2. Receiving data may include receiving a telephone number associated with the first destination device and the predetermined caller ID. Receiving data may include receiving a username and a password.

Still referring to FIG. 9, method 5000 includes validating the first audio call with received data, at 5030; this may be implemented, without limitation, as described above in reference to FIGS. 1 and 2. For example, server 200 may use data 120 from first device 100 to validate audio call 110 from the first device 100, for instance as described above in reference to FIGS. 1 and 2. Method 5000 includes connecting the first device with the second device via a second audio call, at 5040; this may be implemented, without limitation, as described above in reference to FIGS. 1 and 2. For example, after server 200 validates first audio call 110 from first device 100, the server may connect the first device 100 with second device 300 using a second audio call 210 via PSTN 400, for instance as described above in reference to FIGS. 1 and 2. Method 5000 includes providing the second device a predetermined caller ID that differs from the first caller ID, at 5050; this may be implemented, without limitation, as described above in reference to FIGS. 1 and 2. For example, first device 100 may have a first caller ID and server 200 may causes a screen 301 of second device 300 to display a predetermined caller ID 225 that differs from first caller ID, for instance as described above in reference to FIGS. 1 and 2.

Figure 10:
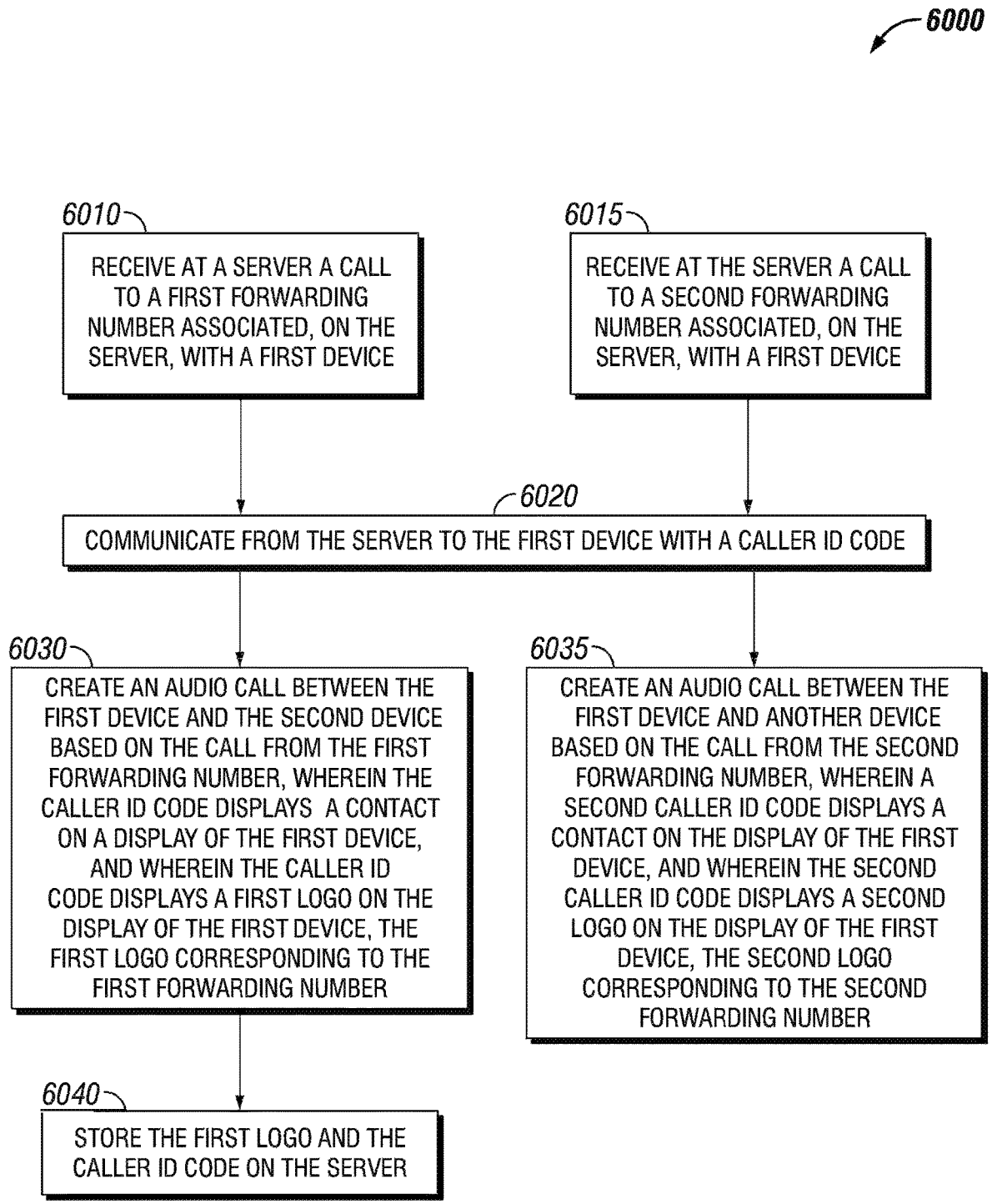
FIG. 10 is a flow chart of an embodiment of a method disclosed herein.

FIG. 10 is a flow chart of an embodiment of a method 6000 for forwarding a telephone call. Method 6000 includes receiving at a server a call to a first forwarding number associated, on the server, with a first device, at 6010; this may be implemented, without limitation, as described above in reference to FIGS. 3-6. For example, a server 200 may receive a call 710 to a first forwarding number associated with a first device 100, for instance as described above in reference to FIGS. 3-6. Method 6000 includes communicating from the server to the first device with a caller ID code, at 6020; this may be implemented, without limitation, as described above in reference to FIGS. 3-6. For example, server 200 may communicate a contact or caller ID related to the call, for instance as described above in reference to FIGS. 3-6. Method 6000 includes creating an audio call between the first device and a second device based on the call from the first forwarding number, wherein the caller ID code displays a contact on a display of the first device, and wherein the caller ID code displays a first logo on the display of the first device, the first logo corresponding to the first forwarding number, at 6030; this may be implemented, without limitation, as described above in reference to FIGS. 3-6. For example, server 200 may create an audio call between first device 100 and a second device 300, for instance as described above in reference to FIGS. 3-6. Audio call may be made, without limitation, over PSTN 400. Caller ID code may cause a screen and/or or display 101 of first device 100 to display a caller information 125, for instance as described above in reference to FIGS. 3-6. Caller ID code may cause screen and/or display, 101 of first device 100 to display a first logo, for instance as described above in reference to FIGS. 3-6. First logo may correspond to a first location 700 or, more specifically, a telephone number at the first location 700, for instance as described above in reference to FIGS. 3-6. Method 6000 may include displaying, or causing to be displayed, a notification on display 101 of first device 101 prior to creating the audio call between the first device 100 and second device 300; the notification may include caller ID information regarding the second device. Telephone number at first location does not necessarily need to be stationary; for example, the telephone number may correspond to a mobile phone as would be appreciated by one of ordinary skill in the art having the benefit of this disclosure.

Still referring to FIG. 10, method 6000 may include storing the first logo and the caller ID code on the server, at 6040; this may be implemented, without limitation, as described above in reference to FIGS. 3-6. For example, first logo and the caller ID code may be stored in a database 250 on server 200, for instance as described above in reference to FIGS. 3-6. Method 6000 may include receiving at the server a call from a second forwarding number associated, on the server, with the first device, at 6015; this may be implemented, without limitation, as described above in reference to FIGS. 3-6. For example, server 200 may receive a call 810 from a second forwarding number associated with first device 100, for instance as described above in reference to FIGS. 3-6. Method 6000 includes communicating from server to first device with a caller ID code, at 6020; this may be implemented, without limitation, as described above in reference to FIGS. 3-6. For example, server 200 may communicate a contact or caller ID related to the call, for instance as described above in reference to FIGS. 3-6. Method 6000 includes creating an audio call between first device and another device based on call from second forwarding number; a second caller ID code displaying a contact on the display of the first device may be included wherein the second caller ID code may display a second logo on display of the first device, the second logo corresponding to the second forwarding number, at 6035; this may be implemented, without limitation, as described above in reference to FIGS. 3-6. For example, the server 200 may create an audio call between first device 100 and another device, which may be second device 300, for instance as described above in reference to FIGS. 3-6. Caller ID code may cause screen and/or display, 101 of first device 100 to display caller information 125, which may be a contact, for instance as described above in reference to FIGS. 3-6. Caller ID code may cause screen and/or display 101 of first device 100 to display a second logo 145, for instance as described above in reference to FIGS. 3-6. Second logo 145 may correspond to a second location 800 or, more specifically, a telephone number at second location 800, for instance as described above in reference to FIGS. 3-6. Telephone number at the second location does not necessarily need to be stationary. For example, telephone number may correspond to a mobile phone as would be appreciated by one of ordinary skill in the art having the benefit of this disclosure.

Figure 11B:
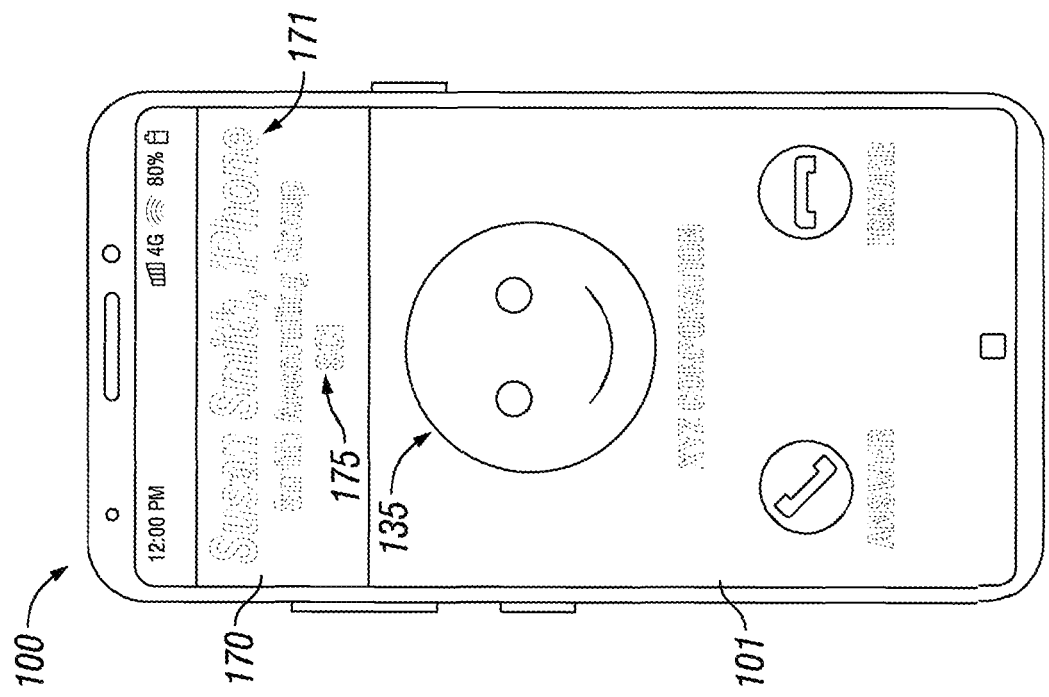
FIG. 11B shows a schematic of a device receiving a forwarded call.
Figure 11A:
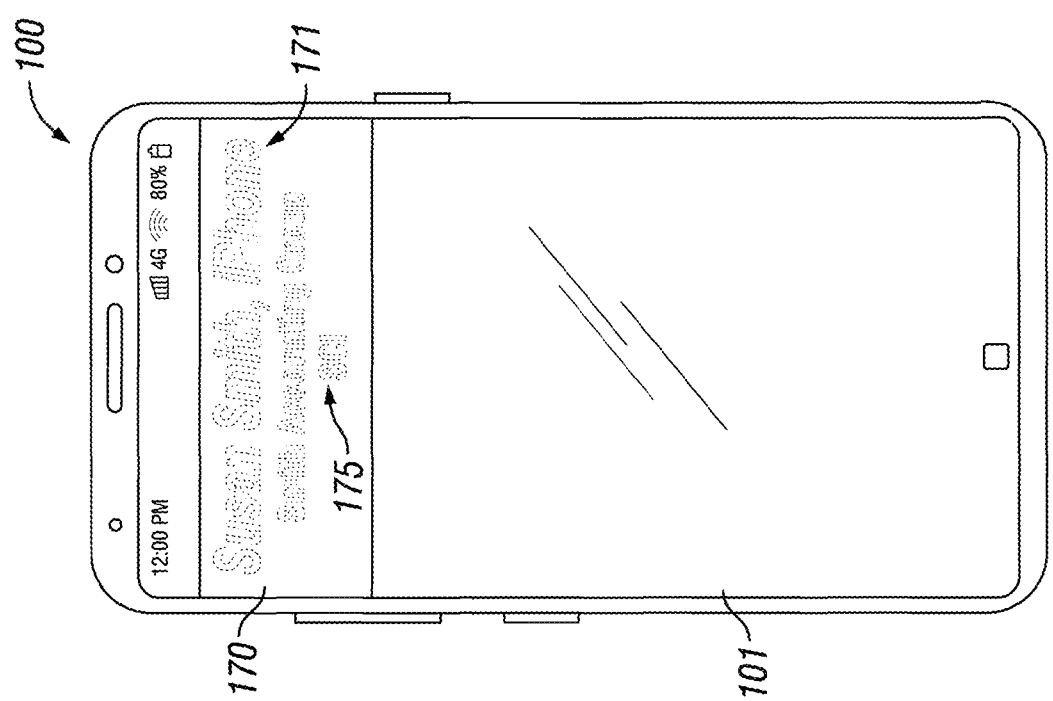
FIG. 11A shows a schematic of a device receiving a notification of incoming forwarded call to be received shortly.

FIG. 11A shows a schematic of a device 100 receiving a notification 170 on a screen and/or display 101 of a device 100 such as without limitation first device 100 as described above in reference to FIGS. 1-6. Notification 170 may be received according to any method or method steps as described above. Notification 170 may be displayed as information 125 as described above in reference to FIGS. 3 and 4. Notification 170 may indicate an incoming forwarded call to be received shortly. The notification 170 may, as a non-limiting example, indicate an identification 171 of the caller, who may include the originating caller, and/or information regarding a device 700, 800 or telephone number to which forwarded call was initially directed. The identification 171 may include any information to identify a caller, number, device, or the like, including without limitation a contact name and/or caller ID. The notification 170 may also include an indicator 175 that the call to be received is being forwarded through an application on the device 100. The notification 170 may be displayed, as a non-limiting example, as a banner located on the upper portion of the screen 101. The location, size, and/or configuration of the notification 170 is shown in FIG. 11A for illustrative purposes and may be varied depending on the application as would be appreciated by one of ordinary skill in the art having the benefit of this disclosure.

FIG. 11B shows a schematic of a device 100 receiving an incoming forward call with the notification 170 remaining on a screen and/or display 101 of a device 100 such as without limitation first device 100 as described above in reference to FIGS. 1-6. Device 100 and/or display 101 may include an additional field 135; additional field 135 may display any information as described above in reference to FIGS. 3-4, including without limitation a logo, a company or entity name, or the like. As discussed herein, logo may be assigned to a specific forwarding number and thus, indicate the recipient the telephone number and/or device the call is being forwarded from; for instance, and without limitation, logo may be associated with a business or other enterprise with whom the recipient may be affiliated, and at whom device 700 or 800 may be located. The notification 170 and the logo may provide that the recipient is better informed on how to and/or whether to answer the incoming call. Location, size, and/or configuration of the logo is shown in FIG. 11B for illustrative purposes and may be varied depending on the application as would be appreciated by one of ordinary skill in the art having the benefit of this disclosure. As noted above in reference to FIGS. 3-4, any information that is or may be included in server call data may be included in either of information 125 or additional field 135; for instance, and as a further non-limiting example, caller identification associated with an originating caller may be displayed in additional field 135 while information concerning number or device from which call is forwarded may be displayed as information 125.

Further referring to FIG. 11B, display elements may include at least an option provided to a user of device, such as without limitation, at least an option that the user may select by pressing a button or otherwise activating an event handler associated with a graphical user interface. Options may include without limitation options to accept an incoming call, which may for example be associated with an "Accept" button or equivalent. Options may include options to send an incoming call to voicemail, which may for instance be associated with a "Send to Office VM" and/or "Send to VM" button or equivalent, and which may send to any preconfigured voicemail account and/or any voicemail account specified by further user inputs. Options may include an option to forward a call such as an incoming call, which may for instance be associated with a "Forward Call" button or equivalent, and which may be activated during initial reception of call and/or at any time while a call is active; call forwarding may be accomplished by any call forwarding process, including without limitation any process, process step, and/or combination thereof as described in this disclosure for call forwarding. Options may include an option to create a conference call, which may be associated, for instance, with a "Create Conference Call" button, and which may be activated during initial reception of call and/or at any time while a call is active; a conference call may be generated by merging any two or more calls, each of which may be initiated, prior to, after, and/or as a result of selecting this option, in any manner for initiation of calls, including without limitation any process, process step, and/ or combination thereof as described in this disclosure for initiation, placement, connection, forwarding, and/or otherwise enabling phone calls. Options may include an option to join a call, which may be associated, without limitation, with a "Join Call" button; this option may be provided, for instance, to two or more telephones and/or telephonically enabled devices such as, without limitation, a device of a secondary recipient, such as a co-worker, supervisor, assistant, or the like of a person initially receiving a call, which secondary recipient may receive a notification via a mobile application or other technology described in this disclosure that the person initially receiving the call is receiving, has joined, and/or has performed any other action as described in this disclosure with the call. Thus, for instance, secondary recipient may join any call answered by primary recipient by selecting a "Join Call" option, causing initiation and/or conferencing of a second call with the call according to any process, process step, and/or combination thereof as described in this disclosure; initial recipient may remain on the call and/or may have call terminated, and/or initial recipient may receive, on a display, a notification that secondary recipient has joined the call. Notifications of incoming calls, with any of the options described above, may be transmitted to two or more devices, including without limitation primary and/or secondary recipients, or multiple potential recipients as described in further detail in this disclosure.

Figure 12:
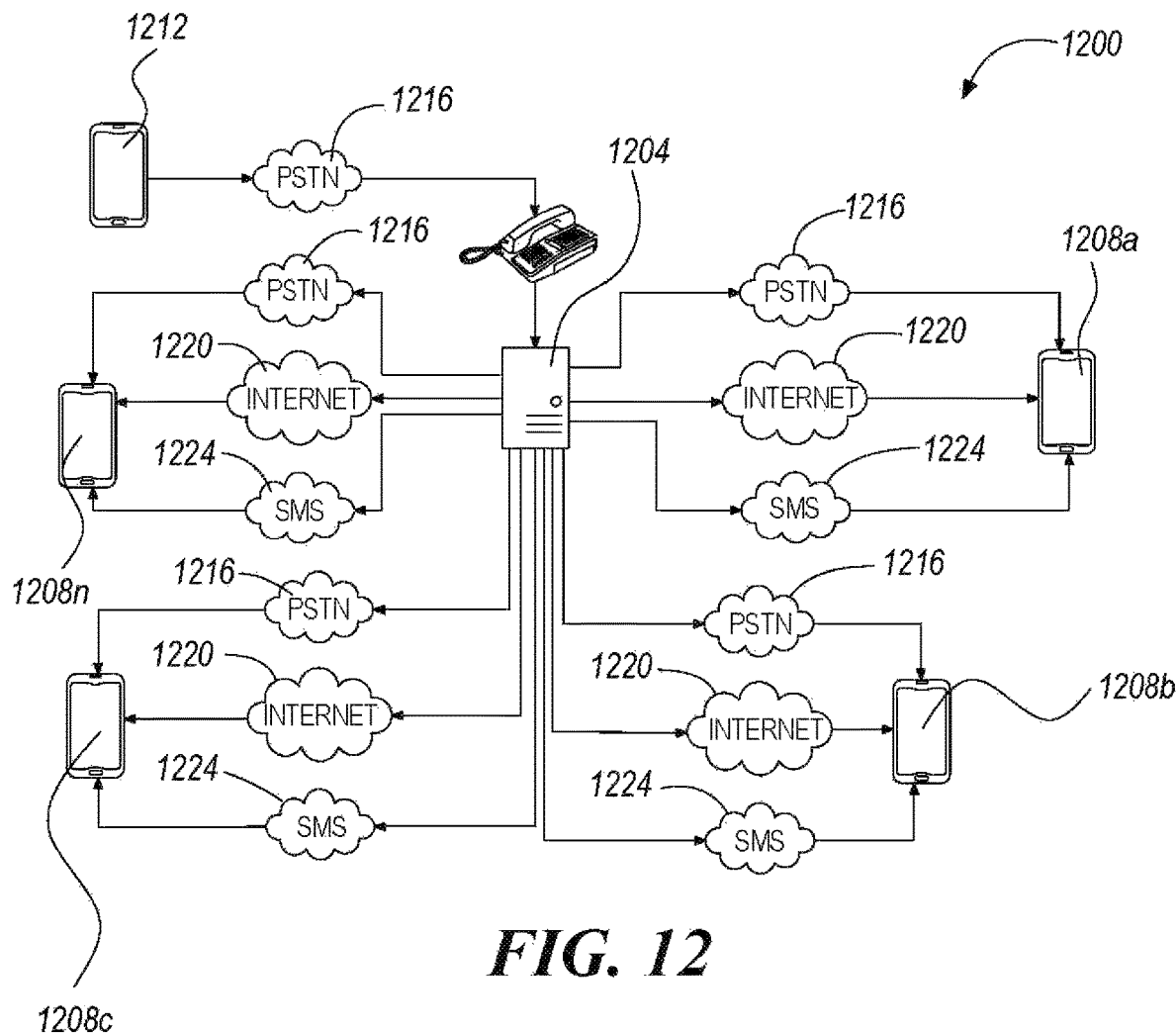
FIG. 12 shows a schematic diagram of one embodiment of a system of the present disclosure for an inbound phone call forwarded from a different telephone number to multiple telephones.

Turning now to FIG. 12, an exemplary embodiment of a system 1200 for providing call forwarding over a publicly switched telephone network. Elements of system 1200 may be implemented in any manner suitable for implementation of elements of systems 1000, 2000, 3000, and/or 4000; similarly, elements of systems 1000, 2000, 3000, and/or 4000 may be implemented in any manner suitable for implementation of system 1200. System 1200 includes a server 1204. Server 1204 may include any computing device and/or combination of computing devices as described in this disclosure, including without limitation any device suitable for use as a server as described in this disclosure. Server 1204 may connect to a plurality of recipient devices 1208a-n; each of plurality of recipient devices 1208a-n may include, without limitation, any recipient device as described in this disclosure. Server may connect to at least a second device 1212 having a second telephone number; at least a second device 1212 may be implemented, without limitation, in any manner suitable for implementation of a second device as described above in reference to FIG. 4.

Server 1204 may communicate with any of second device 1212 and/or plurality of recipient devices 1208a-n by way of any suitable protocol for electronic communication as described above in reference to FIGS. 1-11B. For instance, and without limitation, server 1204 may communicate with of second device 1212 and/or plurality of recipient devices 1208a-n via a PSTN 1216, which may be implemented as described above in reference to FIGS. 1-11B. As a further non-limiting example, server 1204 may communicate with of second device 1212 and/or plurality of recipient devices 1208a-n via a text-messaging service and/or protocol, such as without limitation SMS 1220, which may be implemented as described above in reference to FIGS. 1-11B. As an additional non-limiting example, server 1204 may communicate with of second device 1212 and/or plurality of recipient devices 1208a-n via a network connection such as the Internet 1224, which may be implemented as described above in reference to FIGS. 1-11B.

In an embodiment, server 1204 is designed and configured to perform call forwarding between at least a recipient device having a display and a recipient telephone number and a second device having a second telephone number, for instance as described below in reference to FIG. 13.

Figure 13:
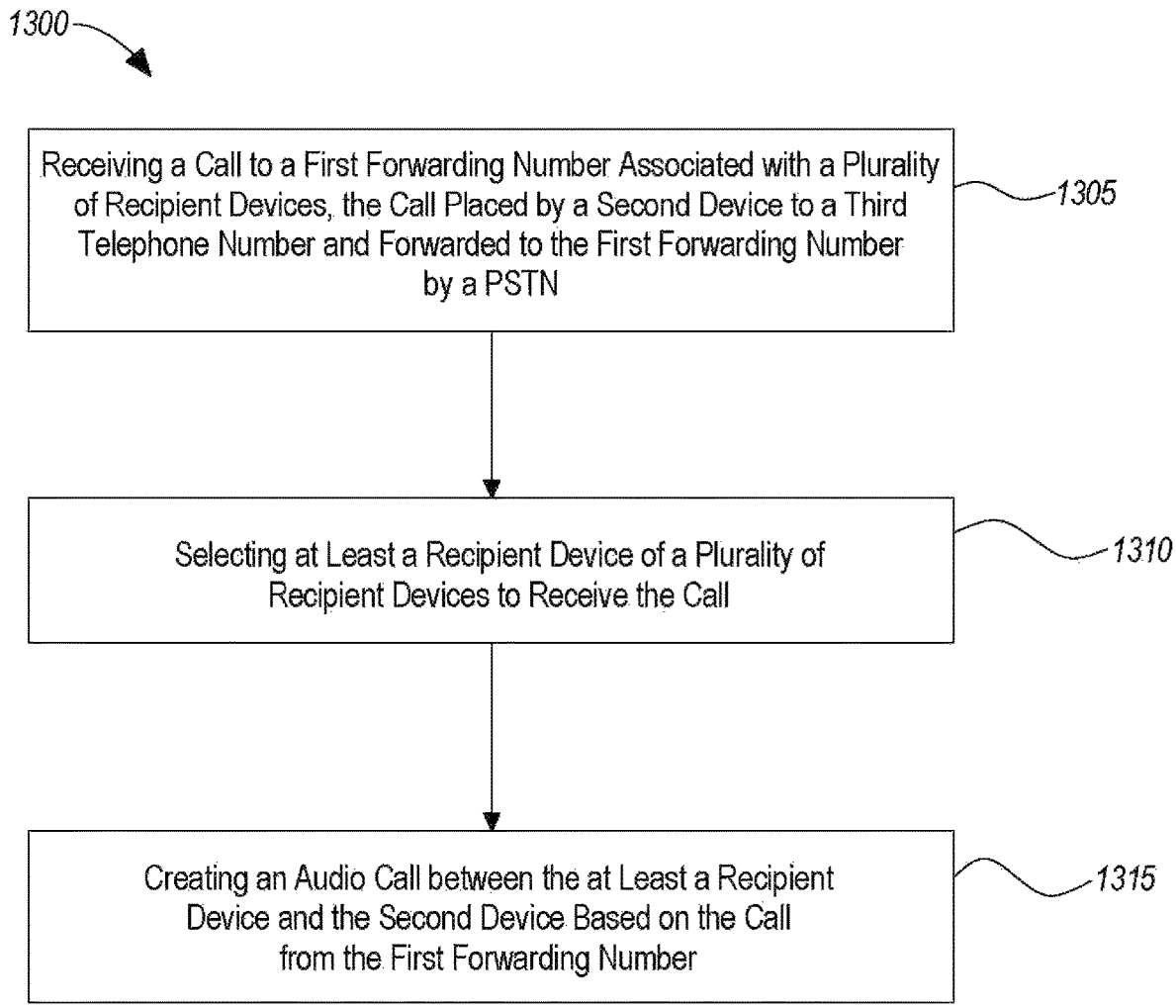
FIG. 13 is a flow diagram of one embodiment of a method of the present disclosure for an inbound phone call forwarded from a different telephone number to multiple telephones.

Turning now to FIG. 13, an exemplary embodiment of a method 1300 of providing call forwarding over a publicly switched telephone network is illustrated. At step 1305, a server 1204 receives a call to a first forwarding number, the first forwarding number associated, on the server, with a plurality of recipient devices 1208*a-n*, wherein the call is placed by a second device 1212 to a third telephone number and forwarded to the first forwarding number by a publicly switched telephone network (PSTN). This may be accomplished, without limitation, according to any methods and/or method steps as disclosed above in reference to FIGS. 1-11B. Call may be placed using any suitable method and/or methods for placement of calls, including without limitation any method for call placement as described above in reference to FIGS. 1-11B.

At step 1310, and still referring to FIG. 13, server 1204 selects at least a recipient device of a plurality of recipient devices 1208*a-n* to receive the call. Plurality of devices may be associated with first forwarding number in any data structure or using any component and/or element as described above for associating a recipient device with a first forwarding number. In an alternative embodiment, server 1204 may create a call via PSTN 1216 to all devices of plurality of devices 1208*a-n* and connect the call as a conference call any answering devices of plurality of recipient devices 1216; this may be performed by placement of PSTN calls according to any method steps described above for placement of calls via a PSTN 1216 for call forwarding. Selecting the at least a recipient device may include filtering the plurality of recipient devices according to at least a contextual datum. A "contextual datum," as used herein, is any element of data describing a location and/or current status of a user of a recipient device and/or a time and/or date during which the call occurs. A contextual datum may include, without limitation, a time, a date, a vacation status such as whether a particular user is on vacation, a geographical location of a user, for instance as determined using GPS or similar location of a recipient device, or the like. Contextual data may be used to choose between two or more devices operated by one user; for instance, a user whose cell phone conveys data indicating the user is at home may have his or her home phone selected rather than the cell phone. As a further example of a contextual datum being used in selection, a user who is on vacation according to some data provided to the server may get excluded from the call by having the user's recipient device not be selected; such a determination may also depend on additional factors, such as second telephone number, such that a second number associated with an important client and/or supervisor may cause selection of a user's recipient device whether the user is on vacation or not. Embodiments of this method may enable a user, or employer thereof, to establish various selection rules concerning which numbers are forwarded to the user, and under which circumstances, including which numbers should be forwarded to the user outside of work hours, which numbers should be excluded for the user because of interpersonal issues, or the like.

With continued reference to FIG. 13, As a further non-limiting example, one or more devices may by flagged in memory of the server 1204 as not receiving calls after hours; alternatively or additionally, some devices may be designated as "on call" for a given time, date, day of the week, or the like, such that a particular user may receive such calls by default. "Work hours," as used herein, may be any hours of operation of a business, department, office, particular employee, or the like, which may vary depending on a day of the week, calendar day, or other parameter, according to any suitable schedule. A particular user and/or recipient device may be flagged or otherwise indicated in memory of server 1204 as a default and/or lead recipient for forwarding number, and/or forwarding number combined with a second number, a given contextual datum, or the like. Default and/or lead recipient may be selected as the only one called or may ring a couple of times before additional lines are added to the call. Thus, selecting at least a recipient device may include selecting at least a default recipient device.

Still referring to FIG. 13, selecting the at least a recipient device may include communicating from server 1204 to plurality of recipient devices 1208*a-n* with a caller identification (ID) code; this may be performed, without limitation, as described above in reference to FIGS. 1-11B. This may be combined with filtering and/or selection of recipient devices according to contextual data and/or as default devices; thus, server 1204 may communicate a caller identification code to a subset of plurality of devices 1208*a-n* as determined by any filtering or other operations as described above. In an embodiment, a default recipient device may receive communication from server 1204 to of a caller identification (ID) code first; default recipient device and/or a user thereof may thereafter be able to refuse and/or fail to answer, causing server 1204 to send message to a second default recipient device, to a subset of recipient devices selected according to any criteria and/or contextual data as described above, and/or plurality of recipient devices 1208*a-n* minus default device. Default recipient may enter a message specifying a subsequent recipient device, using any user interface options described in this disclosure, and/or a message for a subsequent recipient to read and/or receive. Server 1204 may subsequently receive from at least a responding device of the plurality of recipient devices an indication accepting call; this may be performed according to any procedure and/or procedure step as described above for acceptance of a call by a user of a recipient device. For instance, and without limitation, communicating from server 1204 to plurality of recipient devices 1208*a-n* may include providing, to the plurality of recipient devices, or to a subset determined by any filtering or selection operations as described above, a selectable display field; receiving the selection of the call further comprises receiving a user selection of the selectable field. Server 1204 may select the at least a responding device as the at least a recipient device. As a non-limiting illustrative example, server 1204 may generate an alert that creates a toaster pop-up on each app user's cell phone; he app user can then press the popup to open the app or go directly to the app to open it. Once opened, the app may display key information and provide a simple question to the app user. As a non-limiting example, information displayed to a user may include caller ID and/or name of an originating caller, a company name and/or phone number to which call was originally sent, or the like. An app user may then press YES or NO, or equivalent input options, signaling server 1204 to send the call to their cell phone over the PSTN 1216 as further described below. Communication of codes may be performed via SMS 1220 or other text messaging protocols and/or systems, and/or via a network such as the Internet 1224, for instance as described above in reference to FIGS. 1-11B.

Still referring to FIG. 13, and as noted above, selecting at least a recipient device may include communicating from the server to a default recipient device with a caller identification (ID) code, which may be implemented as described above, receiving, from at least a default recipient device, a user input, and selecting the at least a recipient device based on the user input. User input may include a selection of the at least a recipient device. User input may include a refusal to answer the call. Alternatively or additionally, default user and/or device may fail to respond within a threshold period of time, which may trigger communication and/or call to be transmitted and/or connected to one or more devices of plurality of recipient devices 1208*a-n*. Thus, communication may be staggered: at least a default device may get a first opportunity to respond to call, and either failing to answer, selecting another device, and/or refusing call may cause call to be sent to one other or many other devices. In an embodiment, caller ID code may display a contact on a display of the recipient device; the caller ID code may display a first logo on the display of the recipient device, the first logo corresponding to the first forwarding number. This may be implemented as described above in reference to FIGS. 1-11B. Additional information that may be displayed may include, without limitation, who else is on the call, whether multiple people answered, whether somebody else has conferenced in, or the like, who was initially selected, whether a "default," preferred, or other person was initially tried, failed to answer, refused, or the like, and/or messages entered by other users, including without limitation message entered by a default recipient.

In operation, inbound calls and caller ID information may be forwarded and/or transmitted to one or multiple APP Users at the same time. When forwarded to multiple recipients, a first person/App User/Customer that answers the call may be connected with the inbound caller. In an embodiment, if an inbound call is directed to multiple individuals' cell phones, the person who did NOT answer the call (meaning someone else to whom the call was also forwarded answered first and connected with the caller) may have the ability to go to the APP and conference into the existing phone call. Specifically, other individuals who did not keypress "yes" first may then have the ability go back to the App and keypress "join"; Once "join" is key pressed, such other users' phones and/or other recipient devices may receive a call from server 1204; when answered, an individual who key pressed "join" may be conferenced into an existing call.

In an embodiment, and still referring to FIG. 13, when a call is forwarded to multiple individuals, contact information of the originating caller and the number which was originally dialed may first be displayed on the APP or via a text message, for instance as described above. A PSTN phone call may not be forwarded until an App User keypresses "yes" meaning they want to receive the call; the App User may have the ability to say "yes" or "no" via the APP or via text message. A first person to keypress "yes" may then have the voice portion call forwarded to their cell phone; this may be implemented as described above in reference to FIGS. 1-11B. In an embodiment, a first app user to press "YES" may have the call forwarded via the PSTN to their cell phone; in other words, a first device responding to communication may be selected as described above. All other app users in that distribution list may receive a notice revealing the user who took the call.

At step 1315, and still referring to FIG. 13, server 1204 creates an audio call between the at least a recipient device and the second device 1212 based on the call from the first forwarding number; the call may be placed via PSTN 1216. This may be implemented, without limitation, as described above in reference to FIGS. 1-11B.

Figure 14:
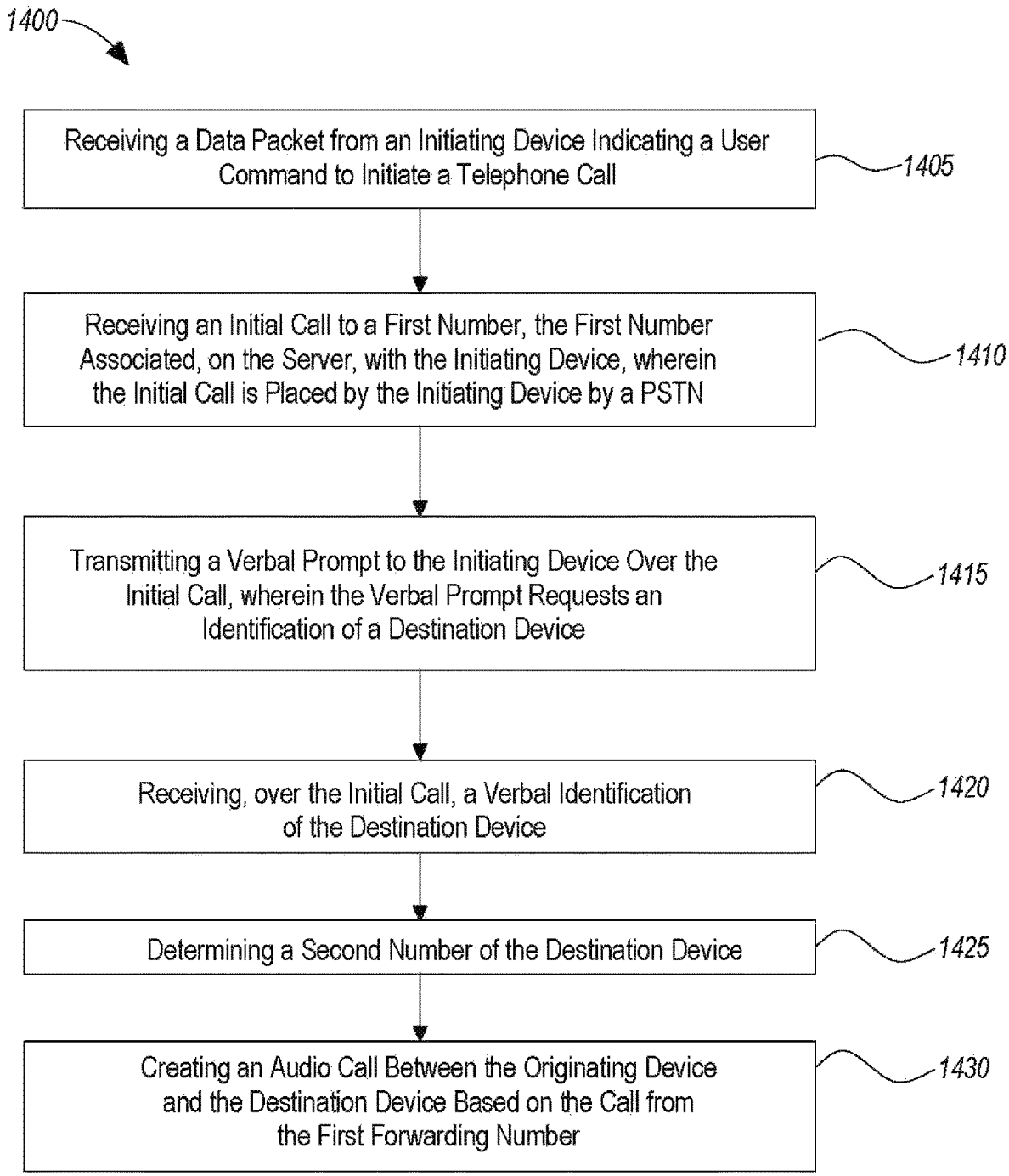
FIG. 14 is a flow diagram of one embodiment of a method of the present disclosure for outbound calling over a public switched telephone network.

Referring now to FIG. 14, an exemplary embodiment of a method 1400 of outbound calling over a public switched telephone network is illustrated. At step 1405, a server, which may include any server as described above in reference to FIGS. 1-13, receives a data packet from an initiating device indicating a user command to initiate a telephone call; this may be implemented, without limitation, as described above in reference to FIGS. 1-13. A user of initiating device may initiate call as described above, including without limitation by activating an app on initiating device; app may display a pop up, activation of which transmits the data packet. Data packet may, for instance, notify the server that initiating device is going to make a call within some short period of time, such as without limitation 5 seconds.

Figure 15:
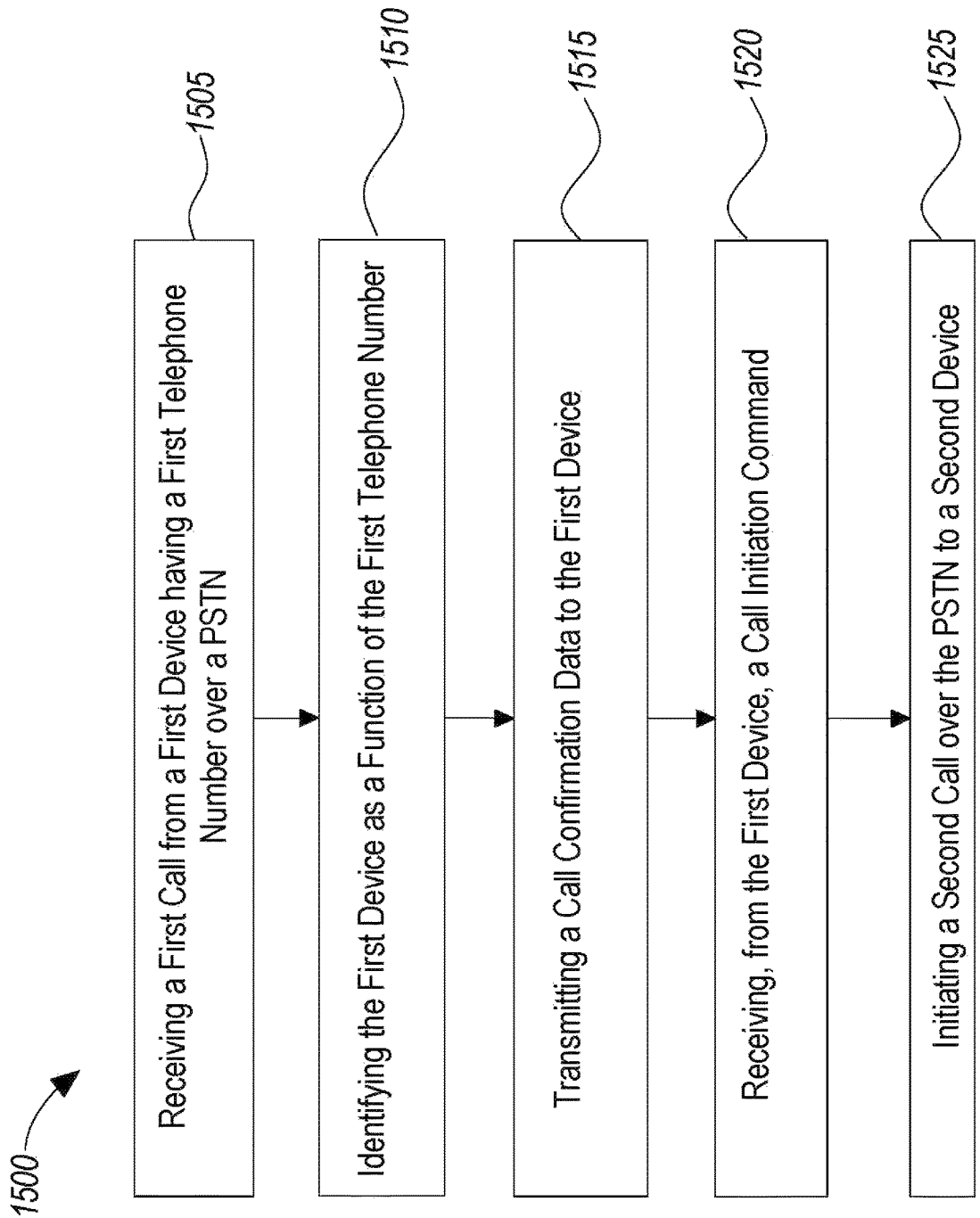
FIG. 15 is a flow diagram of one embodiment of a method of call placement over a publicly switched telephone network.

At step 1410, and still referring to FIG. 15, server may receive an initial call to a first number, the first number associated, on the server, with the initiating device, wherein the initial call is placed by the initiating device by a publicly switched telephone network (PSTN); this may be implemented, without limitation, as described above in reference to FIGS. 1-13. For instance, and without limitation, an app operating on initiating device may trigger a native dialer on the initiating device and call server via a predetermined phone number assigned to that initiating device, for instance over the PSTN. At step 1415 transmitting, by the server, a verbal prompt to the initiating device over the initial call, wherein the verbal prompt requests an identification of a destination device; this may be implemented, without limitation, as described above in reference to FIGS. 1-13. As a non-limiting illustrative example, server may answer with the person's first name, for instance saying, "Hello, Bill. Whom would you like to call? At step 1420, server may receive, over the initial call, a verbal identification of the destination device; this may be implemented, without limitation, as described above in reference to FIGS. 1-13. For instance, an app user may respond with a first and last name of a user of a recipient device, such as "Bill Johnson," which server may retrieve from contacts associated with user of initiating device stored on server and/or on initiating device. Where retrieved contact information includes more than one number and/or recipient device associated with an identified user, server may transmit a follow-up question over the initial call and receive further information from the initiating device via the call and/or data packets sent via text messaging and/or network communication. For instance, server may respond with the following, "Which number, home, cell or office?" to which a user may verbally respond with any of the choices. User selection may be of a person whose name and number is already in the contacts within the App and/or on the server. User may alternatively or additionally verbally enter a telephone number associated with a recipient device. Each verbal prompt by server may be performed using any suitable text-to-speech protocol and/or process; each verbal response from any user may be converted to text for comparison to and/or retrieval of data on server using any suitable speech-to-text protocol and/or process. Where a user of initiating device has more than one number associated with it, server may select a default number to be used as caller ID, for instance where user has specified such a default number. Server may alternatively or additionally transmit an audio request to user via initiating device to specify a number to be used as caller ID, which user may specify using a verbal response and/or according to any other process for such specification as provided in this disclosure. As a non-limiting illustration, server may respond with the following, "Are you calling from your office, direct line, or home?" and user may verbally respond with any of the choices. Server may finish the call with a confirmation message, such as without limitation the following: "Calling Bill Johnson's (WHICHEVER WAS CHOSEN) phone, with the caller ID of your WHICHEVER WAS CHOSEN)."

At step 1425, and still referring to FIG. 14, server may determine a second number of the destination device, for instance based on the user verbal response and/or responses; this may be performed, without limitation, as described above in reference to FIGS. 1-13. At step 1430 server creates an audio call between the originating device and the destination device based on the call from the originating device; this may be performed, without limitation, as described above in reference to FIGS. 1-13. Placement of call may be performed, without limitation, using any methods and/or method steps described above for provision of caller identification.

Referring now to FIG. 15, an exemplary embodiment of a method 1500 of call placement over a publicly switched telephone network is illustrated. At step 1505, a server 200 receives a first call from a first device to a first telephone number associated with the first device, wherein the call is received over a publicly switched telephone network; this may be implemented, without limitation, as described above in reference to FIGS. 1-14, for instance using a first telephone number associated with the first device that is stored on server 200 as set forth in further detail above.

At step 1510, server 200 identifies first device as a function of first telephone number; this may be performed, without limitation, as described above in reference to FIGS. 1-14. As a non-limiting example, identifying may include receiving, in first call, caller identification data associated with first device; caller identification data may be received in any manner described above in reference to FIGS. 1-15. Server 200 may retrieve from memory of the server 200, user identification data associated with the first telephone number, which may be in any form described above in reference to FIGS. 1-15. Server 200 may verify caller identification data as a function of user identification data; for instance, and without limitation, caller identification data may be compared to user identification data. If data does not match, server 200 may terminate process as inauthentic, for instance and without limitation to screen out spoofed calls.

At step 1515, and still referring to FIG. 15, server 200 transmits call confirmation data to the first device. "Call confirmation data," as used herein, is data prompting a user of first device to confirm that the user is attempting to place a call, such as without limitation, any message indication a call attempt, a message asking the user whether the user intended to place a call, or the like. In an embodiment, transmitting call confirmation data to first device may transmitting a data packet over a network connection to the first device. Data packet may cause first device to display call confirmation data to a user of first device, for instance via an application operating on first device as described above in reference to FIGS. 1-14. Data packet may provide user a button or other data entry and/or command entry field permitting user to confirm and/or deny that user intends to place a call. In an embodiment, transmitting call confirmation data to first device may include placing a third call over PSTN to the first device; the third call may provide call confirmation data to a user of the first device. Where third call is placed, server 200 and/or first device may terminate first call. Call confirmation data may be placed via third call using audio data, such as a voice prompt generated by text to speech technology or the like.

At step 1520, and with continued reference to FIG. 15, server 200 receives, from the first device, a call initiation command as a function of the call confirmation data; this may be performed without limitation in any manner for initiation of calls as described above in reference to FIGS. 1-14. For instance, and without limitation, receiving the call initiation command may include receiving a data packet from the first device over a network, which may either confirm or deny that user has placed the call. Data packet may identify a user associated with a second device, an identifier of the second device, a telephone number of the second device, or the like; identification of the user of the second device may be used by server 200 to retrieve a telephone number for second call from contacts of user of first device or the like, for instance and without limitation as described above in reference to FIGS. 1-15. As a further non-limiting example, receiving call initiation command may include receiving a second phone number associated with the device from a native dialer on the first device; for instance, user may dial a phone number of second device. As a further non-limiting example, server 200 may receive call initiation command by receiving, over PSTN, a verbal identification of a second device; verbal identification may include any data suitable for identification of second device as described above, and may be analyzed using, without limitation, speech-to-text technology, which may be used to retrieve and/or identify a telephone number of second device. Verbal identification further comprises an identification of a user associated with a second device, such as a name, a user identifier and/or contact record identifier, for a record in contacts associated with user of first device of the user associated with the second device.

At step 1525, server 200 initiates a second call over the publicly switched telephone network to a second device, as a function of the call initiation command; this may be performed, without limitation, as described above in reference to FIGS. 1-14. Placement of call may be performed, without limitation, using any methods and/or method steps described above for provision of caller identification.

Figure 16:
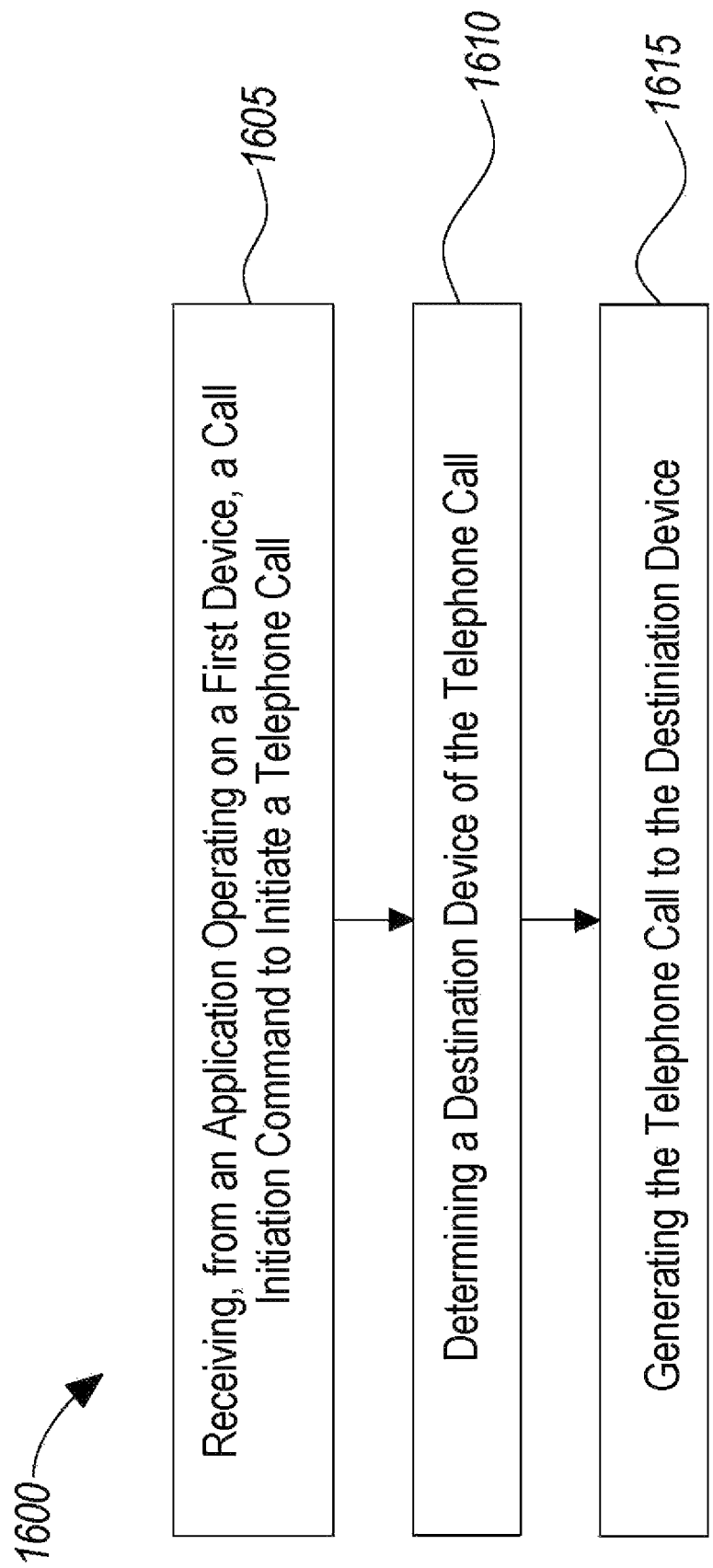
FIG. 16 is a flow diagram of one embodiment of a method of call placement over a publicly switched telephone network.

Referring now to FIG. 16, an exemplary embodiment of a method 1600 of call placement over a publicly switched telephone network is illustrated. At step 1605 a server 200 may receive from an application operating on a first device, a call initiation command to initiate a telephone call; this may be implemented, without limitation, as described above in reference to FIGS. 1-15. For instance, and without limitation, receiving call initiation may include receiving an initial call from the first device over a publicly switched telephone network, where initial call may be received and/or associated with first device according to any process described above in reference to FIGS. 1-15. As a further non-limiting example, server 200 may receive a data communication, defined for these purposes as a data packet or text message as described above, from first device, the data communication may confirm that a user of the first device commanded the first device to generate the call initiation command. For instance, in an embodiment, user may open and/or access an application on first device and keypress a button or other command entry labeled "Make Call" or the like. A call may be placed via PSTN using first device's native dialer to server 200. Concurrently, first device and/or an application thereon as described above may transmit a data packet and/or text to server 200 that confirms user is making a call via PSTN. Server 200 may use user's caller identification data, for instance in combination with data packet and/or text message to authorize and authenticate call.

Alternatively or additionally, receiving the call initiation command may include receiving, from the application, a code request. A "code request," as defined in this disclosure, is a request for a passcode. A "passcode," as used in this disclosure, is an authorization datum by server 200 and/or a system and/or operator thereof, to place a call; passcode may be a one-time authorization datum, which once used is no longer valid as authorization. Server 200 may transmit a passcode to the first device. Server may cause application to display the passcode to the user. For instance, and without limitation, user may enter a command requesting password via an application operating on first device, for instance by entering a keypress of a button or other command entry field, which may be labeled "Call Password" or the like. First device and/or application may send server 200 a data communication requesting passcode. Passcodes may include without limitation a 2-10-digit code. Server 200 may receive an initial call from first device over PSTN. Server may prompt a user of first device to provide passcode in initial call and may proceed to place a call only if passcode is valid.

At step 1610, and still referring to FIG. 16, server 200 determines a destination device of telephone call; this may be implemented, without limitation, as described above in reference to FIGS. 1-15. For instance, and without limitation, determine a destination device of telephone call may include receiving an initial call over PSTN, optionally including receipt and/or request for a passcode as described above, and receiving, of the PSTN, a verbal identification of the second device. In a non-limiting example, server 200 may provide an audio prompt such as without limitation "Hi Susan, who would you like to call?" User may then say a name of a person to be called, which may correspond with names and numbers in a contacts database as described above in reference to FIGS. 1-15 or may verbally enter a telephone number. Alternatively or additionally, user may dial telephone number. In an embodiment, server 200 may respond that it is calling a second device and/or user there, such as without limitation via another audio prompt such as "Calling, Pablo Perez via your Office phone number." Determining a destination device of the telephone call may include receiving, from first device, a telephone number of the destination device. Server 200 may be dialed via PSTN automatically, for instance by a process automatically initiated from an application operating on first device. SCI server 200 may prompt a user of first device for passcode as described above; application may enable user to initiate automatic transmission of passcode, for instance by selecting an "Enter Password" button or the like, or key passcode in manually.

At step 1615, and further referring to FIG. 16, server 200 generates telephone call to destination device; this may be implemented, without limitation, as described above in reference to FIGS. 1-15. Placement of call may be performed, without limitation, using any methods and/or method steps described above for provision of caller identification.

Figure 17:
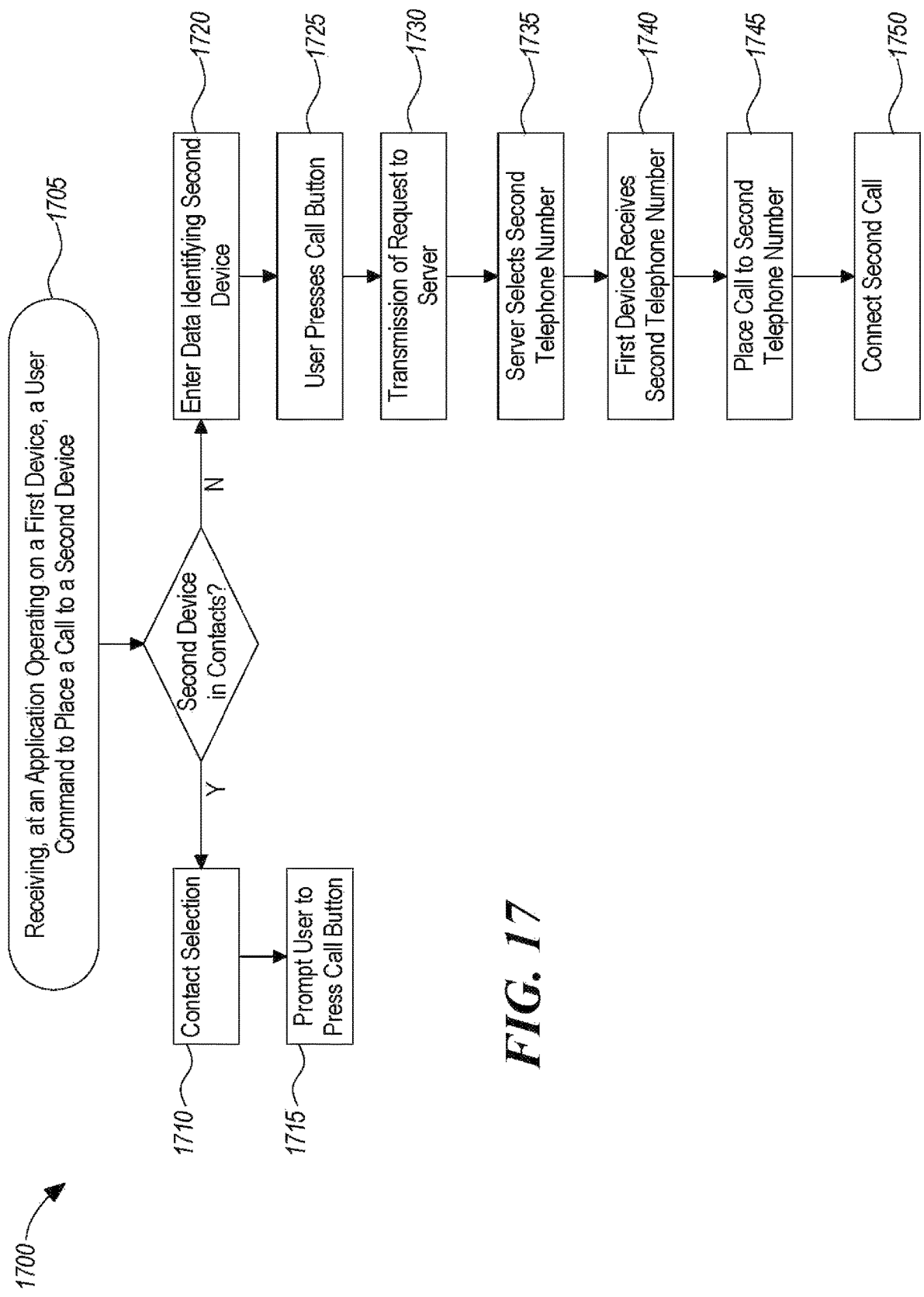
FIG. 17 is a flow diagram of one embodiment of a method of call placement over a publicly switched telephone network.

Referring now to FIG. 17, a flow diagram is provided illustrating an exemplary embodiment of a method 1700 of performing outbound call placement. When application is downloaded and a calling plan is selected and initiated/purchased by user, application may merge with user telephonic device native dialing application's contacts and/or dialing contacts as described above. An application may bring in all contacts from native dialing app into application.

Still referring to FIG. 17, at step 1705, a first device, which may include any telephonic device described above in reference to FIGS. 1-16, receives, at an application operating on the first device, a user command to place a call to a second device; this may be implemented, without limitation, in any manner described above in reference to FIGS. 1-16. As a non-limiting example if a user wishes to make an outbound call, user may open an application. User may then select a number or contact user wishes to call. If a person user wants to call is in a contact database associated with application, user may select a contact they wish to dial, at step 1710. Once selected, application may ask user to key press a "Call" button at step 1715. Generation of a call to second device may proceed, without limitation, as described above in reference to FIG. 16.

Still referring to FIG. 17, if a desired outbound number is not in application contact data base, at step 1720 user may enter and/or select an element of data identifying second device. This may be performed in any manner described above in reference to FIGS. 1-16. For instance, and without limitation, user may open an application dialer, which may be implemented in any manner suitable for implementation of a dialer as described above. and enter a number user wishes to call. Once user has entered and/or selected an element of data identifying second device, such as without limitation a number user wishes to dial, user may key press the "Call" button at step 1725.

At step 1730, and still referring to FIG. 17, upon selection by user of call button or other initiating action, application may transmit a request to a server 200 to place a call to second device. Transmission may be performed over any network and/or network connection as described above. For instance, transmission may include, without limitation, transmission to server 200 of a third telephone number of the second device and a predetermined caller identification. Transmission may include transmitting a data packet from the first device to the server over a network of the user or telephone number that is being called. Data packet may include any data as described above in reference to FIGS. 1-16; for instance and without limitation, data packet may identify a user or telephone number associated with the second device. Alternatively or additionally, first device may transmit request by transmitting, over the publicly switched telephone network, a verbal identification of the second device; this may be implemented, without limitation, as described above in reference to FIGS. 1-16.

At step 1735, and continuing to refer to FIG. 17, once request from application is received at server 200, server 200 may select a telephone number, such as without limitation a 10-digit number, that when dialed will be forwarded to user's desired contact/outbound phone number, for instance and without limitation as described above in reference to FIGS. 1-16. Selection of number may be performed in any manner described above. For instance, server 200 may select a phone number which is unique to a combination of first device and second device; server 200 may select number from a plurality of numbers available to server and/or stored at server 200 and may compare number to phone numbers already assigned to determine uniqueness. Server 200 may assign second number which may be assigned/forwarded to second device, such as without limitation a number associated with second device. As a result, when the second number is received at servers, call may be forwarded/directed to a phone number user is intending to call, or otherwise used in call confirmation data, as described in further detail below.

Still referring to FIG. 17, at step 1740, first device may receive, from the server, second telephone number associated with a combination of the first device and the second device; in other words, server may transmit second number to application on user telephonic device. Transmission may be performed in any manner, using any network and/or protocol, as described above in reference to FIGS. 1-16.

At step 1745, and with continued reference to FIG. 17, first device may place a first call to server 200 using second telephone number. First call may be placed, without limitation, using a native dialer of first device. First call may be transmitted over a publicly switched telephone network. For instance, and without limitation, upon receiving second telephone number, application may immediately initiate a call to second number and execute it using any process and/or component as described above, including without limitation via cell phone's native dialer. First call may be forwarded to server 200. Once first call reaches server 200, server 200 may verify that first call came from first device and/or a user thereof. For instance, when first call is received at server 200 from first device, the server 200 may confirm without limitation that incoming first call being received from native dialer of first device by servers within a designated amount of time after transmission to first device by server 200; designated amount of time may be preconfigured in memory of server, for instance by an input from a user of server. In an embodiment, a call received outside designated amount of time may not be forwarded and/or used to generate call confirmation data as described below. Server 200 may alternatively or additionally verify that caller identification of first call matches caller identification of first device; server may not forward first call and/or generate call confirmation data if caller identification of first call does not match caller identification of first device.

With continued reference to FIG. 17, second number may automatically be removed from application immediately once outbound call has been placed. When user makes a subsequent call, same process may take place and a new/different outbound phone number will be downloaded into application. Alternatively, second number may be saved by application and/or in application contacts database and related to second device, and a subsequent call to second device may be performed according to steps 1705-1715 above.

Still referring to FIG. 17, at step 1750 first device may connect a second call over publicly switched telephone network to second device as a function of call confirmation data generated by server 200; this may be implemented, without limitation, in any manner described above in reference to FIGS. 1-16, including without limitation by connection at server and/or servers. Second call to second device may be a call directed to second device. As a non-limiting example, call confirmation data may include a telephone number, for instance as described above. Server 200, in a non-limiting example, may initiate second call by forwarding first call to a desired call recipient and/or device thereof. For instance, and without limitation, when first call reaches server and is confirmed to be from user as described above, server may forward first call to second device; these steps may be performed in any order. As a further example, first device may be configured to connect second call by receiving call confirmation data from the server and initiating the second call over the publicly switched telephone network to a second device as a function of the call confirmation data; this may be implemented, without limitation, as described above in reference to FIGS. 1-16. For example, receiving call confirmation data from server 200 may include receiving a data packet over a network connection from the server 200, where the data packet causes first device to display call confirmation data to a user of the first device. As a further non-limiting example, receiving call confirmation from server may include receiving a third call over the publicly switched telephone network from server, wherein the third call provides the call confirmation data to a user of the first device. First device may be further configured to terminate first call. First device may transmit caller identification to server in any manner described above; server may compare the transmitted caller identification stored caller identification to authenticate first device and/or a user thereof. Alternatively or additionally, server may store predetermined caller identification of first device and/or a user thereof and may display such predetermined caller identification on second device; this may be implemented without limitation in any manner described above.

Still referring to FIG. 17, embodiments described above may enable user to make outbound calls from a cell phone over PSTN, for instance using their cell phone's native dialer, while displaying to a call recipient caller ID of telephonic device phone number and/or a secondary phone number user has a legal right to use. User's cell phone number may not be displayed to a call recipient. Each application may be given an assigned phone number to be displayed for outbound calls. Caller identification information may be uploaded to servers and/or be presented to call recipients when a user selects a contact to phone number to dial. Caller identification may be generated, transmitted, and/or displayed according to any method and/or method step as described above in reference to FIGS. 1-16.

Figure 18:
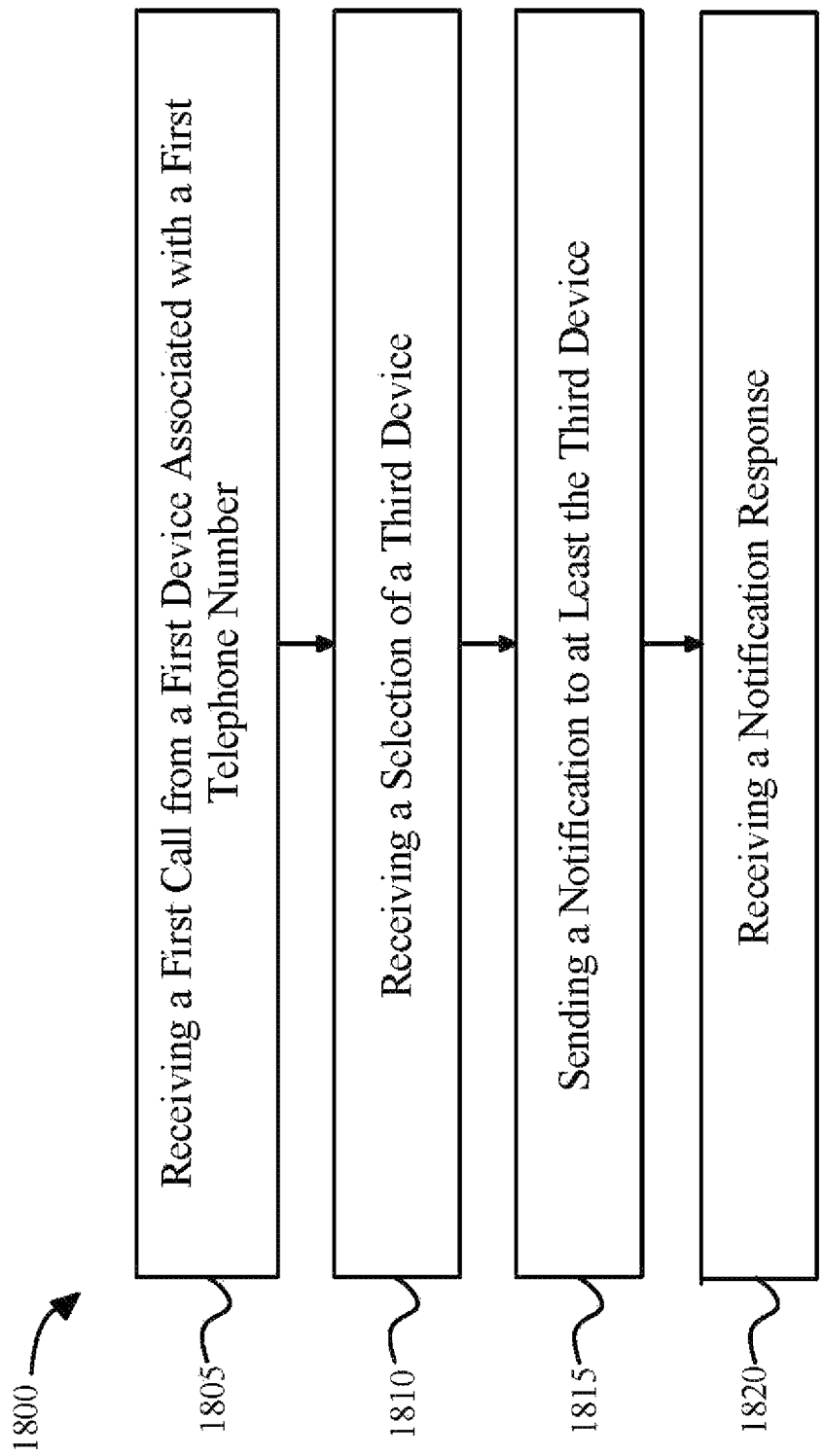
FIG. 18 is a flow diagram of one embodiment of a method of call placement.

Referring now to FIG. 18, a method 1800 for call placement is illustrated. Method 1800 includes a step 1805 of receiving, by a processor, a first call from a first device associated with a first telephone number. This may be implemented, without limitation, as described above with reference to FIGS. 1-17.

With continued reference to FIG. 18, method 1800 includes a step 1810 of receiving, by the processor, a selection of a third device. This may be implemented, without limitation, as described above with reference to FIGS. 1-17. In some embodiments, the third device may be associated with a third device user.

With continued reference to FIG. 18, method 1800 includes a step 1815 of sending, by the processor, a notification to at least the third device, wherein the notification includes a caller ID of a user and a call invitation including an accept option and a decline option. This may be implemented, without limitation, as described above with reference to FIGS. 1-17. In some embodiments, the notification may be sent using a different pathway from the second call. This may be implemented, without limitation, as described above with reference to FIGS. 1-17. In some embodiments, step 1815 may include sending the notification to a plurality of devices, wherein each of the plurality of devices is associated with the third device user. This may be implemented, without limitation, as described above with reference to FIGS. 1-17. In some embodiments, the notification may further comprise a description. In some embodiments, the call invitation of the notification may further comprise a send to voicemail option.

With continued reference to FIG. 18, method 1800 includes a step 1820 of receiving, by the processor, a notification response wherein the notification response includes a selection between the accept option and the decline option. This may be implemented, without limitation, as described above with reference to FIGS. 1-17. In some embodiments, the notification response may include at least a rejection reason. In some embodiments, the rejection reason my include a reason for choosing the decline option.

With continued reference to FIG. 18, method 1800 may further include a step of receiving, by the processor, a device selection from the third device, wherein the device selection includes a selected forward device. This may be implemented, without limitation, as described above with reference to FIGS. 1-17. In some embodiments, method 1800 may further include a step of initiating, by the processor, a second call with the selected forward device. This may be implemented, without limitation, as described above with reference to FIGS. 1-17. In some embodiments, method 1800 may further include a step of merging, by the processor, the first call with the second call. This may be implemented, without limitation, as described above with reference to FIGS. 1-17. In some embodiments, method 1800 may further include a step of ending, by the processor, the first call as a function of initiating the second call with the selected forward device. This may be implemented, without limitation, as described above with reference to FIGS. 1-17. In some embodiments, method 1800 may further include a step of comprising rejoining, by the processor, the merged first call and second call. This may be implemented, without limitation, as described above with reference to FIGS. 1-17.

Figure 19:
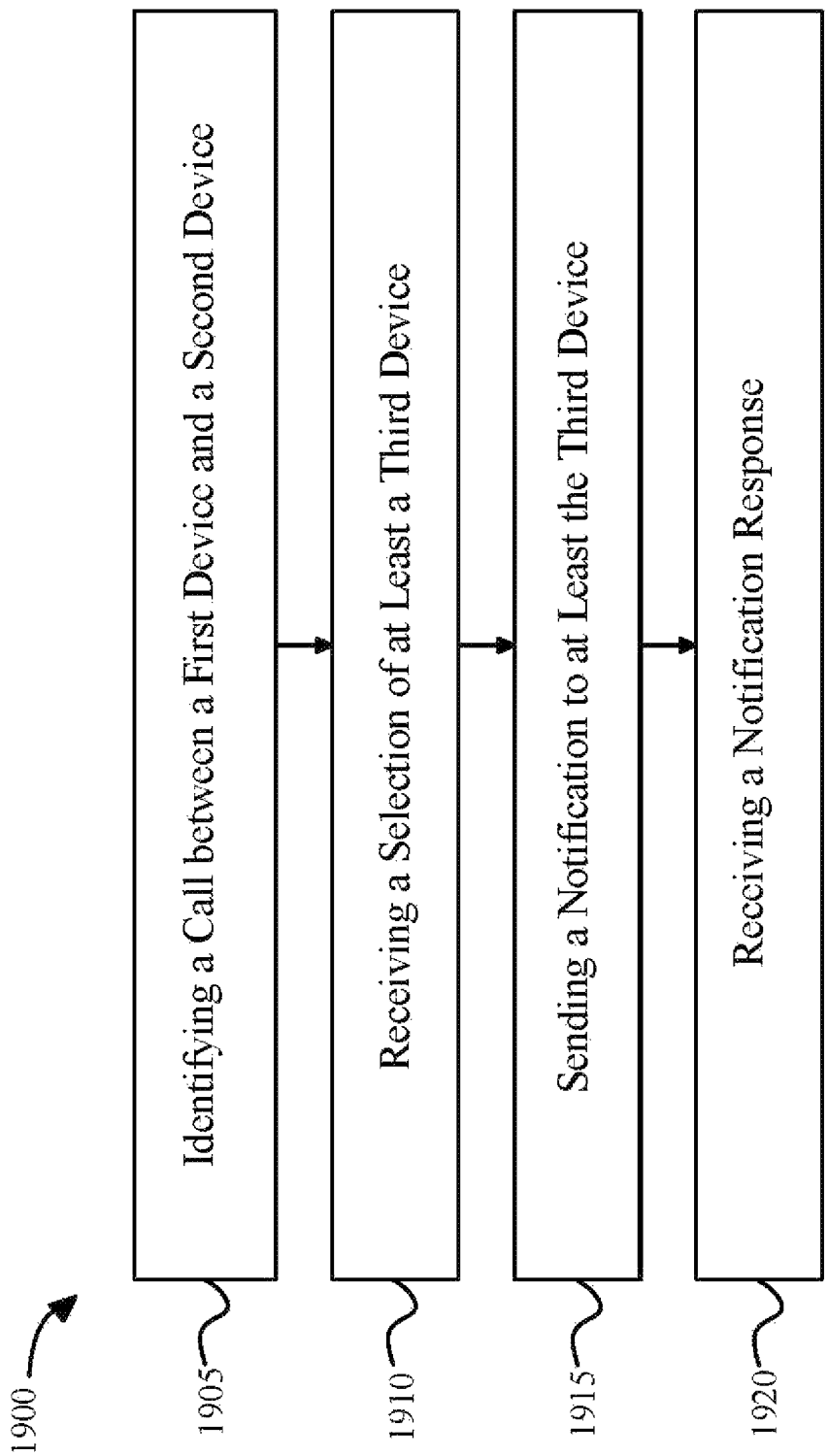
FIG. 19 is a flow diagram of an additional embodiment of call placement.

Referring now to FIG. 19, an exemplary embodiment of a method 1900 of call placement is illustrated. At step 1905, a processor identifies a call between a first device associated with a first telephone number and a second device associated with a second telephone number over a communication network. Identifying a call may include, without limitation, initiating a call, participating in a call as first device, second device, or any other computing device and/or server as described in this disclosure.

Still referring to FIG. 19, at step 1910, processor receives a selection of at least a third device of a plurality of recipient devices. At least a third device may include one or more of any devices described in this disclosure, including any devices capable of receiving and/or transmitting telephone calls and/or any devices capable of receiving and/or transmitting notifications. At least a third device may include a plurality of devices.

Continuing to refer to FIG. 19, at step 1915 processor sends a notification to the at least a third device, wherein the notification includes a caller identification (ID) of the first device or the second device and a call invitation comprising an accept option and a decline option; this may be implemented, without limitation, in any manner disclosed above in reference to FIGS. 1-18. In a non-limiting example, notification may include a field providing an option for the at least a third device to select an alternative participant. An "alternative participant," as used in this disclosure, is a user, device, and/or telephone number other than one to which notification has been assigned, transmitted, and/or addressed. Alternative participant may include, without limitation, a different device that is used by the same user as at least a third device, a different telephone number or other identifier associated with the same user and/or the same device, or any other permutation of the above concepts that may occur to persons skilled in the art upon reviewing the entirety of this disclosure. In some embodiments, at least a third device may receive notification and/or alert to receive a call being forwarded to third device and/or user thereof, or an invitation to join the call, for instance as a conference call; third device and/or a user thereof may then be able to present and/or submit a number to which may be used when the call is forwarded to them and/or when they receive a call to be included into the call between the first and second device. In some embodiments, this may enable a person who receives the alert to have the option of selecting a different number or device to have the call forwarded to, and/or to preset such selection such that such forwarding and/or conferencing automatically includes alternative device. Such selection of alternative device may be sent to a server and/or other computing device as described in this disclosure to control where a call will be forwarded and/or conferenced. Receiving a notification response may include receiving a selection of an alternative participant.

Still referring to FIG. 19, notification may include an entity identifier, which may include, without limitation any identifier, name, or the like associated with a company or individuals on a device, such as without limitation the first device and/or second device. Processor may alternatively or additionally transmitting a phone number to the at least a third device.

Continuing to refer to FIG. 19, at step 1920 processor receives a notification response from the at least a third device, wherein the notification response comprises a selection between the accept option and the decline option. Reception of notification response may include reception of any selection made by at least a third device and/or any user thereof, and may be performed without limitation in any manner described in this disclosure. In some embodiments, at least a third device may include a plurality of devices; receiving notification may include and/or be included in receiving a plurality of notifications from the plurality of devices. Apparatus may be configured to select a device of the plurality of devices; in an embodiment, if multiple devices accept a call invitation alert, a user of the first device may be able to allow all users to be connected to the call and/or select the third device that will be connected to the call; alternatively or additionally, such selection choices may be performed automatically by first device and/or apparatus, for instance and without limitation based on a setting and/or conditional instruction provided by users and/or other devices. Apparatus and/or processor may be configured to send a call to at least a third device if the at least a third device and/or a user thereof selects the accept option; call may include a call in which first device and second device are participating, or may include any other call. In an embodiment, apparatus may be configured to forward call to at least a third device if the at least a third device selects accept option; this may be performed, without limitation, as described above in reference to FIGS. 1-18. Apparatus may be configured to include at least a third device in a conference call or the like if the at least a third device selects accept option; this may be performed, without limitation, as described above in reference to FIGS. 1-18. At least a third device may have two different accept options, and/or a further field to specify which action to be taken, permitting third device and/or user thereof to choose between a forwarded or conferenced call. Apparatus may be configured to terminate call for first device and rejoin a first user with the call, where a rejoining notification may be provided to the second device and the third device; this may be performed, without limitation, as described above in reference to FIGS. 1-18. Apparatus and/or processor may be configured to reject the call if the at least a third device selects the decline option; this may be performed, without limitation, as described above in reference to FIGS. 1-18.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 20:
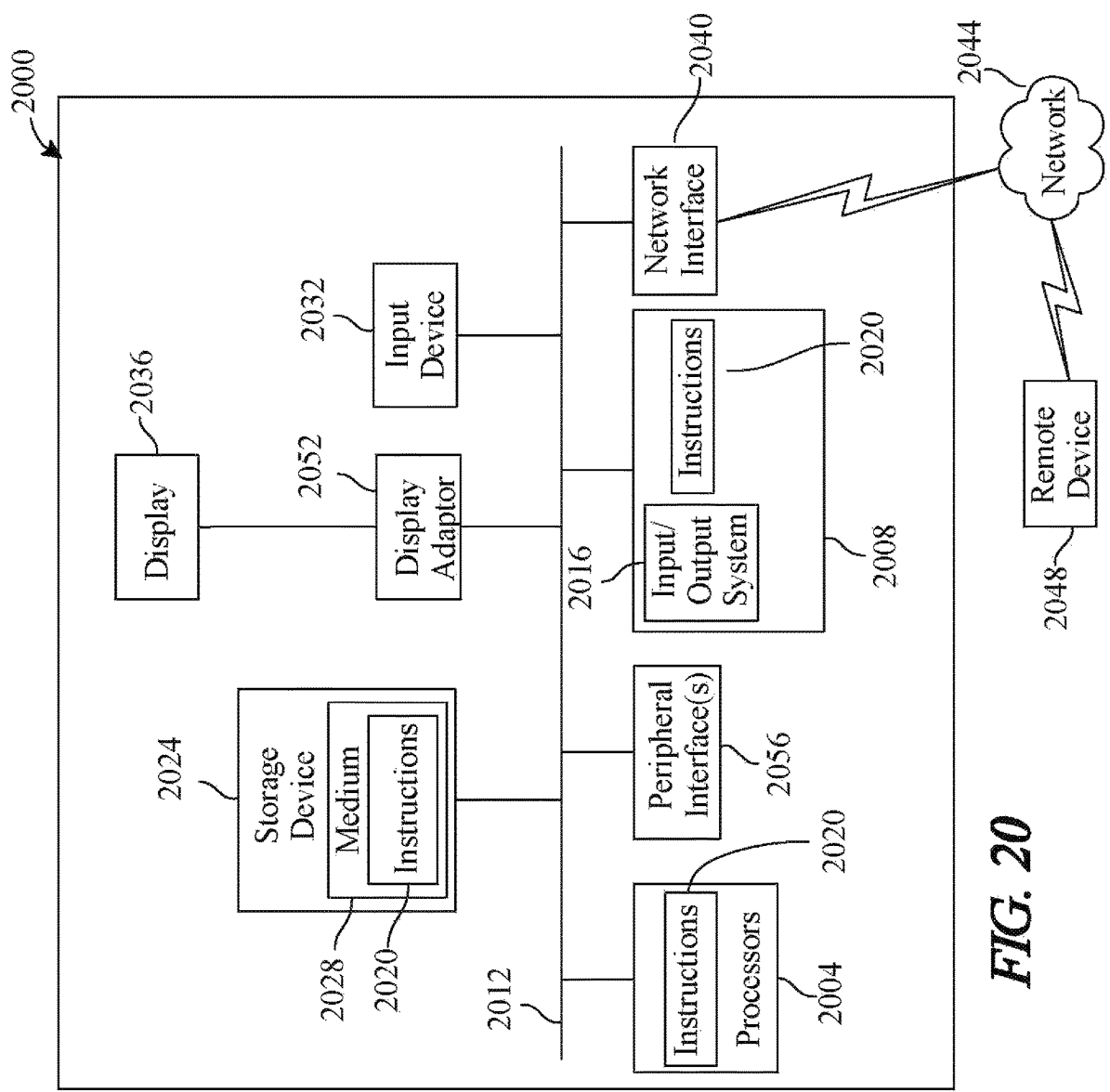
FIG. 20 is a block diagram of a computing system that can be used to implement any one or more of the methodologies disclosed herein and any one or more portions thereof.
Figure 21A:
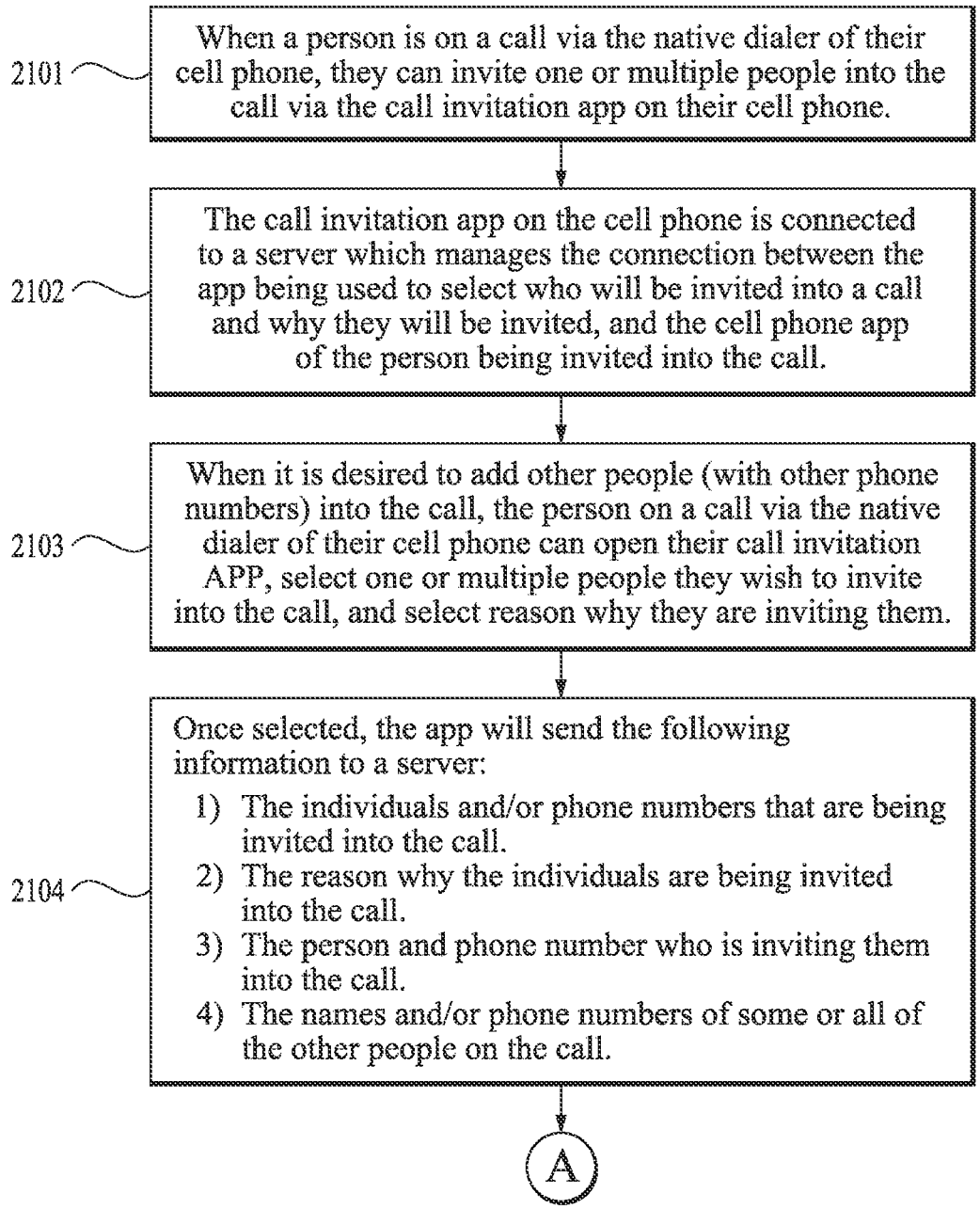
Figure 21C:
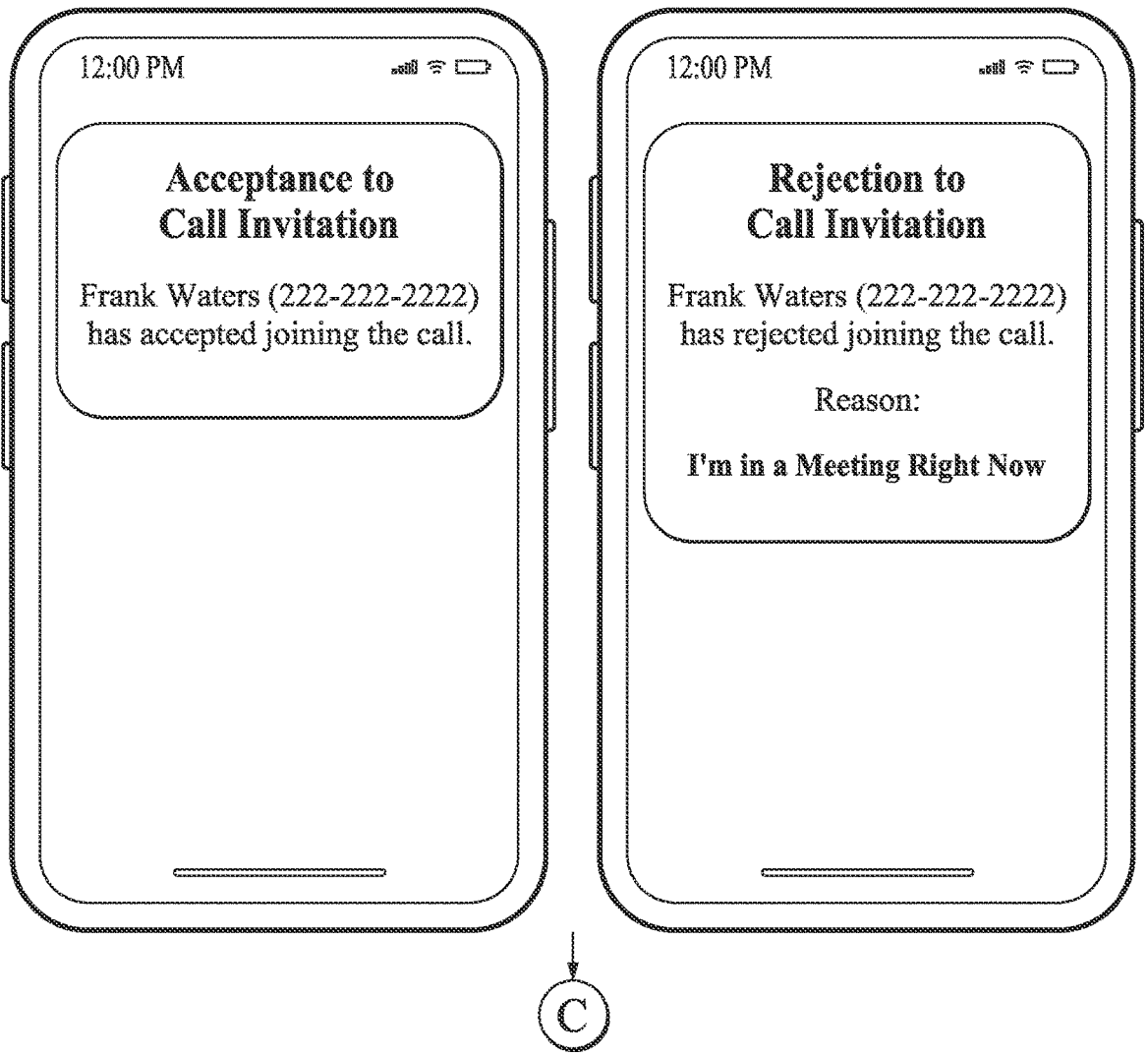
Figure 22A:
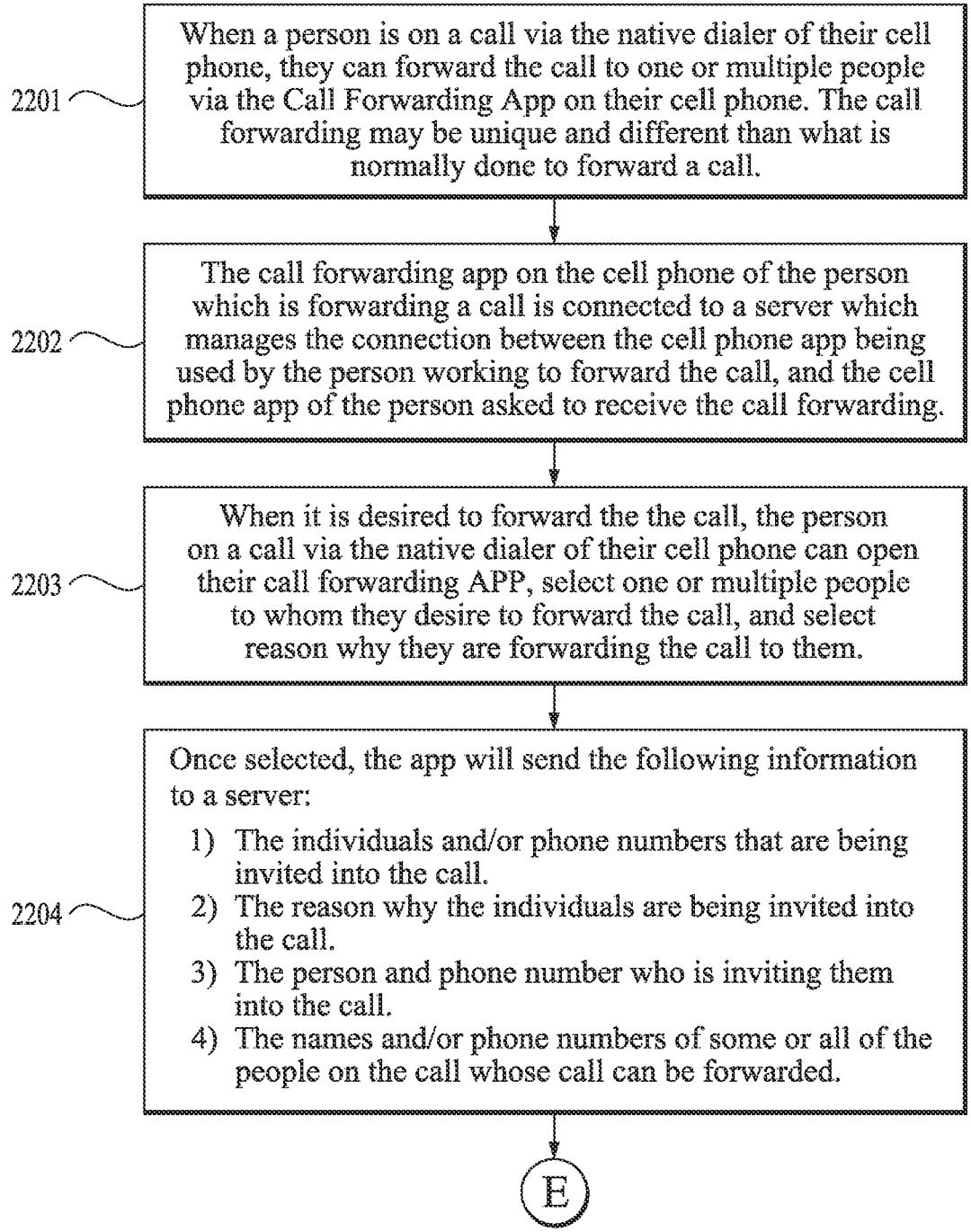
Figure 22C:
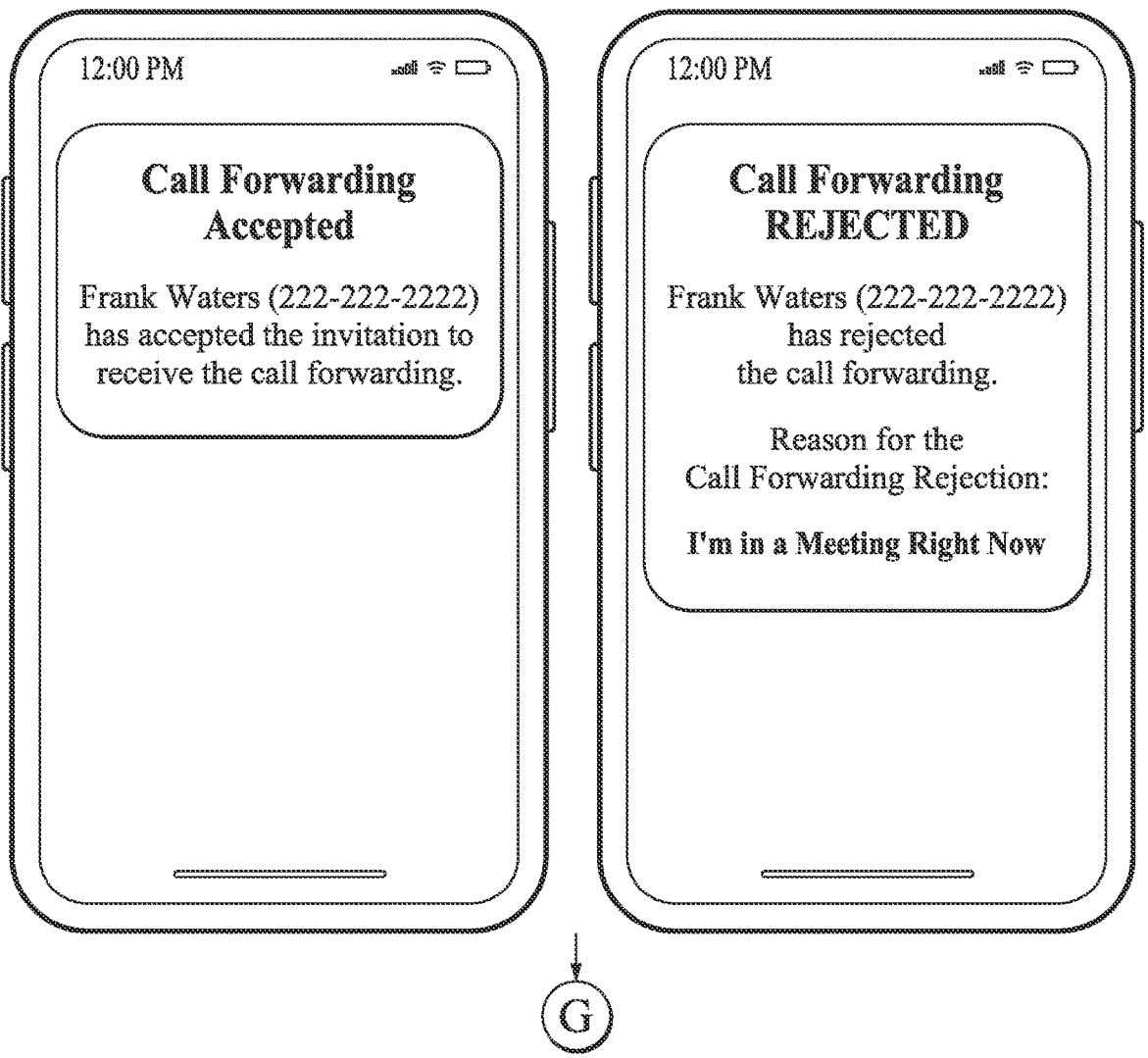

FIG. 20 shows a diagrammatic representation of one embodiment of a computing device in the exemplary form of a computer system 2000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2000 includes a processor 2004 and a memory 2008 that communicate with each other, and with other components, via a bus 2012. Bus 2012 may include any of several types of bus structures including, but not limited to, a memory bus, a memory controller, a peripheral bus, a local bus, and any combinations thereof, using any of a variety of bus architectures.

Processor 2004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 2004 may be organized according to Von Neumann and/or Harvard architecture as a non-limiting example. Processor 2004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 2008 may include various components (e.g., machine-readable media) including, but not limited to, a random-access memory component, a read only component, and any combinations thereof. In one example, a basic input/output system 2016 (BIOS), including basic routines that help to transfer information between elements within computer system 2000, such as during start-up, may be stored in memory 2008. Memory 2008 may also include (e.g., stored on one or more machine-readable media) instructions (e.g., software) 2020 embodying any one or more of the aspects and/or methodologies of the present disclosure. In another example, memory 2008 may further include any number of program modules including, but not limited to, an operating system, one or more application programs, other program modules, program data, and any combinations thereof.

Computer system 2000 may also include a storage device 2024. Examples of a storage device (e.g., storage device 2024) include, but are not limited to, a hard disk drive, a magnetic disk drive, an optical disc drive in combination with an optical medium, a solid-state memory device, and any combinations thereof. Storage device 2024 may be connected to bus 2012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2024 (or one or more components thereof) may be removably interfaced with computer system 2000 (e.g., via an external port connector (not shown)). Particularly, storage device 2024 and an associated machine-readable medium 2028 may provide nonvolatile and/or volatile storage of machine-readable instructions, data structures, program modules, and/or other data for computer system 2000. In one example, software 2020 may reside, completely or partially, within machine-readable medium 2028. In another example, software 2020 may reside, completely or partially, within processor 2004.

Computer system 2000 may also include an input device 2032. In one example, a user of computer system 2000 may enter commands and/or other information into computer system 2000 via input device 2032. Examples of an input device 2032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2032 may be interfaced to bus 2012 via any of a variety of interfaces (not shown) including, but not limited to, a serial interface, a parallel interface, a game port, a USB interface, a FIREWIRE interface, a direct interface to bus 2012, and any combinations thereof. Input device 2032 may include a touch screen interface that may be a part of or separate from display 2036, discussed further below. Input device 2032 may be utilized as a user selection device for selecting one or more graphical representations in a graphical interface as described above.

A user may also input commands and/or other information to computer system 2000 via storage device 2024 (e.g., a removable disk drive, a flash drive, etc.) and/or network interface device 2040. A network interface device, such as network interface device 2040, may be utilized for connecting computer system 2000 to one or more of a variety of networks, such as network 2044, and one or more remote devices 2048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2044, may employ a wired and/or a wireless mode of communication. In general, any network topology may be used.

Information (e.g., data, software 2020, etc.) may be communicated to and/or from computer system 2000 via network interface device 2040.

Computer system 2000 may further include a video display adapter 2052 for communicating a displayable image to a display device, such as display device 2036. Examples of a display device include, but are not limited to, a liquid crystal display (LCD), a cathode ray tube (CRT), a plasma display, a light emitting diode (LED) display, and any combinations thereof. Display adapter 2052 and display device 2036 may be utilized in combination with processor 2004 to provide graphical representations of aspects of the present disclosure. In addition to a display device, computer system 2000 may include one or more other peripheral output devices including, but not limited to, an audio speaker, a printer, and any combinations thereof. Such peripheral output devices may be connected to bus 2012 via a peripheral interface 2056. Examples of a peripheral interface include, but are not limited to, a serial port, a USB connection, a FIREWIRE connection, a parallel connection, and any combinations thereof.

Referring now to FIGS. 21A-21E, there is shown a system and method that enables a first user to invite one or more second users join an active ongoing group call (an existing call with two or more people on it) which is taking place via the native dialer of a cell phone (the first device) of the first user 2101. The system comprises a server, a first device, and at least one second device 2102. Preferably, the server is designed and configured to receive call invitation information from an app on a cell phone through a data pathway (Internet, WIFI, 5G, or any other pathway where data can be transferred). The first device has a first user, a first telephone number and a first call placement/invitation application operating thereon. The at least one second device has at least one second user, at least one second telephone number and at least one second call placement/invitation application operating on the second device.

When the first user is on the first call via the native dialer of a cell phone, the first user can open the call invitation app and select one or more second users and/or phone numbers which are desired to be invited and added to the call 2103. The first user can also select the reason they are asking the second user(s) to join the call. The app is configured to automatically obtain the list of people that are on call based on the phone numbers connected to the call. Then, the information obtained by the app will be sent via a data pathway to the server. The information can be sent as a first call invitation 2104.

The first call invitation sent to the server from the app can include the name and/or phone number the first user, the name and or phone number of the other individuals who are on the call, the name and/or phone number of the one or more second users, and the reason the second users are being invited into the call 2104.

The server is configured to send the first call invitation to the one or more second users via the call invitation app on their cell phone (the one or more second devices). When received, an invitation is displayed by the app on the cell phones (second devices) of the one or more second users. The invitation displays the name and/or number of the first user, the name and/or number of other individuals on the call with whom they are invited to join and can optionally include the reason for the call invitation 2105.

The first call invitation also provides the second user(s) with the ability to ACCEPT or REJECT the invitation. If the invitation is rejected, the second user will also be able to provide a reason as to why they are rejecting the call invitation. If the invitation is accepted, and the second user cannot receive the call via their cell phone (the second device), the second user can provide a different phone number to receive an incoming call to participate in the active ongoing call 2106.

When the invitation is accepted or rejected, the second user's decision is sent to the server. The server then forwards the information regarding the second user's decision to the cell phone app of the first user. When this information is received via the cell phone app the first user, an alert is displayed via the first user's invitation app that will show them the second user(s) has ACCEPTED (at least one notification of acceptance) or REJECTED (at least one notification of rejection) and optionally, why the second user rejected the invitation 2106.

Before or after the invitation is accepted, the server is configured to send a call to the native dialer of the cell phone of the first user. Then when the invitation is accepted, another call may be forwarded or sent from the server to the native dialer of cell phone of the second user, or the server is configured to forward the call to the phone number the second user chose to be call at 2107. When both calls are answered, they will be communicatively connected via the server. When the call is received and answered by the first user, the incoming call from the server can be merged with the other calls the first user is having via the native dialer of the cell phone. And then the one or more second users can be completely connected to all people on the call after the first user answers the server's call and merges it with the others phone connections on the call 2108.

If the invitation is accepted by the second user, the server may send to the app of the second user a phone number to call. If received, the app of the second user will use the native dialer of the cell phone to call the number it has received. When called, the number will be directed to the server or directed to the native dialer of the first user 2109.

If the phone number the app receives makes a call via the native dialer of the cell phone and the call goes to the server, a second call may be placed from the server to the native dialer of the cell phone of the first user. The call from the app of second user and the call made to the first user will be merged by the server 2111.

Alternatively, if phone number the app receives makes a call via the native dialer of the cell phone, the call may go directly to the native dialer of the cell phone of the first user.

When answered, the call can be merged with the other calls via the native dialer of the cell phone. And then the second user can be completely connected to all people on the call 2110.

If the second user rejects the invitation, at least one notification of rejection is sent to the server by the call placement application on the second device (the second call placement application). The server receives this notification of rejection and transmits this notification of rejection to the first call placement application (the application on the first device). The first user can then receive and consider the notification of rejection on their first device.

In another embodiment, the invention is directed to an apparatus for inviting one or more users to join an active ongoing group call (an existing call with two or more other users on it) which is taking place via the native dialer of a cell phone (the first device) of a first user. The apparatus can comprise at least a processor connected to a communication network, and a memory containing instructions configuring the at least a processor to: receive, at a first call placement application operating on the apparatus, a user command to place the first call to at least one second device; transmit a request to a server to initiate the first call; receive the request from the server to receive the first call; reject or accept the first call, wherein if the first call is accepted, the first call is initiated by either the first call placement application or the server; and merge the first call with at least one second call. The apparatus can perform all of the functions noted above with respect to the system discussed above.

Referring now to FIGS. 22A-22D there is shown a system and method that enables a first user to forward a call to at least one second user when the forwarded call is taking place via the native dialer of a cell phone of the first user 2201. The system comprises a server, a first device, and at least one second device 2202. Preferably, the server is designed and configured to receive call forwarding information from an app on a cell phone through a data pathway (Internet, WIFI, 5G, or any other pathway where data can be transferred). The first device has a first user, a first telephone number and a first call forwarding application operating thereon. The at least one second device has at least one second user, at least one second telephone number and at least one second call forwarding application operating on the second device. The call forwarding process connects a person on a call whose call needs to be forwarded with the person the call needs to be forwarded (the second user) to via unique processes.

When the first user is on a call via the native dialer of a cell phone (the first device), the first user can open the call invitation/placement app and select the person and/or phone numbers (the second user) to which the first user desires to forward the call to 2203. While on the app, the first user can also select or input the reason for the call forwarding and display the names and or numbers of the person or people whose call they would like to have forwarded (the forwarded call information) 2204.

The information (in the form of a first call forwarding request) is sent from the call forwarding app of the first user to the server. The call forwarding request includes the name and/or phone number of the first user, the name and/or phone number of the individual or individuals whose call will be forwarded, and the reason the second user is being asked to accept the call forwarding. The request is packaged in the form of an audio call and at least one digital datum. The digital datum can comprises at least one data packet and at least one text message 2204.

When received, the server then sends the request to the one or more second users. The request is sent from the server to the call invitation app on the cell phone (the one or more second devices) of the second user(s). When the request is received by the app on the second user's cell phone, an Alert, which can be visible and may be audible, is displayed on the screen of the second user's cell phone by the app 2205.

The Alert (call forwarding request) can display the name and/or number of the first user, the name and/or number of person or people whose call can be forwarded (via a unique connection process), and the reason for the potential call forwarding 2206.

The call forwarding request can also provide an option for the second user to ACCEPT or REJECT the call forwarding request. If the request is rejected, the second user can input into the app why they are rejecting the request 2206.

When the call forwarding request is accepted or rejected, the second user's decision will be sent to the server. The server will then forward the response/decision provided by the second user. The response is sent via the server to the cell phone call forwarding app of the first user. When this information is received via the cell phone app of the first user, an alert is displayed via their call forwarding app that shows them whether the second user has ACCEPTED or REJECTED (and optionally why they have rejected) the call forwarding request 2206.

Optionally, when one of the one or more second users accepts the call forwarding request, a notice of acceptance of the call forwarding request is sent by the server to the more than one second devices that did not accept the forwarded call, or did not respond to the first request. Stated another way, the original call forwarding request can be sent out to multiple second users, but it may only be necessary for one of those multiple second users to accept the call. Accordingly, when one of those second users does accept the request, the remaining second users that either did not accept the request (rejected it), or did not respond yet, are notified that one of the other second users has already accepted the forwarding request.

When accepted, multiple calls can be sent from the server to functionally initiate the call forwarding. The call forwarding process can send a call from the server to the phone number of the person whose call is being forwarded. If the person whose call is being forwarded receives the call from the server, they can merge the server's incoming call any other phone calls they are on so everyone will be included when the second user has answered the call sent to them from the server 2207.

Optionally, another call can be sent from the server. It will be sent to the second user. When both calls are answered from the server (the call to the person whose call is being forwarded and to the second user) they will be communicatively connected by the server. When both calls are answered, the call forwarding process is underway 2208.

The call forwarding process can have the second user receive a phone number from the server to their call forwarding app. When the number is received in their call forwarding app, their app will initiate a call via the native dialer on their cell phone, the call may be directed to the server to be connected with a call from the server that has been or will be sent from the server to the phone number of the person who is being forwarded to them. Alternatively, the number that is received can initiate a call via app on their cell phone and the call will be made via the native dialer on their cell phone. The call may go directly to the phone number of the person who they will receive their call forwarding 2209.

If the first user has left the call, and decides to join the call again, the first user can open the call forwarding app on their first device, select the call forwarding communication event they originated, and press a button to join back in. When the first user chooses to join back in, the server will forward the first user a call to include them in the call forwarding. Alternatively, the server will forward the first user a phone number that their app will use to initiate a phone call via the native dialer of their phone. The phone number or received phone call will reconnect the first user to the calling connection they originated.

In another embodiment, the invention is directed to an apparatus for forwarding a call to at least one user when the forwarded call is taking place via the native dialer of a cell phone of a first user. The apparatus can comprise at least a processor connected to a communication network, and a memory containing instructions configuring the at least a processor to: receive, at a first call forwarding application operating on the apparatus, a user command to forward the call to at least one second device (apparatus) associated with at least one second user; transmit a request to a server to forward the call; receive a request from the server to receive the call; and reject or accept the first call. The apparatus can perform all of the functions noted above with respect to the system discussed above.

In another embodiment, and referring back to FIGS. 21A-21E, the present invention is directed to a system that enables a first user to invite one or more second users to join an active ongoing group call (an existing call with two or more people on it) which is taking place via any calling device or any phone number 2101. The system comprises a server, a first device, and at least one second device 2102. The server is designed and configured to receive call invitation information from an app on a computer or data device or cell phone. The information is sent from the app to the server via the Internet, WIFI, 5G, or any other pathway where data can be transferred. The first device has a first user, a first telephone number and a first call placement/invitation application operating thereon. The at least one second device has at least one second user, at least one second telephone number and at least one second call placement/invitation application operating on the second device.

When the first user is on a call via any calling device, the first user can open the call invitation app on their cell phone, computer, or any data device (the first device). The one or more second users, which are the people the first user will invite, must have also have the call invitation app on one or more of their devices. When the app is opened on the first device, the first user can select the individual or individuals to whom they are inviting to join the call (the one or more second users), select the reason the first user is asking the second users to join the call, and details regarding the other people who are already on the call with which the second users are being invited. Then, the information obtained by the app will be sent via a data pathway to the server 2102-2104.

The information sent to the server from the app can include the name and/or phone number of the first user, the name and or phone number of the other individuals who are on the call, the name and/or phone number of the second user(s), and the reason the second users being invited into the call 2105.

The server then sends the information to the second users via their call invitation apps on their cell phone, computer, or any other data device which has the app (the one or more second devices). When received, an alert is displayed by the app on the second user's device which has the app. The alert can display the name and/or number of the first user, the name and/or number of other individuals on the call with whom the second user is invited to join, and optionally may include the reason for the call invitation 2105.

The alert will also provide an option to for the second user to ACCEPT or REJECT the call invitation. If the alert is rejected, the second user can also provide a reason as to why they are rejecting the call invitation. If ACCEPTED, the second user has the option to enter a different phone number than the one that is automatically connected to their app (which could be an office number, a cell phone number, a home number or any other number) so the incoming call will be directed to the phone number they added to the alert 2106.

When the alert is accepted or rejected, the second user's decision is sent to the server. The server then forwards the information regarding the second user's decision to the call invitation app of the first user. When this information is received via the app of the first user, an alert can be displayed via the first user's invitation app that will show them that the second user has either accepted or rejected the invitation, and optionally, why the second user rejected the invitation 2106.

Before or after the alert is accepted, the server can send a call to phone of the first user. When the alert is accepted by the second user, another call may be forwarded from the server to the phone number of the second user, or, the server will forward the call to the phone number the second user chose to be call at. When both calls are answered, they will be communicatively connected via the server. When the call is received and answered by the first user, the incoming call from the server can be merged with the other calls the first user is having via the native dialer of the cell phone. Next, the one or more second users can be completely connected to all people on the call after the first user answers the server's call and merges it with the others phone connections on the call 2107, 2108.

In another embodiment, the invention is directed to an apparatus for inviting one or more users to join an active ongoing group call (an existing call with two or more other users on it) which is taking place via any calling device or any phone number. The apparatus can comprise at least one processor connected to a communication network, and a memory containing instructions configuring the at least one processor to: receive, at a first call placement application operating on the apparatus, a user command to place the first call to at least one second device; transmit a request to a server to initiate the first call; receive the request from the server to receive the first call; reject or accept the first call, wherein if the first call is accepted, the first call is initiated by either the first call placement application or the server; and merge the first call with at least one second call. The apparatus can perform all of the functions noted above with respect to the system discussed above.

Referring now to FIGS. 23A-23D, there is shown a system and method that enables a first user to initiate a call via a first device (a cell phone) with a first telephone number and a texting application (app) and/or a call placement application operating thereon. The call initiated by the first device is ultimately made/placed by a second device 2301.

The second device can be an office phone, a VOIP app, a computer phone program, or any other device configured and capable of placing a telephone call. The second device can be programmed to receive all contact information associated with the first device and is able to receive and effectively respond to the calling alert originated by a call placement application or text message application on the first device 2302.

When the call placement application is opened on the first device, the first user can select the second device they choose to initiate a call from. The first user can also select the person and/or phone number they are directing the second device to call (the second user) 2303. Once the call selection for the second device is completed on the first device's call placement/text messaging app, the app sends the name and or phone number of the second user, the calling device the call will be sent to if the second user has more than one phone number, and the telephone number of the first device, to the server 2304 or directly to the second device 2307.

Once received by the server, the server confirms that the app of the first device has the authority to initiate a call via the second device. Once approved by the server, the server sends an alert to the second device via a phone or data network. The alert can include the name and/or phone number of the second user, the person's calling device, and the phone number of the first device 2305.

If the information is sent directly to the second device 2307, the second device can be configured to confirm that the first device has authority to direct to the second calling device instructions to make a phone call. If it does have authority, the second calling device will a) Call the First Telephone Number of the First Device, b) Call the phone number it has been directed to call by the text message of the First Device, and c) Once the second device has received the call placement information from the server, it will initiate two phone calls. One call to the phone number it has been directed to call, and a second call to the first telephone number of the first device. Both calls will be merged so the user of the First Device can be on the call when the call is answered by the person's phone number that the Second Calling Device has been directed to call.

When the data/information is received by the second device, two phone calls are made. One call is made to the phone number of the first device, and the second call is made to the phone number of the second user that has been selected by the first user 2306.

When both calls are made, they are communicatively merged so the first user can immediately communicate with the second user when the call is answered by the second user. The second user will receive the caller ID of the second device when the call is received by the second user's phone 2306.

When the calling alert is initiated by the first device's text messaging app, the app sends a text message alert containing text message information to the text messaging number related to the second device. The text message information can include the second user's name and/or phone number. If the second user's name has multiple phone numbers associated with it, the text message information can also include both the second user's name and the name/title of the calling device the call is requested to be sent to (such as mobile phone, office phone, home phone, direct line phone or any other specific phone name) 2309.

The text messaging number of the second device may be directed to the server or directed directly to the second device. The server and/or the second device can have access to all of the first devices' contact names and phone numbers. So, if the second user's name is provided along with the text message information, the server and the second device can know what number to call. If the text message is directed to the server, the server will confirm that the text messaging app on the first device is allowed to initiate a call via the second device. If the first device is not allowed to initiate a call via the second device, the server will not forward the information to the second device 2310.

If the text message information is sent directly to the second device, the second device can confirm that the text messaging app on the first device is allowed to initiate a call via the second device. If the first device is not allowed to initiate a call via the second device, the second device will not make the call 2310.

When the data/text message information is received and confirmed (directly or via the server) by the second device, two phone calls are made. One call is to the telephone number of the first device, and the second call is to the person or phone number the second device has been directed to call (the second user) 2311.

When both calls are made, they are communicatively merged so the first user can communicate with the second user when the call is answered by the second user 2311. The second user receives the caller ID of the second device when the call is received by their phone 2312.

In another embodiment, the invention is directed to an apparatus initiating one or more calls from a first device and having the one or more calls placed by a second device. The apparatus can comprise at least a processor connected to a communication network, and a memory containing instructions configuring the at least one processor to: receive a first user command to initiate the one or more calls, the first user command comprising call initiation information, wherein the call initiation information comprises selection of the second device to initiate the one or more calls from, and a name and/or phone number associated with a second user to receive the one or more calls; and send the call initiation information to the server or to the second device. The apparatus can perform all of the functions noted above with respect to the system discussed above.

Figure 24:
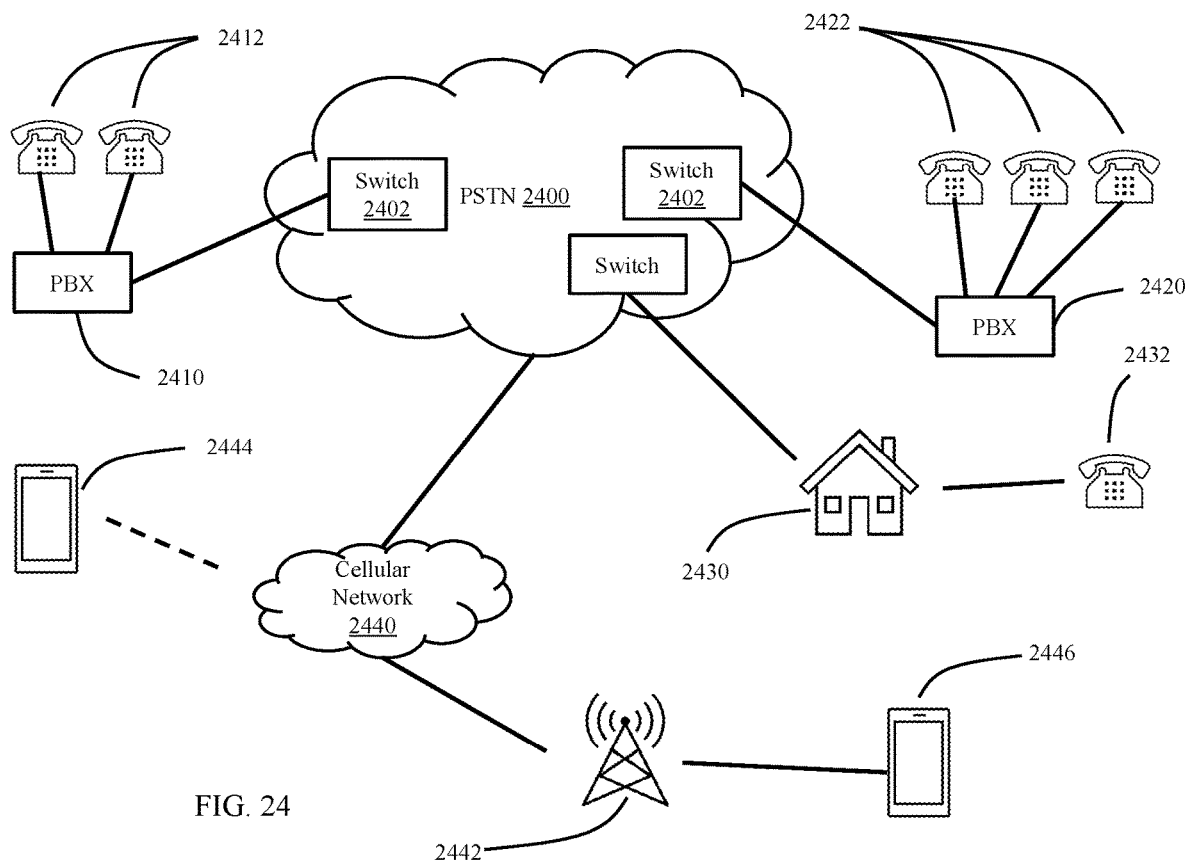
FIG. 24 is a network diagram for implementing call forwarding, in accordance with a preferred embodiment of the present invention.

An alternative embodiment of the present invention is shown and described in reference to FIGS. 24-28. A network diagram for implementing call forwarding in this embodiment is illustrated in FIG. 24. The network includes a wide-scale public switched telephone network (PSTN) 2400 which includes a plurality of regional switches for 2402 for routing calls from one branch of the PSTN to another branch of the PSTN and to/from edge devices. Each of the switches 2402, in turn, connects to numerous customers including commercial and residential customers. Commercial customers commonly employ a private branch exchange (PBX) 2410, 2420 installed onsite to route calls to a plurality of phones, handsets, or terminals 2412, 2422 within the company or campus. The phones 2412, 2422 may be configured to perform a number of functions including placing internal calls, placing calls to phones offsite, placing calls on hold, accessing voicemail, etc.

In addition to commercial customers, the PSTN 2400 is operatively coupled with numerous residential customers 2430 in what is commonly called a "land line" 2432 which enables residents to place and receive calls. In some cases, the residential land line 2432 can be configured to serve as a data communications network capable of delivering digital services including the Internet, for example.

The PSTN 2400 can also access a mobile communications network, i.e., cellular network 2440 that includes trunk lines that operatively couple cell towers 2442 across much of the country and, currently, much of the world. The cellular network 2440 is a data communications network that enables mobile phones 2444, 2446 to communicate with one another, communication with the commercial and residential customers 2410, 2420, 2430, and with the Internet more generally.

Figure 25A:
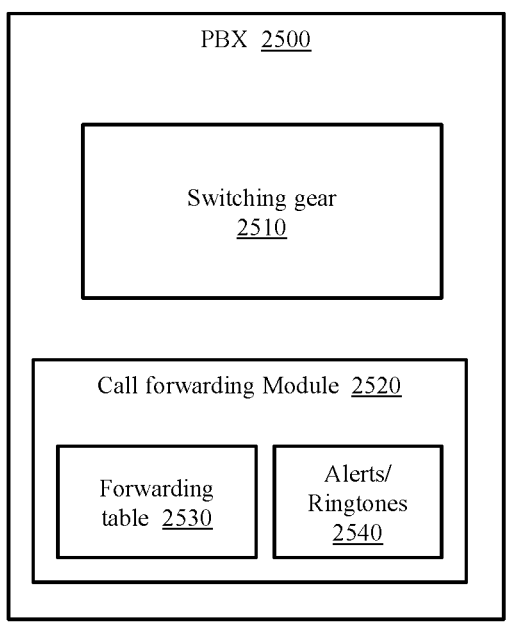
FIG. 25A is a functional block diagram of a PBX, in accordance with a preferred embodiment of the present invention.

Illustrated in FIG. 25A is a functional block diagram of a PBX 2500 which may be configured to interoperate with tens, hundreds, or even thousands of phones dispersed across a local area including business complex or campus, for example. The PBX 2500 includes switching gear 2510 for directing incoming calls from the PSTN 2400 to the appropriate phone 2412, 2422, and directing outgoing calls from those phones to the PSTN 2400.

The PBX 2500 further includes a call forwarding module 2520 configured to forward calls in accordance with the present invention. The call forwarding module 2520 may be implemented with a combination of one or more of the following: special purpose processors, general purpose processors, software, firmware, and memory.

The call forwarding module 2520 in the preferred embodiment includes a forwarding table 2530 and alerts/ringtone module 2540. The forwarding table 2530 associates one or more primary phone numbers with one or more secondary numbers, each secondary number being associated with a phone or other voice communication device to which a call may be forwarded. The alerts/ringtone module 2540, in turn, represents digital files with one or more audio alerts that can be sent to and installed on the phone to which a call is forward to notify the user of the source of the call.

Figure 25B:
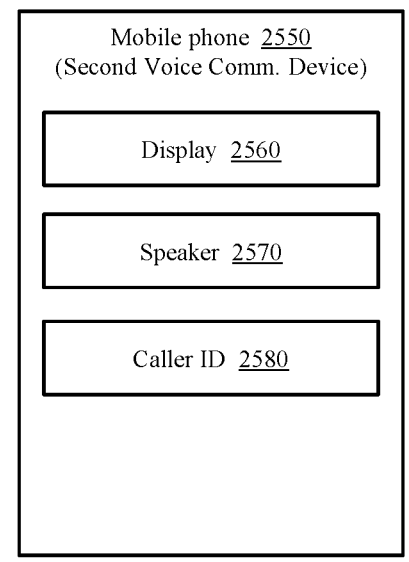
FIG. 25B is a functional block diagram of a mobile phone, in accordance with a preferred embodiment of the present invention.

FIG. 25B is a functional block diagram of a mobile phone, specifically a smart phone. The mobile phone 2550 is one example of a voice communication device configured to implement the present invention. The mobile phone 2550 includes a display 2560, a speaker 2570, and a caller ID function 2580. As described below, the present invention in some embodiments is configured to transmit a message and/or files to the mobile phone 2550 which causes the mobile phone to present the identity of a caller on the display 2560 when a call is forwarded to it, and cause a specialized audio alert or ringtone to be played on the speaker 2570 when a call is forward to it.

Figure 26:
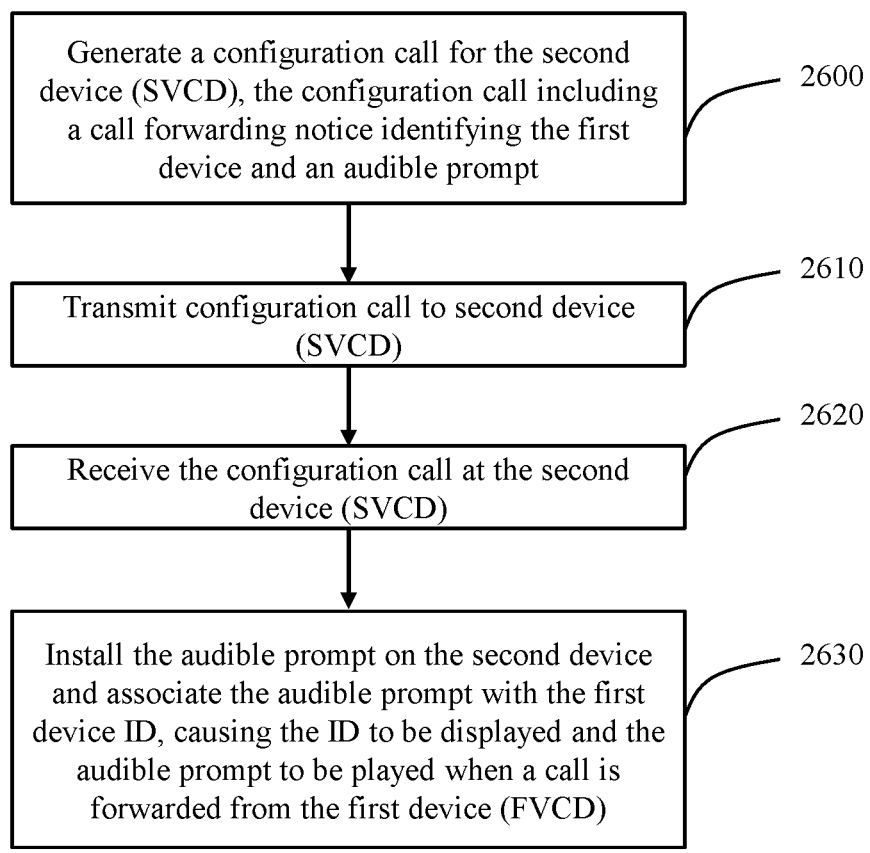
FIG. 26 is a flow chart of the process of configuring call forwarding, in accordance with a preferred embodiment of the present invention.

Illustrated in FIG. 26 is a flowchart of the process of configuring call forwarding prior to the actual forwarding of a call. The steps represented in the flowchart are mirrored in the communication diagram shown in FIG. 27. To configure the call forwarding operation, a user first causes a configuration call to be generated 2600. For example, the person uses their phone, referred to herein at the first device or first voice communication device (FVCD), to generate 2600, 2700 the configuration call for the recipient phone, referred to herein as the second device or second voice communication device (SVCD). The configuration call 2701 includes a call forwarding notice identifying the first device and an audible prompt, e.g., an alert or ringtone. The configuration call 2701 is transmitted 2610 from the first device to the PBX and then to 2702 the PSTN, for example, before being transmitted 2610, 2704 to the second device.

The second device then receives 2620 the configuration call, installs 2630 the audible prompt on the second device, and associates the audible prompt with the first device ID. This causes the ID to be displayed and the audible prompt to be played when a call is forwarded from the first device.

Figure 28:
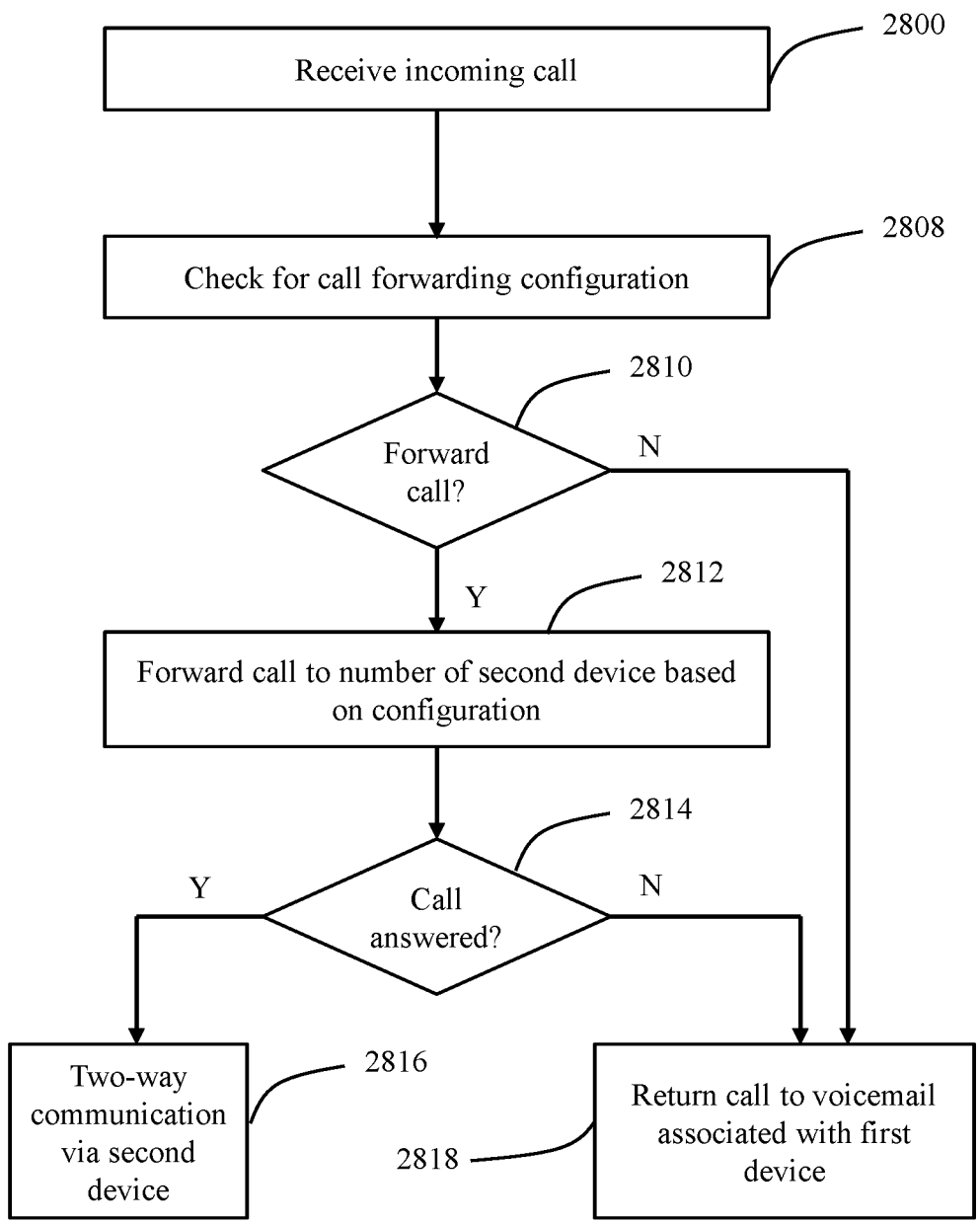
FIG. 28 is a flow chart of the process of call forwarding, in accordance with a preferred embodiment of the present invention.

Illustrated in FIG. 28 is a flow chart of the process of call forwarding after installation of the configuration call. When an incoming call 2710 to the first device from a third party is received 2800 at the PBX or other routing system, for example, the PBX checks 2712, 2808 the call forwarding configuration associated with the first device. If the forwarding table 2530 identifies a second device to which to forward calls, then decision block 2810 is answered in the affirmative and the call is forwarded 2814 to the number or address associated with the second device via the PSTN 2716 and/or cellular network 2718, 2720, for example.

Upon receipt of the forwarded call, the second device presents 2722 the caller ID associated with the first device and/or plays the ringtone or other alert associated with the first device. If the user answers the forwarded call, decision block 2814 is answered in the affirmative and the second device and third party are placed in two-way voice communication 2724, 2726, 2816. If the user does not answer the forwarded call, however, decision block 2814 is answered in the negative and the call returned to the PBX or to the first device for purposes of recording a voicemail 2818.

In the preferred embodiment, the PBX 2500 is configured with the forwarding table 2530 and alerts/ringtones 2540. In other embodiments, the first voice communication device includes the forwarding table 2530 and alerts/ringtones 2540, thereby enabling the user himself or herself to generate the configuration call and set up call forwarding. In other embodiments, they are installed on a separate router or server in the network for purposes of supporting call forwarding operations.

Figure 29:
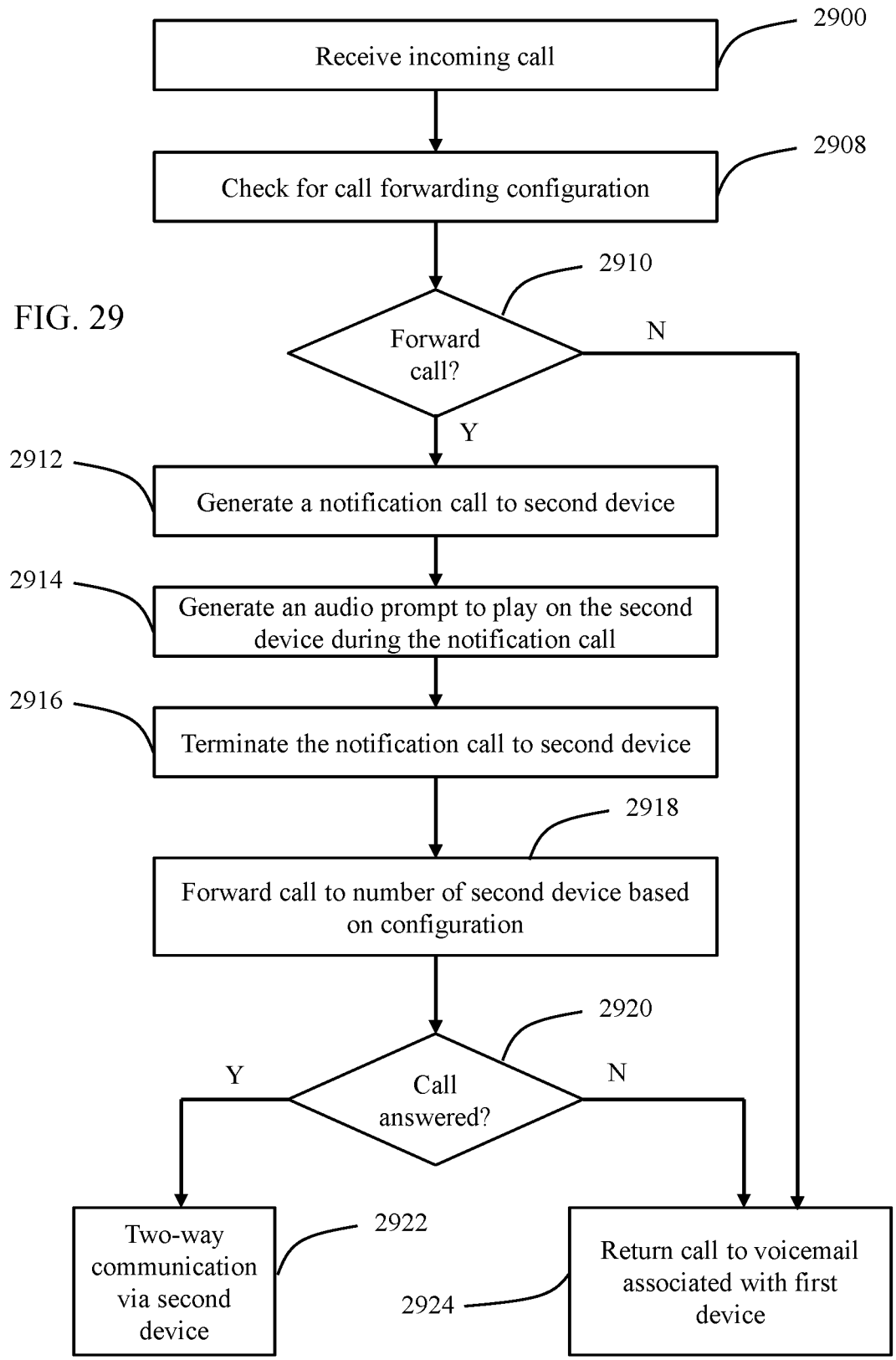
FIG. 29 is a flow chart of the process of call forwarding, in accordance with a preferred embodiment of the present invention.
Figure 30:
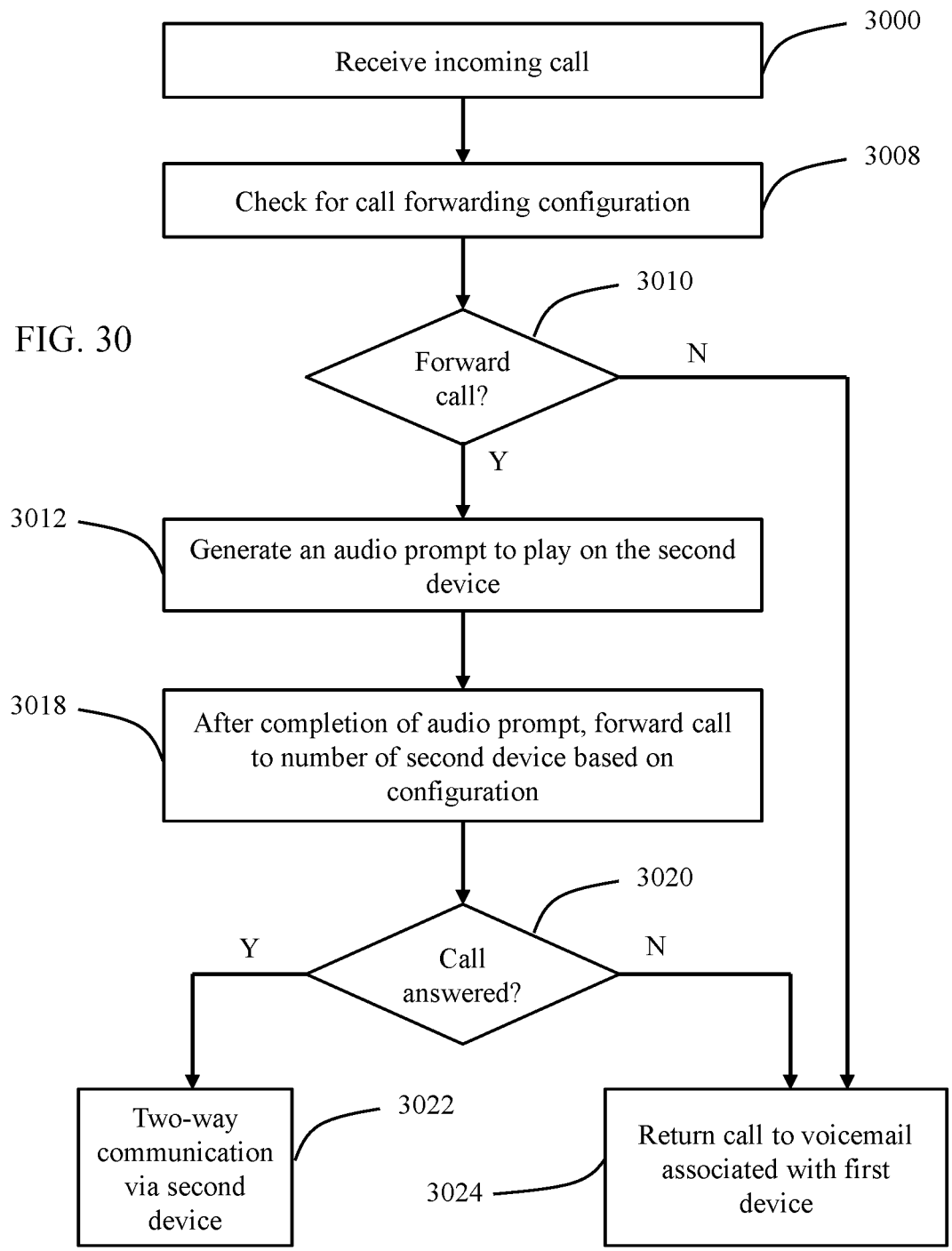
FIG. 30 is a flow chart of the process of call forwarding in accordance with a preferred embodiment of the present invention.

Referring now to FIGS. 29 and 30, there are shown two different methods of forwarding a call from a first communication device to a second communication device. When a call has been made from a Calling Device to a Call Recipient Phone Number of the Call Recipient Device (incoming call to a first voice communication device 2900, 3000), and the call is being forwarded 2908, 3008 from the Call Recipient Phone Number to a Second Device (second voice communication device), an audible alert will be initiated and heard on the Second Device 2914, 3012. The audible alert may be a song, a pre-established set of words, a ringtone or any audible sound. The audible alert will inform the user of the second device that a call is going to be quickly forwarded from the Call Recipient Phone Number to the Second Device.

The audible alert that is received and heard on the second device can be the call ringing sounds of a First Call which would be received on the Second Device. The First Call would be received on the Second Device before the forwarded call from the Call Recipient Phone Number is received on the Second Device.

In both FIGS. 29 and 30, when the incoming call is received, it is processed through a telecom network, sever or data system. The telecom network, server or data system is the system responsible for carrying out the relevant call forwarding instructions. The call forwarding instructions can be input into the system directly by the user of the first voice communication device.

Optionally, the user of the first voice communication device can utilize a standard call forwarding number (e.g. *72 555 555 5555) to complete the call forwarding action. In this scenario, when the standard call forwarding number is dialed, it will direct all incoming calls through an additional Forwarding System, such as a telecom network, server or data system (that may or may not be associated with the first communication device), before the forwarded call is received on the second communication device.

Optionally, the user of the first voice communication device can utilize a generic call forwarding system to complete the call forwarding action. In this scenario, when the generic call forwarding system is utilized, it will direct all incoming calls through an additional Forwarding System, such as a telecom network, server or data system (that may or may not be associated with the first communication device), before the forwarded call is received on the second communication device.

In both of these scenarios, the telecom network, server or data system will either send a notification call 2912, or generate an audio prompt 3012 to the second voice communication device before the forwarded call is forwarded to the second communication device.

Referring specifically to FIG. 29, the method utilized for call forwarding that forwards a call to the Second Device will include sending a FIRST CALL (notification call) 2912 to the Second Device before the Call Recipient Phone Number's forwarded call is sent to the Second Device. When the FIRST CALL is sent, the caller ID of the FIRST CALL will be used on the Second Device to initiate an important call ringing alert (audio prompt/alert) 2914. When the user of the Second Device hears the FIRST CALL's ringing alert, it will inform the user of the Second Device that a call is going to quickly be forwarded from the Call Recipient Phone Number.

The ringing alert that can be heard on the Second Device when a FIRST CALL is received may be a song, an audible statement, or any sound that is heard on the Second Device when a FIRST CALL is made to the Second Device.

The ringing alert sound that is heard on the Second Device when a call is received by the FIRST CALL can be the one selected and established by the user of the Second Device. The user of the Second Device can set up a preselected ringtone or song or audible alert that will be heard when a FIRST CALL is received on a second device. When the pre-established unique ringtone or song or audible alert is heard on the second device, the user of the second device will know that a call is about to be forwarded to the second device via the Call Recipient Phone Number.

Accordingly, when a FIRST CALL is received on a Second Device, the user of the Second Device will hear a ringing sound that informs them that a call to the Call Recipient Phone Number will quickly be forwarded to the Second Device.

Optionally, when the contact information is set up on the Second Device for the caller ID of the FIRST CALL, the First Call's phone number can be assigned a name that will be displayed during the FIRST CALL's reception on the Second Device. When the user of the Second Device sees the name or caller ID of the FIRST CALL when a call is received on the Second Device from the FIRST CALL, they will know that it is informing them that a call is going to be forwarded from the call recipient phone number and received on the Second Device.

Referring specifically to FIG. 30, the audible alert that can be received and heard on the Second Device can be initiated via an APP or Data Device on the Second Device 3012. The APP or Data Device on the Second Device will receive a notification via a forwarding system (a telecom network, a server or data network). When it is received, the APP or Data Device will immediately execute an audible alert on the Second Device 3012. The sound that is heard by the user of the Second Device via the App or Data Device will be a notification that a call is going to be quickly forwarded to the Second Device that was made to the call recipient phone number. When it is received, the APP or Data Device will immediately execute an audible alert on the Second Device.

When the audible alert on the APP or Data Device is initiated, it can be a pre-assigned song, a pre-established word statement, or any sound that is heard on the Second Device when the APP or data device on the Second Device is notifying the user of the Second Device that a call will quickly be forwarded to the Second Device via the Call Recipient Phone Number.

After hearing the audible alert on a Second Device, via a FIRST CALL or the APP or data device on the Second Device, the Second Device will receive a forwarded call from the call recipient phone number 3018.

When the forwarded call is received on the Second Device via the Second Device, the caller ID displayed on the Second Device will be caller ID of the Calling Device that made the call to the Second Device.

In both FIGS. 29 and 30, if the forwarded call is NOT answered or rejected on the Second Device, the call may be forwarded to a voice mail system related to the First Device 2924, 3024.

Optionally, if the forwarded call is NOT answered or rejected on the Second Device, the call may be forwarded to another second device that is assigned to receive a forwarded call if the first second device does not answer the forwarded call from the Call Recipient Phone Number.

Figure 31:
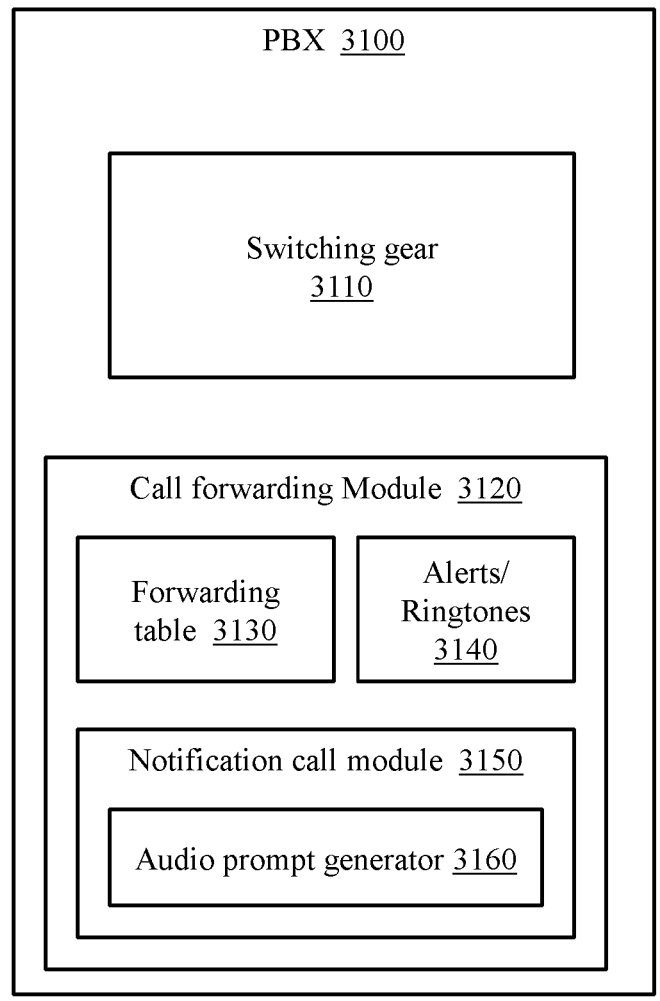
FIG. 31 is a functional block diagram of a system for call forwarding, in accordance with a preferred embodiment of the present invention.

Referring now to FIG. 31, there is shown a functional block diagram of a PBX 3100 which may be configured to interoperate with tens, hundreds, or even thousands of phones dispersed across a local area including business complex or campus, for example. The PBX 3100 includes switching gear 3110 for directing incoming calls from the PSTN 2400 to the appropriate phone 2412, 2422, and directing outgoing calls from those phones to the PSTN 2400.

The PBX 3100 further includes a call forwarding module 3120 configured to forward calls in accordance with the present invention. The call forwarding module 3120 may be implemented with a combination of one or more of the following: special purpose processors, general purpose processors, software, firmware, and memory.

The call forwarding module 3120 in the preferred embodiment includes a forwarding table 3130 and alerts/ringtone module 3140. The forwarding table 3130 associates one or more primary phone numbers with one or more secondary numbers, each secondary number being associated with a phone or other voice communication device to which a call may be forwarded. The alerts/ringtone module 3140, in turn, represents digital files with one or more audio alerts that can be sent to and installed on the phone to which a call is forward to notify the user of the source of the call.

The PBX 3100 further includes a notification call module 3150 with audio prompt generator 3160. The notification call module 3150 is configured to generate notification calls with an audio prompt prior to call forwarding. A "notification call", as used herein, refers to a special-purpose call transmitted to the second device in order to signal that the next call transmitted to the second device is a forwarded call. In operation, the notification call module 3050 generates a notification call to the second device after the incoming call is received but prior to transmitting the forwarded call. The notification call causes an audio prompt to play on the second device. The audio prompt may take the form of a ring, ringtone, song, or audio alert that plays for a fraction of a second up to several seconds. At the end of the audio prompt, the notification call is automatically terminated and the incoming call to the first device then forwarded to the second device within a predetermined period of time (several seconds) after the notification call, thereby informing the user of the nature of the call.

Optionally, instead of the notification call module 3150 generating a "notification call," the module can generate an audio prompt that alerts the user that the call being forwarded after issuance of the audio prompt is being forwarded from the first voice communication device.

With respect to the various call placement, forwarding and texting applications referred to above, a single application can perform all of the described functions, and one is not exclusive of the other. With respect to the various apparatus' and systems and method described herein, all features and functions are interchangeable and combinable in different combinations depending on the needs of the user, and the various embodiments described herein are not exclusive of one another.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A first voice communication device for forwarding calls to a second voice communication device, wherein the first voice communication device comprises:
   a memory configured to store:
      a first device ID associated with the first voice communication device; and
      a second device ID associated with the second voice communication device;
   a first processor configured to:
   i) transmit, to the second voice communication device, a message configured to:
      (1) associate the first device ID with the first voice communication device; and
      (2) associate an audio prompt with the first voice communication device;
   ii) detect an incoming call to the first voice communication device;
   iii) determine whether the memory comprises the second device ID;
   iv) if and when the second device ID is present, then:
      (1) automatically forward the incoming call to the second voice communication device; and
      (2) automatically cause the audio prompt to be played on the second voice communication device; and
      (3) automatically cause the first device ID to be displayed on second voice communication device.

2. The first voice communication device of claim 1, wherein the second voice communication device is a mobile phone.

3. The first voice communication device of claim 2, wherein the second voice communication device is a smart phone configured with a software application, wherein the software application is configured to:
   (1) automatically play the audio prompt; and
   (2) automatically display the first device ID.

4. The first voice communication device of claim 3, wherein the audio prompt is selected from the group consisting of: a telephone ring, a ringtone, and an audible alert.

5. The first voice communication device of claim 3, further configured to transmit said message to the second voice communication device via a data network.

6. The first voice communication device of claim 5, wherein the data network operates in accordance with a network protocol selected from the group consisting of: Dynamic Host Configuration Protocol (DHCP), File Transfer Protocol (FTP), Hypertext Transfer Protocol (HTTP), Internet Protocol (IP), Voice Over IP (VOIP), Simple Mail Transfer Protocol (SMTP), and Telnet.

7. The first voice communication device of claim 3, further configured to transmit said message to the second voice communication device via a Public Switched Telephone Network (PSTN).

8. The first voice communication device of claim 3, wherein said first device ID is a telephone number.

9. The first voice communication device of claim 3, wherein said first device ID is an alphanumeric name.

10. A system for forwarding calls, the system comprising a first voice communication device and a second voice communication device, wherein:
    the first voice communication devices comprising:
    i) a first processor; and
    ii) a first memory configured to store a second device ID associated with the second voice communication device; and
    the second voice communication device comprising:
    i) a second memory configured to store a first device ID associated with the first voice communication device;
    ii) an audio prompt associated with the first voice communication device; and
    iii) a second processor;
    wherein the first processor is configured to:
       (1) detect an incoming call to the first voice communication device;
       (2) determine whether the first memory comprises the second device ID;
       (3) if and when the second device ID is present, then automatically forward the incoming call to the second voice communication device;
    wherein the second processor is configured to:
       (1) detect the call being forwarded;
       (2) automatically play the audio prompt; and
       (3) automatically display the first device ID.

11. The system of claim 10, wherein the second voice communication device is a mobile phone.

12. The system of claim 10, wherein the audio prompt is selected from the group consisting of: a telephone ring, a ringtone, and an audible alert.

13. The system of claim 10, wherein the first voice communication device is configured to transmit said message to the second voice communication device via a data network.

14. The system of claim 10, wherein the first voice communication device is configured to transmit said message to the second voice communication device via a Public Switched Telephone Network (PSTN).

15. The system of claim 10, wherein said first device ID is a telephone number and/or an alphanumeric name.

16. A method for forwarding a call using the system of claim 10, the method comprising:

i) storing, on the first voice communication device, the first device ID associated with the first voice communication device;
ii) storing, on the first voice communication device, the second device ID associated with the second voice communication device;
iii) transmitting, from the first voice communication device to the second voice communication device, the first device ID and the audio prompt associated with the first voice communication device;
iv) detecting, on the first voice communication device, the incoming call to the first voice communication device;
v) automatically forwarding the incoming call to the second voice communication device;
vi) detecting the call being forwarded on the second voice communication device;
vii) automatically playing the audio prompt on the second voice communication device; and
viii) automatically displaying the first device ID on the second voice communication device.

17. A method for forwarding a call from a first voice communication device to a second voice communication device, the method comprising:
i) detecting, on the first voice communication device, an incoming call to the first voice communication device;
ii) determining if the call to the first voice communication device is configured to be forwarded to the second voice communication device;
iii) if the call to the first voice communication device is configured to be forwarded, then:
   (1) generating a notification call to the second voice communication device;
   (2) generating an audio prompt to play on the second voice communication device during the notification call;
   (3) terminating the notification call to the second voice communication device after the audio prompt has been played; and
   (4) after termination of the notification call, automatically forwarding the incoming call to the second voice communication device.

18. The method of claim 17, wherein the audio prompt is selected from the group consisting of: a telephone ring, a ringtone, a song, and an audible alert.

19. The method of claim 17, further comprising:
generating a visual prompt to display on the second voice communication device during the notification call in order to inform the user of the incoming call being forwarded from the first voice communication device.

20. The method of claim 19, wherein the visual prompt comprises a name and/or phone number for display on the second voice communication device.

21. The method of claim 20, wherein the name or phone number in the visual prompt is selected by a user of the second voice communication device.

22. The method of claim 19, further comprising:
displaying, on the second voice communication device, a name or phone number associated with the caller device during the forwarded call.

23. The method of claim 17, further comprising:
if the forwarded call is unanswered on the second voice communication device, then forwarding the incoming call to a voicemail service associated with the first voice communication device.

24. A method for forwarding a call from a first voice communication device to a second voice communication device, the method comprising:
i) detecting, on the first voice communication device, an incoming call to the first voice communication device;
ii) determining if the call to the first voice communication device is configured to be forwarded to the second voice communication device;
iii) if the call to the first voice communication device is configured to be forwarded, then:
   (1) generating an audio prompt to play on the second voice communication device; and
   (2) automatically forwarding the incoming call to the second voice communication device immediately after the after the audio prompt is played on the second voice communication device.

25. The method of claim 24, wherein the audio prompt is selected from the group consisting of: a telephone ring, a ringtone, a song, and an audible alert.

26. The method of claim 25, wherein audio prompt to play on the second voice communication device is selected by a user of the second voice communication device.

27. The method of claim 24, further comprising:
displaying, on the second voice communication device, a name or phone number associated with the caller device during the forwarded call.

28. The method of claim 24, further comprising:
if the forwarded call is unanswered on the second voice communication device, then forwarding the incoming call to a voicemail service associated with the first voice communication device.

* * * * *